US012600094B2

(12) United States Patent
Cole et al.

(10) Patent No.: US 12,600,094 B2
(45) Date of Patent: Apr. 14, 2026

(54) PREFABRICATED SUPPORT STRUCTURES AND/OR OVERLAYS FOR ADDITIVE MANUFACTURING

(71) Applicant: Align Technology, Inc., San Jose, CA (US)

(72) Inventors: Michael Christopher Cole, San Jose, CA (US); Brett E. Kelly, Oakland, CA (US); Bastien Pesenti, San Jose, CA (US); Masoumeh Pourali, Mountain View, CA (US); Paul Hassell, Sunnyvale, CA (US); Viswanath Meenakshisundaram, Santa Clara, CA (US); Peter Dorfinger, Woodside, CA (US)

(73) Assignee: Align Technology, Inc., San Jose, CA (US)

( * ) Notice: Subject to any disclaimer, the term of this patent is extended or adjusted under 35 U.S.C. 154(b) by 139 days.

(21) Appl. No.: 18/498,636

(22) Filed: Oct. 31, 2023

(65) Prior Publication Data

US 2024/0140043 A1     May 2, 2024

Related U.S. Application Data

(60) Provisional application No. 63/381,823, filed on Nov. 1, 2022.

(51) Int. Cl.
B29C 64/40 (2017.01)
B33Y 10/00 (2015.01)
(Continued)

(52) U.S. Cl.
CPC .............. B29C 64/40 (2017.08); B33Y 10/00 (2014.12); B33Y 30/00 (2014.12); B33Y 80/00 (2014.12)

(58) Field of Classification Search
CPC .............................. B29C 64/40; B29C 64/245
See application file for complete search history.

(56) References Cited

U.S. PATENT DOCUMENTS 6,210,162 B1     4/2001   Chishti et al.
6,309,215 B1     10/2001  Phan et al.
(Continued)

FOREIGN PATENT DOCUMENTS

DE     102018001145 A1    8/2019
JP        H05318607 A     12/1993
(Continued)

OTHER PUBLICATIONS

Xu, Yang et al., Reusable support for additive manufacturing, Additive Manufacturing, 2021, 39, 101840, 13 pages.

*Primary Examiner* — Xiao S Zhao
*Assistant Examiner* — Inja Song
(74) *Attorney, Agent, or Firm* — FORTEM IP LLP

(57)     ABSTRACT

Systems, devices, and methods for additive manufacturing of objects are provided. In some embodiments, a device for supporting an object during an additive manufacturing process includes a build platform having a surface, and a plurality of support structures extending above the surface of the build platform. Each support structure can be configured to couple to a portion of an additively manufactured object. The device can also include a plurality of actuators, each actuator being configured to adjust a position of a corresponding support structure relative to the build platform.

20 Claims, 23 Drawing Sheets

(51) Int. Cl.
    *B33Y 30/00*     (2015.01)
    *B33Y 80/00*     (2015.01)

(56)         References Cited

U.S. PATENT DOCUMENTS

| | | | |
|---|---|---|---|
| 6,450,807 | B1 | 9/2002 | Chishti et al. |
| 6,497,574 | B1 | 12/2002 | Miller |
| 6,749,414 | B1 | 6/2004 | Hanson et al. |
| 6,830,450 | B2 | 12/2004 | Knopp et al. |
| 6,957,118 | B2 | 10/2005 | Kopelman et al. |
| 6,976,627 | B1 | 12/2005 | Culp et al. |
| 7,092,784 | B1 | 8/2006 | Simkins |
| 7,192,273 | B2 | 3/2007 | McSurdy, Jr. |
| 7,220,124 | B2 | 5/2007 | Taub et al. |
| 7,236,842 | B2 | 6/2007 | Kopelman et al. |
| 7,245,977 | B1 | 7/2007 | Simkins |
| 7,261,533 | B2 | 8/2007 | Wrosz et al. |
| 7,335,024 | B2 | 2/2008 | Wen |
| 7,384,266 | B2 | 6/2008 | Wen |
| 7,435,084 | B2 | 10/2008 | Liu et al. |
| 7,472,789 | B2 | 1/2009 | Wu et al. |
| 7,476,100 | B2 | 1/2009 | Kuo |
| 7,481,647 | B2 | 1/2009 | Sambu et al. |
| 7,604,181 | B2 | 10/2009 | Culp et al. |
| 7,641,828 | B2 | 1/2010 | DeSimone et al. |
| 7,648,360 | B2 | 1/2010 | Kuo |
| 7,674,422 | B2 | 3/2010 | Kuo |
| 7,711,447 | B2 | 5/2010 | Lu et al. |
| 7,748,199 | B2 | 7/2010 | Sankaran et al. |
| 7,802,987 | B1 | 9/2010 | Phan |
| 7,819,659 | B2 | 10/2010 | Wen |
| 7,831,322 | B2 | 11/2010 | Liu et al. |
| 7,840,373 | B2 | 11/2010 | Culp et al. |
| 7,892,474 | B2 | 2/2011 | Shkolnik et al. |
| 7,922,490 | B2 | 4/2011 | Wen |
| 7,957,824 | B2 | 6/2011 | Boronvinskih et al. |
| 8,019,465 | B2 | 9/2011 | Spiridonov et al. |
| 8,030,588 | B2 | 10/2011 | Culp et al. |
| 8,087,932 | B2 | 1/2012 | Liu |
| 8,636,513 | B2 | 1/2014 | Wen |
| 8,765,031 | B2 | 7/2014 | Li et al. |
| 8,776,391 | B1 | 7/2014 | Kaza et al. |
| 9,108,338 | B2 | 8/2015 | Sirovskiy et al. |
| 9,403,238 | B2 | 8/2016 | Culp |
| 9,700,385 | B2 | 7/2017 | Webber |
| 9,844,424 | B2 | 12/2017 | Wu et al. |
| 9,943,386 | B2 | 4/2018 | Webber et al. |
| 9,943,991 | B2 | 4/2018 | Tanugula et al. |
| 10,162,264 | B2 | 12/2018 | Mcleod et al. |
| 10,336,102 | B2 | 7/2019 | Cole |
| 10,495,973 | B2 | 12/2019 | Cole |
| 10,537,406 | B2 | 1/2020 | Wu et al. |
| 10,783,629 | B2 | 9/2020 | Parpara et al. |
| 10,888,395 | B2 | 1/2021 | Kopelman |
| 10,993,783 | B2 | 5/2021 | Wu et al. |
| 11,045,283 | B2 | 6/2021 | Riley et al. |
| 11,103,330 | B2 | 8/2021 | Webber et al. |
| 11,189,021 | B2 | 11/2021 | Shah et al. |
| 11,273,011 | B2 | 3/2022 | Shanjani et al. |
| 11,295,444 | B2 | 4/2022 | Cherkas et al. |
| 11,318,667 | B2 | 5/2022 | Mojdeh et al. |
| 11,370,173 | B2 | 6/2022 | Kelly et al. |
| 11,420,362 | B2 | 8/2022 | Mojdeh et al. |
| 11,511,485 | B2 | 11/2022 | Mojdeh et al. |
| 11,534,277 | B2 | 12/2022 | Chavez et al. |
| 11,554,000 | B2 | 1/2023 | Webber |
| 11,564,777 | B2 | 1/2023 | Kopelman et al. |
| 11,596,502 | B2 | 3/2023 | Webber et al. |
| 11,602,413 | B2 | 3/2023 | Chen et al. |
| 11,666,415 | B2 | 6/2023 | Wang et al. |
| 11,793,606 | B2 | 10/2023 | Cam et al. |
| 2004/0243361 | A1 | 12/2004 | Steuben et al. |
| 2005/0275129 | A1 | 12/2005 | Sambu et al. |
| 2006/0093982 | A1 | 5/2006 | Wen |
| 2006/0093987 | A1 | 5/2006 | Wen |
| 2006/0093993 | A1 | 5/2006 | Wen |
| 2006/0127850 | A1 | 6/2006 | Wen |
| 2006/0127857 | A1 | 6/2006 | Liu et al. |
| 2006/0127858 | A1 | 6/2006 | Wen |
| 2006/0127859 | A1 | 6/2006 | Wen |
| 2006/0127860 | A1 | 6/2006 | Wen |
| 2006/0172250 | A1 | 8/2006 | Wen |
| 2006/0199145 | A1 | 9/2006 | Liu et al. |
| 2007/0092853 | A1 | 4/2007 | Liu et al. |
| 2007/0243502 | A1 | 10/2007 | Wen |
| 2008/0083348 | A1 | 4/2008 | Kuo et al. |
| 2009/0148814 | A1 | 6/2009 | Li et al. |
| 2014/0061974 | A1 | 3/2014 | Tyler |
| 2014/0265034 | A1 | 9/2014 | Dudley |
| 2015/0097315 | A1 | 4/2015 | Desimone et al. |
| 2017/0135793 | A1 | 5/2017 | Webber et al. |
| 2019/0046297 | A1 | 2/2019 | Kopelman et al. |
| 2019/0298494 | A1 | 10/2019 | Webber et al. |
| 2019/0381733 | A1* | 12/2019 | Küsters .................. B29C 64/20 |
| 2020/0164590 | A1* | 5/2020 | Leung .................. B29C 64/357 |
| 2020/0290262 | A1 | 9/2020 | Aguilar Mendez et al. |
| 2021/0030516 | A1 | 2/2021 | O'Leary et al. |
| 2021/0146619 | A1 | 5/2021 | Shusteff et al. |
| 2021/0259809 | A1 | 8/2021 | O'Leary et al. |
| 2022/0227051 | A1 | 7/2022 | Regehly |

FOREIGN PATENT DOCUMENTS

| | | |
|---|---|---|
| WO | 2015075094 A1 | 5/2015 |
| WO | 2016078838 A1 | 5/2016 |
| WO | 2017115076 A1 | 7/2017 |
| WO | 2018032022 A1 | 2/2018 |
| WO | 2020070639 A1 | 4/2020 |
| WO | 2020245456 A1 | 12/2020 |
| WO | 2021087061 A2 | 5/2021 |
| WO | 2021130657 A1 | 7/2021 |
| WO | 2021130661 A1 | 7/2021 |
| WO | 2022011456 A1 | 1/2022 |
| WO | WO-2022218496 A1 * | 10/2022 ............ B29C 64/40 |

* cited by examiner

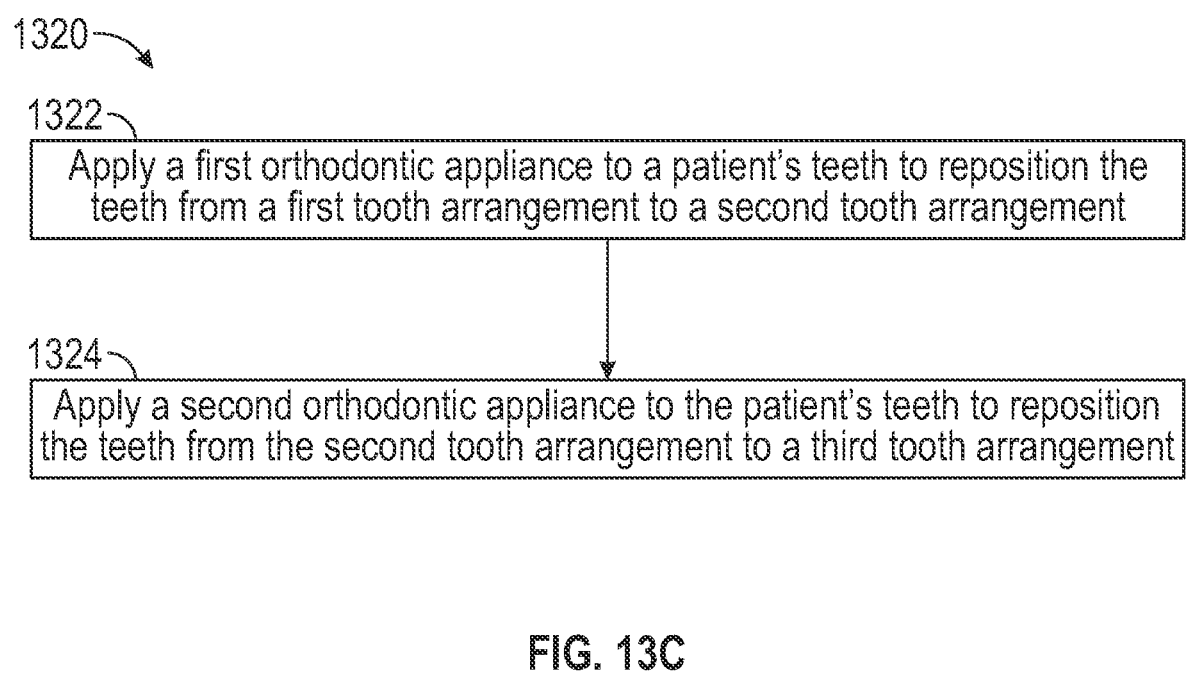

Apply a first orthodontic appliance to a patient's teeth to reposition the teeth from a first tooth arrangement to a second tooth arrangement

1324

Apply a second orthodontic appliance to the patient's teeth to reposition the teeth from the second tooth arrangement to a third tooth arrangement

FIG. 13C

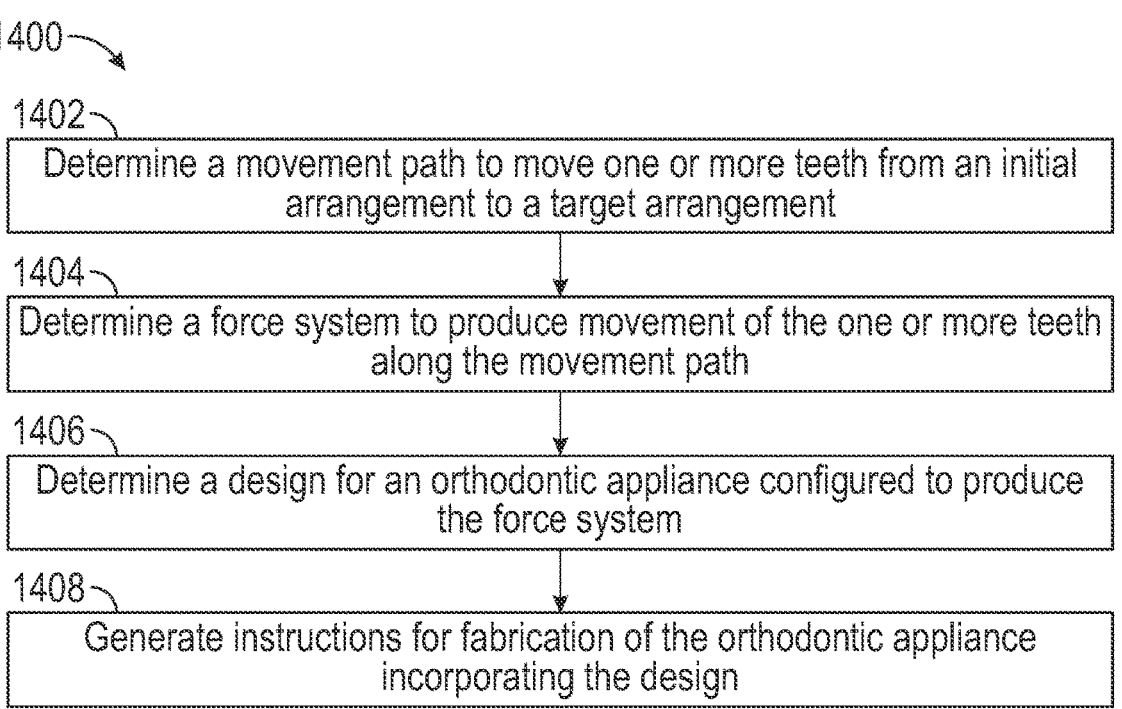

1400

1402
Determine a movement path to move one or more teeth from an initial arrangement to a target arrangement 1404
Determine a force system to produce movement of the one or more teeth along the movement path 1406
Determine a design for an orthodontic appliance configured to produce the force system 1408
Generate instructions for fabrication of the orthodontic appliance incorporating the design

FIG. 14

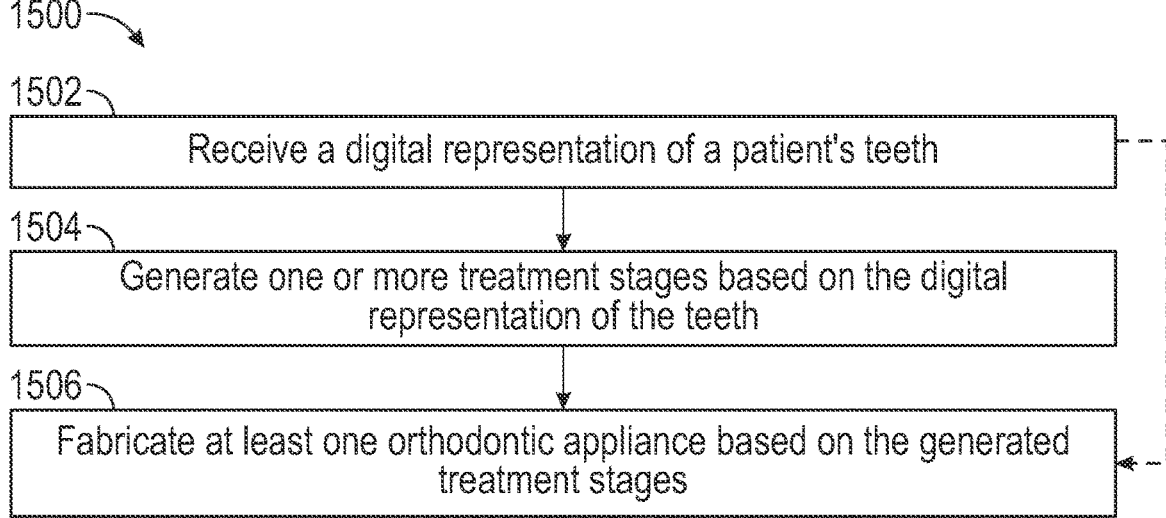

1500

1502
Receive a digital representation of a patient's teeth

1504
Generate one or more treatment stages based on the digital representation of the teeth 1506
Fabricate at least one orthodontic appliance based on the generated treatment stages

FIG. 15

PREFABRICATED SUPPORT STRUCTURES AND/OR OVERLAYS FOR ADDITIVE MANUFACTURING

CROSS-REFERENCE TO RELATED APPLICATION(S)

The present application claims the benefit of priority to U.S. Provisional Application No. 63/381,823, filed on Nov. 1, 2022, the disclosure of which is incorporated by reference herein in its entirety.

TECHNICAL FIELD

The present technology generally relates to additive manufacturing, and in particular, to prefabricated support structures and/or overlays for additive manufacturing.

BACKGROUND

Additive manufacturing encompasses a variety of technologies that involve building up 3D objects from multiple layers of material. In some instances, objects fabricated using conventional additive manufacturing systems incorporate sacrificial structures that are not intended to be in the final product, but provide mechanical support to the object during the printing process. Typically, the sacrificial structures are broken off, trimmed, or otherwise manually removed from the object after fabrication, which can be time-consuming, inefficient for large scale manufacturing, and presents a risk of damaging the object. Additionally, the removal process may leave residual fragments of the sacrificial structures on the object that may need to be removed via polishing, which introduces additional process steps into the manufacturing operation.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

FIGS. 8D and 8E are partially schematic side views of support structures of the device of FIG. 8A.

FIG. 13C illustrates a method of orthodontic treatment using a plurality of appliances, in accordance with embodiments of the present technology.

FIG. 14 illustrates a method for designing an orthodontic appliance, in accordance with embodiments of the present technology.

FIG. 15 illustrates a method for digitally planning an orthodontic treatment and/or design or fabrication of an appliance, in accordance with embodiments of the present technology.

DETAILED DESCRIPTION

Figure 1:
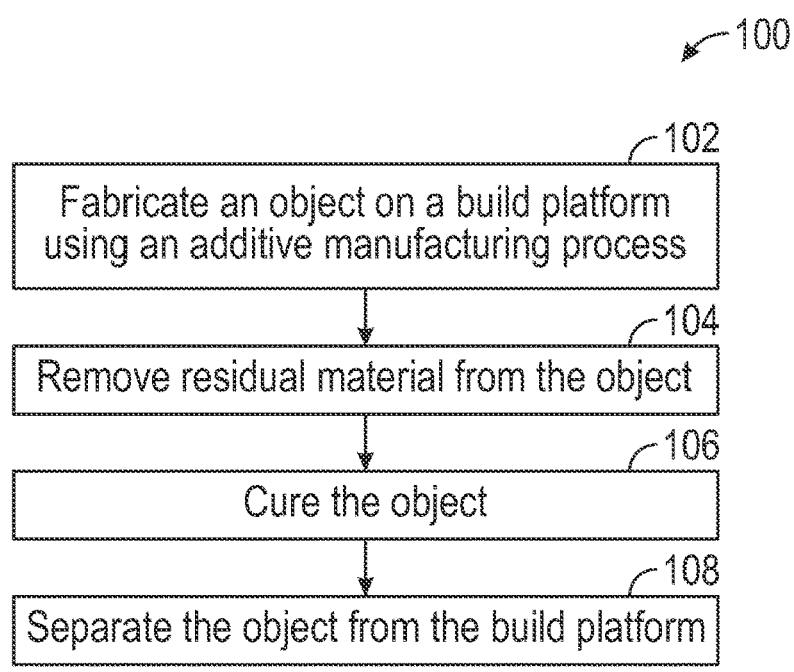
FIG. 1 is a flow diagram providing a general overview of a method for fabricating and post-processing an additively manufactured object, in accordance with embodiments of the present technology.

The present technology relates to systems, methods, and devices for additive manufacturing of objects. In one aspect of the present technology, prefabricated support structures and/or overlays for additive manufacturing are provided. In some embodiments, for example, a device for supporting an object during an additive manufacturing process includes a build platform having a surface, and a plurality of support structures (e.g., struts, posts, pillars, cones) extending above the surface of the build platform. Each support structure can be configured to couple to a portion of an additively manufactured object. The device can also include a plurality of actuators, each actuator being configured to adjust a position of a corresponding support structure relative to the build platform. For example, the actuators can adjust the heights of the support structures to accommodate the particular geometry of the object.

As another example, a device for supporting an object during an additive manufacturing process can include a build platform having a surface, and an overlay configured to be removably coupled to the surface of the build platform. The overlay can include a plurality of support structures extending above the surface of the build platform. Each support structure can be configured to couple to a portion of an additively manufactured object. In some embodiments, the support structures of the overlay are breakable, dissolvable, degradable, or otherwise removable to provide facile release of the object from the overlay and build platform.

In a further example, a device for supporting an object during an additive manufacturing process can include a build platform having a plurality of support structures. Each support structure can be configured to couple to a portion of an additively manufactured object. The device can also include an overlay configured to be removably coupled to the build platform. The overlay can include a plurality of holes, such that a portion of each support structure passes through a corresponding hole when the overlay is coupled to the build platform. The device can further include an actuator configured to adjust a height of the overlay relative to the build platform. For instance, the overlay can be raised into contact with the object to release the object from the support structures.

In another example, an assembly can include one or more additively manufactured objects, an additively manufactured overlay configured to be removably coupled to a surface of a build platform, and a plurality of additively manufactured support structures coupling the one or more additively manufactured objects to the additively manufactured overlay. The additively manufactured overlay can be configured to resist flaking during post-processing of the one or more additively manufactured objects. Alternatively or in combination, the additively manufactured overlay can include features to facilitate handling and/or post-processing of the one or more additively manufactured objects, such as handle structures, fixturing structures, identifiers, etc.

In yet another example, a system for manufacturing an object can include a printer assembly configured to form an object using an additive manufacturing process. The system can also include a build platform having or coupled to a plurality of support structures, each support structure being configured to couple to a portion of the object. The system can further include at least one sensor configured to generate sensor data indicative of a configuration of the plurality of support structures. The system can also include a controller configured to control operation of the printer assembly based on the configuration of the plurality of support structures (e.g., the heights, locations, shapes, etc., of the support structures). In some embodiments, the controller implements an algorithm that determines an alignment between the object to be printed and the support structures, based on the object geometry and the configuration of the support structures.

The present technology can provide several advantages compared to conventional additive manufacturing systems and devices, such as: (1) reducing or eliminating the need for printed supports that are integrally formed with the object, thus reducing print time and/or material usage; (2) eliminating manual post-processing steps such as polishing or trimming the object to remove printed supports, thus improving scalability for large scale manufacturing; (3) providing a facile and/or automated approach for separating the object from the build platform without damaging the object; (4) protecting the surface of the build platform from contamination; (5) customizing the geometries of the support structures to the particular object being printed, thus allowing for more complex object geometries and/or more efficient printing; (6) inhibiting formation of flakes and/or debris during post-processing that may contaminate the printed object; and/or (7) providing a substrate for handling, fixturing, and/or tracking the object during post-processing.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

As used herein, the terms "vertical," "lateral," "upper," and "lower," "left," "right," etc., can refer to relative directions or positions of features of the embodiments disclosed herein in view of the orientation shown in the Figures. For example, "upper" or "uppermost" can refer to a feature positioned closer to the top of a page than another feature. These terms, however, should be construed broadly to include embodiments having other orientations, such as inverted or inclined orientations where top/bottom, over/under, above/below, up/down, and left/right can be interchanged depending on the orientation.

The headings provided herein are for convenience only and do not interpret the scope or meaning of the claimed present technology. Embodiments under any one heading may be used in conjunction with embodiments under any other heading.

I. Overview of Additive Manufacturing Technology

FIG. 1 is a flow diagram providing a general overview of a method 100 for fabricating and post-processing an additively manufactured object, in accordance with embodiments of the present technology. The method 100 can be used to produce many different types of additively manufactured objects, such as orthodontic appliances (e.g., aligners, palatal expanders, retainers, attachment placement devices, attachments), restorative objects (e.g., crowns, veneers, implants), and/or other dental appliances (e.g., oral sleep apnea appliances, mouth guards). Additional examples of dental appliances and associated methods that are applicable to the present technology are described in Section III below.

The method 100 begins at block 102 with fabricating an object on a build platform using an additive manufacturing process. The additive manufacturing process can implement any suitable technique known to those of skill in the art. Additive manufacturing (also referred to herein as "3D printing") includes a variety of technologies which fabricate 3D objects directly from digital models through an additive process. In some embodiments, additive manufacturing includes depositing a precursor material onto a build platform. The precursor material can be cured, polymerized, melted, sintered, fused, and/or otherwise solidified to form a portion of the object and/or to combine the portion with previously formed portions of the object. In some embodiments, the additive manufacturing techniques provided herein build up the object geometry in a layer-by-layer fashion, with successive layers being formed in discrete build steps. Alternatively or in combination, the additive manufacturing techniques described herein can allow for continuous build-up of an object geometry.

Examples of additive manufacturing techniques include, but are not limited to, the following: (1) vat photopolymerization, in which an object is constructed from a vat or other bulk source of liquid photopolymer resin, including techniques such as stereolithography (SLA), digital light processing (DLP), continuous liquid interface production (CLIP), two-photon induced photopolymerization (TPIP), and volumetric additive manufacturing; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) material extrusion, in which material is drawn though a nozzle, heated, and deposited layer-by-layer, such as fused deposition modeling (FDM) and direct ink writing (DIW); (5) powder bed fusion, including techniques such as direct metal laser sintering (DMLS), electron beam melting (EBM), selective heat sintering (SHS), selective laser melting (SLM), and selective laser sintering (SLS); (6) sheet lamination, including techniques such as laminated object manufacturing (LOM) and ultrasonic additive manufacturing (UAM); and (7) directed energy deposition, including techniques such as laser engineering net shaping, directed light fabrication, direct metal deposition, and 3D laser cladding. Optionally, an additive manufacturing process can use a combination of two or more additive manufacturing techniques.

For example, the additively manufactured object can be fabricated using vat photopolymerization process in which light is used to selectively cure a vat or other bulk source of a curable material (e.g., a polymeric resin). Each layer of curable material can be selectively exposed to light in a single exposure (e.g., DLP) or by scanning a beam of light across the layer (e.g., SLA). Vat polymerization can be performed in a "top-down" or "bottom-up" approach, depending on the relative locations of the material source, light source, and build platform.

As another example, the additively manufactured object can be fabricated using high temperature lithography (also known as "hot lithography"). High temperature lithography can include any photopolymerization process that involves heating a photopolymerizable material (e.g., a polymeric resin). For example, high temperature lithography can involve heating the material to a temperature of at least 30° C., 40° C., 50° C., 60° C., 70° C., 80° C., 90° C., 100° C., 110° C., or 120° C. In some embodiments, the material is heated to a temperature within a range from 50° C. to 120° C., from 90° C. to 120° C., from 100° C. to 120° C., from 105° C. to 115° C., or from 105° C. to 110° C. The heating can lower the viscosity of the photopolymerizable material before and/or during curing, and/or increase reactivity of the photopolymerizable material. Accordingly, high temperature lithography can be used to fabricate objects from highly viscous and/or poorly flowable materials, which, when cured, may exhibit improved mechanical properties (e.g., stiffness, strength, stability) compared to other types of materials. For example, high temperature lithography can be used to fabricate objects from a material having a viscosity of at least 5 Pa-s, 10 Pa-s, 15 Pa-s, 20 Pa-s, 30 Pa-s, 40 Pa-s, or 50 Pa-s at 20° C. Representative examples of high-temperature lithography processes that may be incorporated in the methods herein are described in International Publication Nos. WO 2015/075094, WO 2016/078838, WO 2018/032022, WO 2020/070639, WO 2021/130657, and WO 2021/130661, the disclosures of each of which are incorporated herein by reference in their entirety.

In some embodiments, the additively manufactured object is fabricated using continuous liquid interphase production (also known as "continuous liquid interphase printing") in which the object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Representative examples of continuous liquid interphase production processes that may be incorporated in the methods herein are described in U.S. Patent Application Publication Nos. 2015/0097315, 2015/0097316, and 2015/0102532, the disclosures of each of which are incorporated herein by reference in their entirety.

As another example, a continuous additive manufacturing method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety. In another example, a continuous additive manufacturing method can involve extruding a composite material composed of a curable liquid material surrounding a solid strand. The composite material can be extruded along a continuous three-dimensional path in order to form the object. Such methods are described in U.S. Pat. No. 10,162,264 and U.S. Patent Application Publication No. 2014/0061974, the disclosures of which are incorporated herein by reference in their entirety. In yet another example, a continuous additive manufacturing method can utilize a "heliolithography" approach in which the liquid photopolymer is cured with focused radiation while the build platform is continuously rotated and raised. Accordingly, the object geometry can be continuously built up along a spiral build path. Such methods are described in U.S. Patent Application Publication No. 2014/0265034, the disclosure of which is incorporated herein by reference in its entirety.

In a further example, the additively manufactured object can be fabricated using a volumetric additive manufacturing (VAM) process in which an entire object is produced from a 3D volume of resin in a single print step, without requiring layer-by-layer build up. During a VAM process, the entire build volume is irradiated with energy, but the projection patterns are configured such that only certain voxels will accumulate a sufficient energy dosage to be cured. Representative examples of VAM processes that may be incorporated into the present technology include tomographic volumetric printing, holographic volumetric printing, multiphoton volumetric printing, and xolography. For instance, a tomographic VAM process can be performed by projecting 2D optical patterns into a rotating volume of photosensitive material at perpendicular and/or angular incidences to produce a cured 3D structure. A holographic VAM process can be performed by projecting holographic light patterns into a stationary reservoir of photosensitive material. A xolography process can use photoswitchable photoinitiators to induce local polymerization inside a volume of photosensitive material upon linear excitation by intersecting light beams of different wavelengths. Additional details of VAM processes suitable for use with the present technology are described in U.S. Pat. No. 11,370,173, U.S. Patent Application Publication No. 2021/0146619, U.S. Patent Application Publication No. 2022/0227051, International Publication No. WO 2017/115076, International Publication No. WO 2020/245456, International Publication No. WO 2022/011456, and U.S. Provisional Patent Application No. 63/181,645, the disclosures of each of which are incorporated herein by reference in their entirety.

In yet another example, the additively manufactured object can be fabricated using a powder bed fusion process (e.g., selective laser sintering) involving using a laser beam to selectively fuse a layer of powdered material according to a desired cross-sectional shape in order to build up the object geometry. As another example, the additively manufactured object can be fabricated using a material extrusion process (e.g., fused deposition modeling) involving selectively depositing a thin filament of material (e.g., thermoplastic polymer) in a layer-by-layer manner in order to form an object. In yet another example, the additively manufactured object can be fabricated using a material jetting process involving jetting or extruding one or more materials onto a build surface in order to form successive layers of the object geometry.

The additively manufactured object can be made of any suitable material or combination of materials. As discussed above, in some embodiments, the additively manufactured object is made partially or entirely out of a polymeric material, such as a curable polymeric resin. The resin can be composed of one or more monomer components that are initially in a liquid state. The resin can be in the liquid state at room temperature (e.g., 20° C.) or at an elevated temperature (e.g., a temperature within a range from 50° C. to 120° C.). When exposed to energy (e.g., light), the monomer components can undergo a polymerization reaction such that the resin solidifies into the desired object geometry. Representative examples of curable polymeric resins and other materials suitable for use with the additive manufacturing techniques herein are described in International Publication Nos. WO 2019/006409, WO 2020/070639, and WO 2021/087061, the disclosures of each of which are incorporated herein by reference in their entirety.

Optionally, the additively manufactured object can be fabricated from a plurality of different materials (e.g., at least two, three, four, five, or more different materials). The materials can differ from each other with respect to composition, curing conditions (e.g., curing energy wavelength), material properties before curing (e.g., viscosity), material properties after curing (e.g., stiffness, strength, transparency), and so on. In some embodiments, the additively manufactured object is formed from multiple materials in a single manufacturing step. For instance, a multi-tip extrusion apparatus can be used to selectively dispense multiple types of materials from distinct material supply sources in order to fabricate an object from a plurality of different materials. Examples of such methods are described in U.S. Pat. Nos. 6,749,414 and 11,318,667, the disclosures of which are incorporated herein by reference in their entirety. Alternatively or in combination, the additively manufactured object can be formed from multiple materials in a plurality of sequential manufacturing steps. For instance, a first portion of the object can be formed from a first material in accordance with any of the fabrication methods herein, then a second portion of the object can be formed from a second material in accordance with any of the fabrication methods herein, and so on, until the entirety of the object has been formed.

After the additively manufactured object is fabricated, the object can undergo one or more additional process steps, also referred to herein as "post-processing." As described in detail below with respect to blocks 104-108, post-processing can include removing residual material from the object, curing the object, and/or separating the object from the build platform.

For example, at block 104, the method 100 continues with removing residual material from the object. The excess material can include excess precursor material (e.g., uncured resin) and/or other unwanted material (e.g., debris) that remains on or within the object after the additive manufacturing process. The residual material can be removed in many different ways, such as by exposing the object to a solvent (e.g., via spraying, immersion), heating or cooling the object, applying a vacuum to the object, blowing a pressurized gas onto the object, applying mechanical forces to the object (e.g., vibration, agitation, centrifugation, tumbling, brushing), and/or other suitable techniques. Optionally, the residual material can be collected and/or processed for reuse.

At block 106, the method 100 can optionally include curing the object. This additional curing step (also known as "post-curing") can be used in situations where the object is still in a partially cured "green" state after fabrication. For example, the energy used to fabricate the object in block 102 may only partially polymerize the precursor material forming the object. Accordingly, the post-curing step may be needed to fully cure (e.g., fully polymerize) the object to its final, usable state. Post-curing can provide various benefits, such as improving the mechanical properties (e.g., stiffness, strength) and/or temperature stability of the object. Post-curing can be performed by heating the object, applying radiation (e.g., UV, visible, microwave) to the object, or suitable combinations thereof. In other embodiments, however, the post-curing process of block 106 is optional and can be omitted.

At block 108, the method 100 can include separating the object from the build platform. The build platform can mechanically support the object during fabrication and/or the post-processing steps described herein. The object can be connected to the build platform via a sacrificial region of material (e.g., supports and/or a raft), and/or can be directly connected to the build platform without any sacrificial regions. In some embodiments, the build platform includes one or more prefabricated support structures, or can be coupled to an overlay including one or more prefabricated support structures, and the object can be fabricated on the support structures rather than directly on the surface of the build platform. This approach can facilitate removal of the object from the build platform, as described in detail in Section II below.

The method 100 illustrated in FIG. 1 can be modified in many different ways. For example, although the above steps of the method 100 are described with respect to a single object, the method 100 can be used to sequentially or concurrently fabricate and post-process any suitable number of objects, such as tens, hundreds, or thousands of additively manufactured objects. As another example, the ordering of the processes shown in FIG. 1 can be varied (e.g., the process of block 108 can be performed before and/or concurrently with the processes of blocks 104 and/or 106). Some of the processes of the method 100 can be omitted, such as the process of block 106.

Additionally, the method 100 can include processes not shown in FIG. 1, such as cleaning the object (e.g., washing, solvent extraction), annealing the object, trimming the object to remove structures that are not intended to be present in the final product, and/or packaging the object for shipment. Optionally, the method 100 can include modifying at least one surface of the object. The surface modifications can be applied to some or all of the surfaces of the object (e.g., the exterior and/or interior surfaces) to alter one or more surface characteristics, such as the surface finish (e.g., roughness, waviness, lay), porosity, visual appearance (e.g., gloss, transparency, visibility of print lines), hydrophobicity, and/or chemical reactivity. In some embodiments, the surface modifications include removing material from the object, e.g., by polishing, abrading, blasting, etc. Alternatively or in combination, the surface modifications can include applying an additional material to the object. For example, the additional material can be a coating, such as a polymeric coating. The coating can be applied to one or more surfaces of the object for various purposes, including, but not limited to: providing a smooth surface finish, which can be beneficial for aesthetics and/or to improve user comfort if the object is intended to be in contact with the user's body (e.g., an orthodontic appliance worn on the teeth); coloring and/or applying other aesthetic features to the object; improving scratch resistance and/or other mechanical properties; providing antimicrobial properties; and incorporating therapeutic agents into the object for controlled release.

Figure 2:
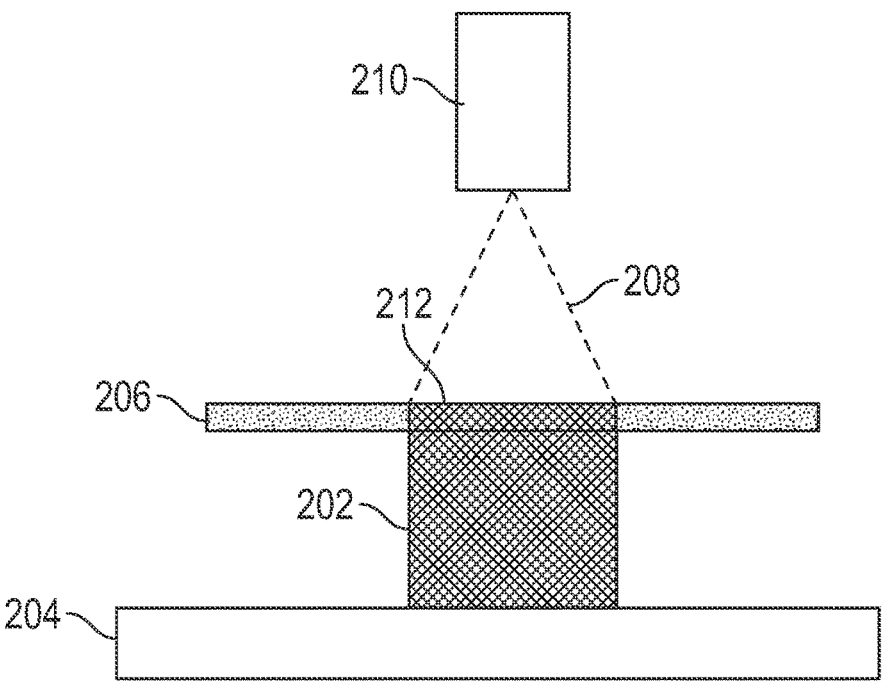
FIG. 2 is a partially schematic diagram providing a general overview of an additive manufacturing process, in accordance with embodiments of the present technology.

FIG. 2 is a partially schematic diagram providing a general overview of an additive manufacturing process, in accordance with embodiments of the present technology. In the illustrated embodiment, an object 202 is fabricated on a build platform 204 (e.g., a print bed, tray, plate, film, sheet, or other planar substrate) from a series of cured material layers, with each layer having a geometry corresponding to a respective cross-section of the object 202. To fabricate an individual object layer, a layer of uncured material 206 (e.g., polymerizable resin) is brought into contact with the build platform 204 (when fabricating the first layer of the object 202) or with the previously formed portion of the object 202 on the build platform 204 (when fabricating subsequent layers of the object 202). In some embodiments, the uncured material 206 is formed on and supported by a substrate (not shown), such as a film. Energy 208 (e.g., light) from an energy source 210 (e.g., a laser, projector, or light engine) is then applied to the uncured material 206 to form a cured material layer 212 on the build platform 204 or on the object 202. The remaining uncured material 206 can then be moved away from the build platform 204 (e.g., by lowering the build platform 204 and/or by raising the uncured material 206), thus leaving the cured material layer 212 in place on the build platform 204 and/or object 202. The fabrication process can then be repeated with a fresh layer of uncured material 206 to build up the next layer of the object 202.

The illustrated embodiment shows a "top down" configuration in which the energy source 210 is positioned above and directs the energy 208 down toward the build platform 204, such that the object 202 is formed on the upper surface of the build platform 204. Accordingly, the build platform 204 can be incrementally lowered relative to the energy source 210 as successive layers of the object 202 are formed. In other embodiments, however, the additive manufacturing process of FIG. 2 can be performed using a "bottom up" configuration in which the energy source 210 is positioned below and directs the energy 208 up toward the build platform 204, such that the object 202 is formed on the lower surface of the build platform 204. Accordingly, the build platform 204 can be incrementally raised relative to the energy source 210 as successive layers of the object 202 are formed.

Although FIG. 2 illustrates a representative example of an additive manufacturing process, this is not intended to be limiting, and the embodiments described herein can be adapted to other types of additive manufacturing systems (e.g., vat-based systems) and/or other types of additive manufacturing processes (e.g., material jetting, binder jetting, FDM, powder bed fusion, sheet lamination, directed energy deposition).

II. Prefabricated Support Structures and/or Overlays for Additive Manufacturing

A. Build Platforms with Adjustable Structures

In some embodiments, the present technology provides devices including a build platform for supporting an object during an additive manufacturing process (e.g., an additive manufacturing process as described in Section I above). The build platform can include one or more adjustable structures that can be moved into different configurations relative to the surface of the build platform, such as different heights, angles, etc. The adjustable structures can serve various functions, such as providing attachment points or regions for an object fabricated on the build platform, introducing components into the object, carrying sensors for monitoring the object, applying energy to the object, or suitable combinations thereof.

For example, the adjustable structures can be or include support structures for use in an additive manufacturing process. The support structures described herein can be prefabricated components that couple to and provide mechanical support for one or more portions of an additively manufactured object, such as overhangs, bridges, islands, valleys, and/or other components that would deform or collapse without such support. Additionally, the support structures herein can improve robustness of the additive manufacturing process to non-planarity of the build platform surface and/or misalignment between the build platform surface and the printing plane of the additive manufacturing system (e.g., if the build platform surface is tilted relative to the printing plane). The support structures herein can also facilitate removal of the object from the build platform. For example, in some embodiments, the support structures allow the object to be separated from the build platform without breaking, trimming, or otherwise removing any parts of the object, thus reducing the likelihood of damage to the object during processing.

Accordingly, the use of adjustable support structures and/or other types of adjustable structures as described herein can provide various benefits, such as: (1) reducing or eliminating the need for printed supports that are integrally formed with the object, (2) providing a fast and easy way for the object to be separated from the build platform without damaging the object, (3) reducing or eliminating the need for manually polishing or trimming the object after fabrication, and/or (4) providing additional functionalities to enhance the additive manufacturing process and/or the use of the object.

Figure 3A:
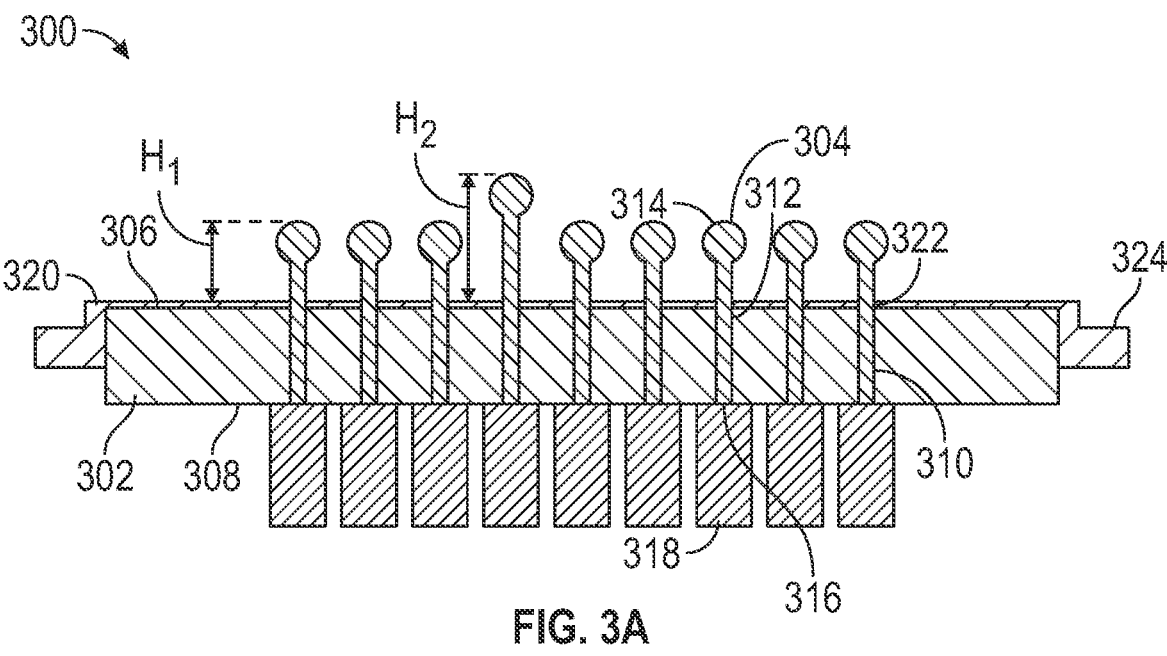
FIG. 3A is a partially schematic side cross-sectional view of a device for supporting an object during an additive manufacturing process, in accordance with embodiments of the present technology.
Figure 3B:
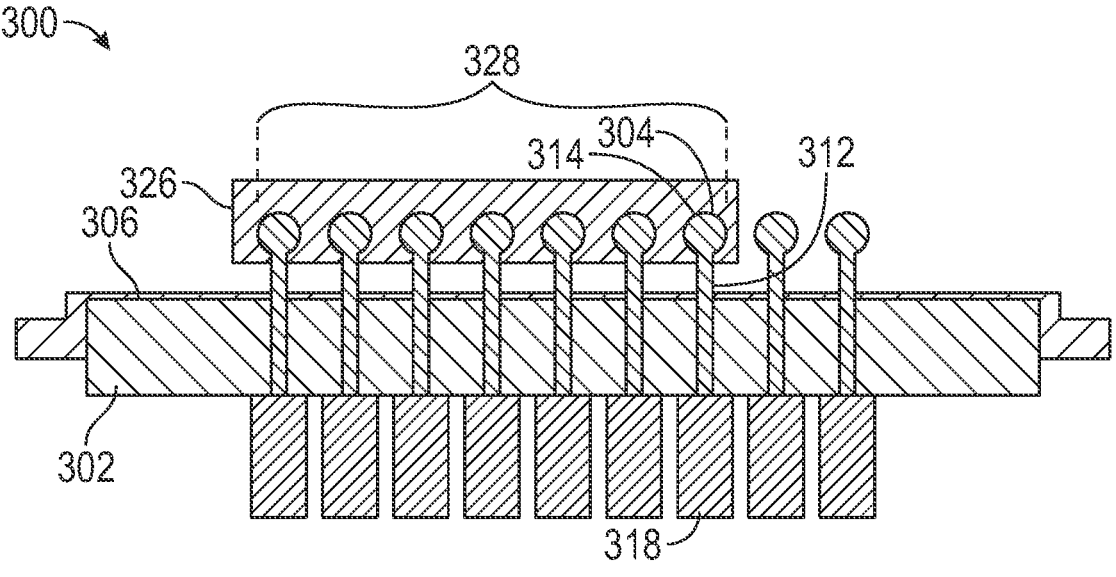
FIGS. 3B-3D are partially schematic side cross-sectional views of the device of FIG. 3A during an additive manufacturing operation.
Figure 3C:
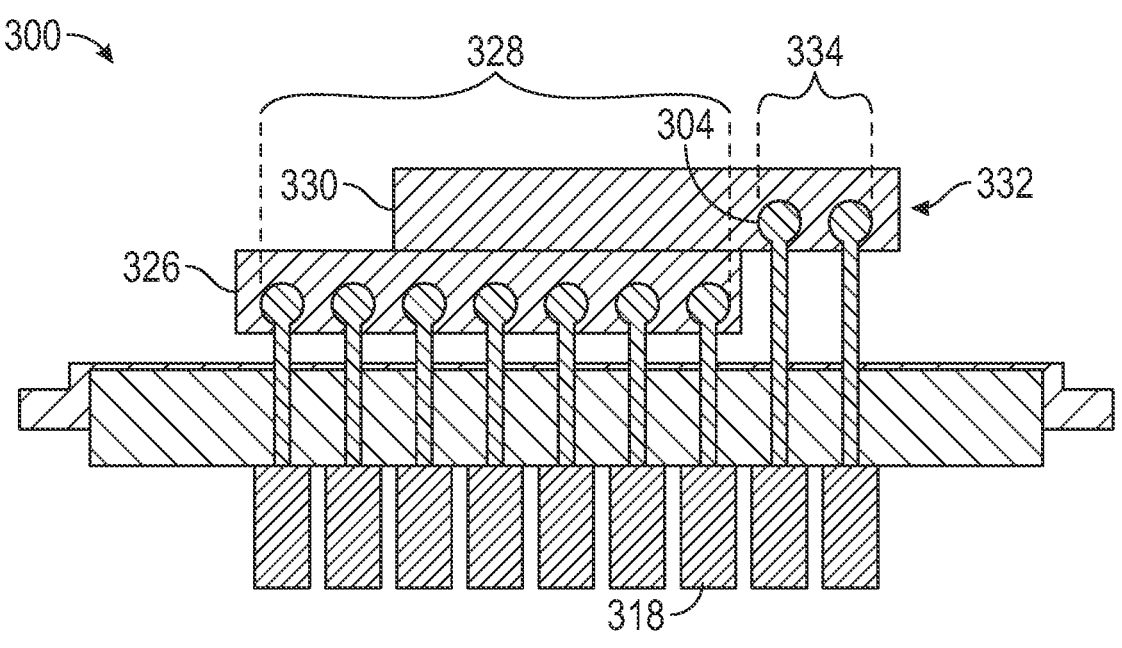
Figure 3D:
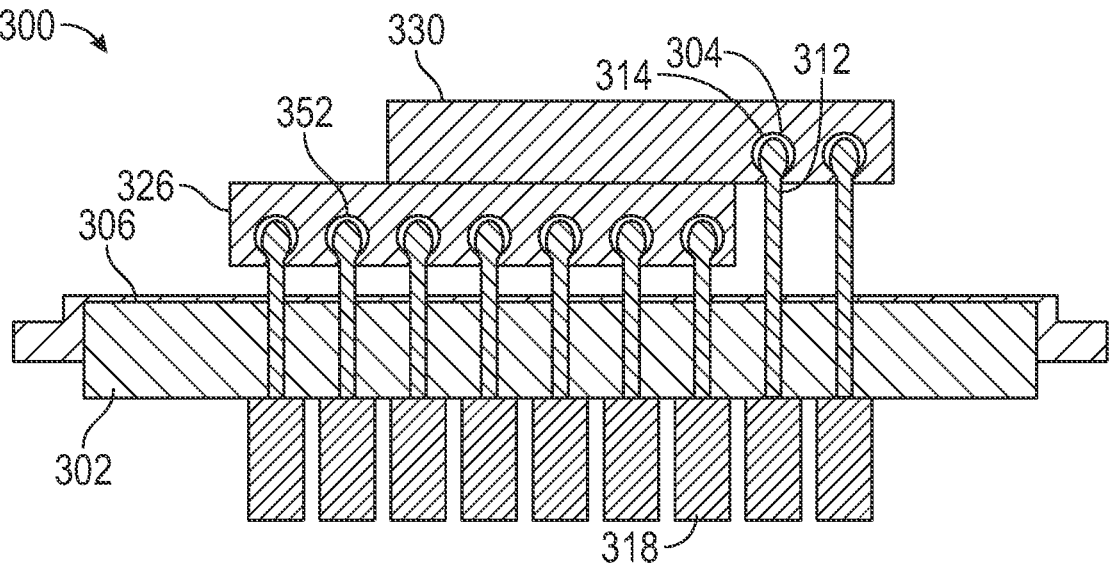
Figure 3E:
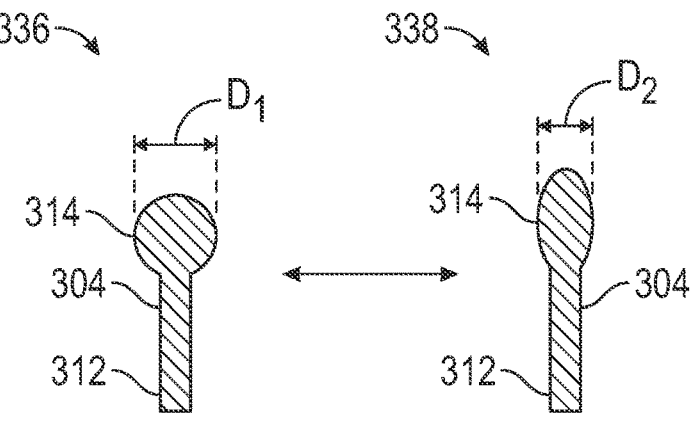
FIGS. 3E-3G are partially schematic side cross-sectional views of support structures of the device of FIG. 3A.
Figure 3F:
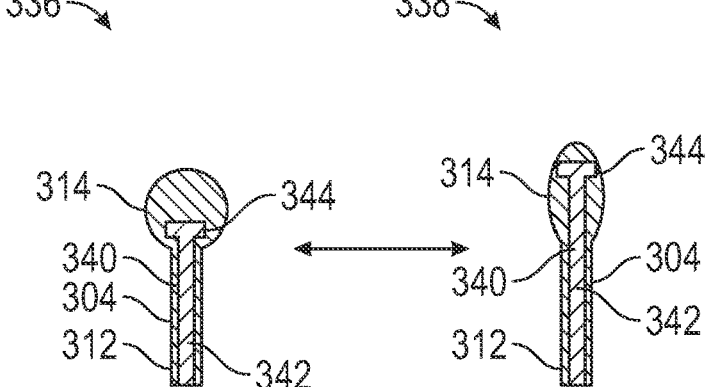
Figure 3G:
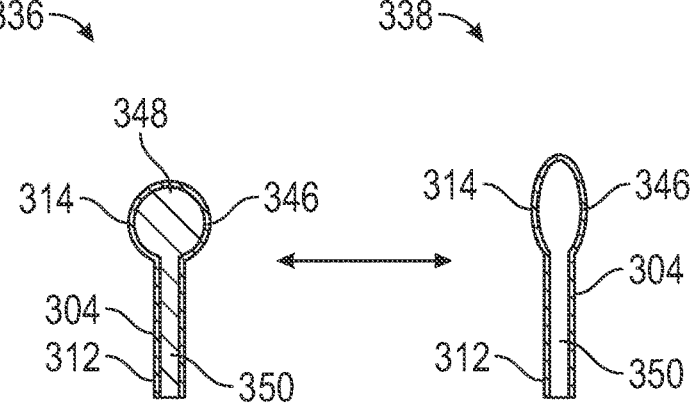

FIGS. 3A-3G illustrate a device 300 for supporting an object during an additive manufacturing process, in accordance with embodiments of the present technology. Specifically, FIG. 3A is a partially schematic side cross-sectional view of the device 300, FIGS. 3B-3D are partially schematic side cross-sectional views of the device 300 during an additive manufacturing operation, and FIGS. 3E-3G are partially schematic side cross-sectional views of support structures 304 of the device 300.

Referring first to FIG. 3A, the device 300 includes a build platform 302 with a plurality of adjustable support structures 304. The build platform 302 can be a generally planar substrate (e.g., a print bed, tray, plate, film, sheet) made out of a relatively rigid and/or stiff material, such as a metal (e.g., steel, aluminum, brass, copper, titanium), a ceramic, a polymer (e.g., thermoformed or thermoset polymer), a composite, or suitable combinations thereof. The build platform 302 includes a first surface 306, a second surface 308, and a plurality of passages 310 (e.g., holes, channels, perforations) extending through the thickness of the build platform 302 from the first surface 306 to the second surface 308. The first surface 306 can be oriented toward the object to be fabricated and/or toward a printer assembly of an additive manufacturing system (not shown). In the illustrated embodiment, for example, the first surface 306 is an upper surface and the additive manufacturing system can be configured to fabricate the object in a top-down process. Alternatively, the first surface 306 can be a bottom surface and the additive manufacturing system can be configured to fabricate the object in a bottom-up process.

The support structures 304 can be elongate members (e.g., struts, posts, rods, pins, pillars) extending through the build platform 302 and at least partially above the first surface 306 of the build platform 302. The device 300 can include any suitable number of support structures 304, such as at least 10, 20, 30, 40, 50, 60, 70, 80, 90, 100, or more support structures 304. The support structures 304 can be arranged in any suitable configuration, such as a 2D array. In such embodiments, the array can have any suitable shape, such as square, rectangular, diamond, circular, oval, triangular, U-shaped, polygonal, or combinations thereof. The dimensions of the array (e.g., length, width, pitch) can also be varied as desired. For example, the pitch can be sufficiently small to provide mechanical support to the object, but also sufficiently large to allow individual support structures 304 to be actuated, as described further below. In some embodiments, the geometry of the array is customized to the particular object to be fabricated, e.g., the shape and/or dimensions of the array can conform to the shape and/or dimensions of the object. Alternatively, the geometry of the array can be generic.

As shown in FIG. 3A, each support structure 304 includes an elongate body 312 having a first end portion 314 (e.g., an upper end) and a second end portion 316 (e.g., a lower end) opposite the first end portion 314. The body 312 can be received at least partially within a corresponding passage 310 of the build platform 302. Optionally, the body 312 and/or the passage 310 can include a lubricious coating to allow the support structure 304 to slide smoothly relative to the build platform 302, as described further below. The first end portion 314 can be positioned above the first surface 306 of the build platform 302. The second end portion 316 can be positioned at or proximate to the second surface 308 of the build platform 302. Although the support structures 304 are shown as being parallel to each other, in other embodiments, some or all of the support structures 304 can be at an angle to each other. Additionally, although the support structures 304 are depicted as being orthogonal to the first surface 306 of the build platform 302, in other embodiments, some or all of the support structures 304 can be at a different angle relative to the first surface 306, such as an angle less than or equal to 80°, 70°, 60°, 50°, 45°, 40°, 30°, 20°, or 10°.

In some embodiments, the first end portion 314 is wider than the body 312 and/or the second end portion 316 of the support structure 304. For example, the first end portion 314 can have a width and/or diameter of at least 0.5 mm, 1 mm, 2 mm, 3 mm, 4 mm, 5 mm, 6 mm, 7 mm, 8 mm, 9 mm, or 10 mm. The body 312 and/or the second end portion 316 can each have a width and/or a diameter less than 5 mm, 4 mm, 3 mm, 2 mm, 1 mm, or 0.5 mm. This configuration can be advantageous to increase the surface area of the first end portion 314 for coupling to the object, which can improve adhesion of the object to the support structures 304 as described further below. In other embodiments, however, the first end portion 314 can have the same width as the body 312 and/or the second end portion 316, or the first end portion 314 can be narrower than the body 312 and/or the second end portion 316. Additionally, although the first end portion 314 is illustrated as having a rounded cross-sectional shape (e.g., a circular or oval shape), in other embodiments, the first end portion 314 can have a different shape (e.g., square, rectangular, diamond, triangular, polygonal). Representative examples of geometries for the first end portion 314 and the support structure 304 are described further below.

The support structures 304 can be made out of any suitable material, such as a metal (e.g., steel, aluminum, brass, copper, titanium), a ceramic, a polymer (e.g., thermoformed or thermoset polymer), a composite, or suitable combinations thereof. In some embodiments, the first end portion 314 is made out of a different material than the body 312 and/or the second end portion 316. For example, the first end portion 314 can be made partially or entirely out of a relatively low modulus and/or deformable material (e.g., silicone, rubber, or another polymer), while the body 312 and/or the second end portion 316 can each be made partially or entirely out of a relatively high modulus and/or stiff material (e.g., steel, aluminum, or another metal). As another example, the first end portion 314 can be made partially or entirely out of a material that exhibits relatively high adhesion to the precursor material used to form the object, while the body 312 and/or the second end portion 316 can be made partially or entirely out of a material that exhibits relatively low adhesion to the precursor material (e.g., a siloxane or fluorinated material). In other embodiments, the first end portion 314 can be made out of the same material as the body 312 and/or the second end portion 316.

The device 300 can also include a plurality of actuators 318 (e.g., linear actuators) coupled to the plurality of support structures 304. For example, the actuators 318 can be or include motors, pistons, hydraulics, compressed air, magnets, and/or any other mechanism suitable for moving the support structures 304, as described further below. In the illustrated embodiment, each actuator 318 is coupled to a single corresponding support structure 304. Each actuator 318 can be positioned at or proximate to the second surface 308 of the build platform 302, and can be connected to the second end portion 316 of the corresponding support structure 304. Optionally, some or all of the actuators 318 can be coupled to multiple support structures 304 (e.g., two, three, four, five, or more support structures 304), some or all of the support structures 304 can be coupled to multiple actuators 318 (e.g., two, three, four, five, or more actuators 318), and/or some of the support structures 304 may not be coupled to any actuators 318.

The actuators 318 can be configured to adjust the position of the corresponding support structures 304 relative to the first surface 306 of the build platform 302. In some embodiments, the actuators 318 adjust the heights of the support structures 304 above the first surface 306, e.g., within a range from a first (e.g., minimum) height $H_1$ to a second (e.g., maximum) height $H_2$. In some embodiments, the first height $H_1$ is no more than 10 mm, 9 mm, 8 mm, 7 mm, 6 mm, 5 mm, 4 mm, 3 mm, 2 mm, or 1 mm above the first surface 306. Optionally, the first height $H_1$ can be the same height as the first surface 306 (e.g., 0 mm above the first surface 306), such that the actuators 318 can retract the support structures 304 to be flush and/or aligned with the first surface 306. In some embodiments, the first height is below the first surface 306 (e.g., by at least 1 mm, 2 mm, 3 mm, 4 mm, 5 mm, 6 mm, 7 mm, 8 mm, 9 mm, or 10 mm), such that the actuators 318 can fully retract the support structures 304 into the build platform 302. The second height $H_2$ can be greater than the first height $H_1$, such as at least 1 mm, 5 mm, 10 mm, 15 mm, or 20 mm greater. In some embodiments, the second height $H_2$ is at least 5 mm, 10 mm, 15 mm, 20 mm, 25 mm, 30 mm, 35 mm, 40 mm, 45 mm, or 50 mm above the first surface 306 of the build platform 302.

Alternatively or in combination, the actuators 318 can adjust other parameters of the support structures 304, such as the angle of the support structures 304 relative to the first surface 306. In some embodiments, each support structure 304 can be adjusted independently, while in other embodiments, a subset of the support structures 304 can be linked so that the same adjustment is made to each of the support structures 304 of the subset concurrently. Optionally, some of the support structures 304 may not be adjustable, and can remain in a fixed position relative to first surface 306 of the build platform 302.

The actuators 318 can be communicably coupled to a controller (not shown). For example, the controller can be or include a computing device including one or more processors and memory storing instructions for controlling the operation of the device 300. The controller can transmit signals to cause the actuators 318 to adjust the positions of one or more of the support structures 304. In some embodiments, the signals indicate a selected set of support structures 304 to be actuated, and a target position for each of the selected support structures 304. The selection and positions of the support structures 304 can be determined based on the geometry of the particular object being fabricated (e.g., the geometry of the current object layer to be formed), as described further below.

Optionally, the device 300 can include an overlay 320 covering a part of or the entire first surface 306 of the build platform 302. The overlay 320 can be a generally planar substrate (e.g., a plate, film, sheet, liner) and can include a plurality of holes 322 (e.g., perforations) corresponding to the locations of the support structures 304, such that each support structure 304 can pass through a corresponding hole 322. The overlay 320 can be coupled to the build platform 302 at one or more locations using adhesives, fasteners, snap fit, interference fit, or any other suitable attachment mechanism. Optionally, the overlay 320 can include one or more tabs 324 to facilitate coupling and decoupling the overlay 320 from the build platform 302.

In some embodiments, the overlay 320 is configured to protect the first surface 306 of the build platform 302. For example, the overlay 320 can serve as a barrier between the first surface 306 of the build platform 302 and the precursor material used to form the object, such that the precursor material cannot penetrate into the passages 310 and obstruct the support structures 304. The overlay 320 can also prevent residual precursor material from adhering to the first surface 306, which could cause contamination when fabricating subsequent objects. In some embodiments, the overlay 320 is removable, and can be cleaned and/or replaced between printing operations. Optionally, the overlay 320 can serve as a removal tool for releasing the object from the build platform 302, as described in Section MB below.

The overlay 320 can be made out of any suitable material, such as a high modulus material (e.g., metal, a high modulus polymer), a low modulus material (e.g., an elastomer), or suitable combinations thereof. Optionally, the overlay 320 can be made out of a flexible material that provides a fluid-tight seal against the support structures 304 and/or the first surface 306 of the build platform 302. In some embodiments, the overlay 320 is made out of a protective material (e.g., a siloxane, a fluorinated material) and/or includes a coating of protective material that resists adhesion to the precursor material and/or other contaminants. In other embodiments, the overlay 320 can be omitted, and the protective coating can be located on the first surface 306 of the build platform 302 instead.

Optionally, the device 300 can include actuators that move parts of the overlay 320. For instance, one or more of the support structures 304 can be configured as pistons that engage the lower surface of the overlay 320, rather than passing through the hole 322 in the overlay 320. The support structures 304 can be moved by the corresponding actuators 318 to lift selected regions of the overlay 320 away from the first surface 306 of the build platform 302, thus changing the shape (e.g., surface topography) of the overlay 320. In such embodiments, the overlay 320 can be made out of a material that is flexible and/or deformable to accommodate such shape changes. In some embodiments, the overlay 320 itself can include prefabricated support structures, as described in Section II.C below.

FIG. 3B illustrates the device 300 during a first stage of an additive manufacturing process in which a first portion of an object ("first object portion 326") is formed. In some embodiments, some or all of the support structures 304 are positioned at a first height (e.g., height $H_1$) above the first surface 306 of the build platform 302. The first object portion 326 (e.g., a first layer) can then be formed on a first subset 328 of the support structures 304. For instance, the first subset 328 can be those support structures 304 that lie within or proximate to the footprint of the first object portion 326 on the build platform 302 (e.g., have the same or similar x- and/or y-coordinates as the first object portion 326). The first object portion 326 can be formed using any suitable additive manufacturing technique, such as any of the techniques described herein. For example, the first object portion 326 can be formed by applying a precursor material (e.g., a polymerizable resin) onto the support structures 304 and/or build platform 302, then applying energy to the regions of the precursor material proximate to the first subset 328 of the support structures 304 to cure or otherwise solidify the precursor material into the first object portion 326.

As shown in FIG. 3B, the first object portion 326 can contact and/or surround the first end portions 314 of the first subset 328 of the support structures 304. Optionally, the first object portion 326 can also contact and/or surround parts of the bodies 312 of the first subset 328. The first object portion 326 can be spaced apart from the first surface 306 of the build platform 302 and/or from the overlay 320 (if present), such that the first object portion 326 does not contact the first surface 306 and/or the overlay 320. For example, the sepa- ration distance between the first object portion 326 and the first surface 306 and/or the overlay 320 can be at least 0.5 mm, 1 mm, 2 mm, 3 mm, 4 mm, 5 mm, 6 mm, 7 mm, 8 mm, 9 mm, or 10 mm. The separation distance can be controlled based on the height of the support structures 304 and/or the thickness of the first object portion 326. In some embodi- ments, the thickness of the first object portion 326 correlates to the curing depth of the precursor material, which can be controlled by including inhibitors and/or blockers in the precursor material that limit the penetration of the energy into the material.

As described above, the coupling between the first end portions 314 and the first object portion 326 can reduce or prevent the first object portion 326 from collapsing, sagging, deforming, or otherwise deviating from the desired geom- etry due to its own weight. In some embodiments, the first end portions 314 of the support structures 304 are mechani- cally coupled to the first object portion 326 by virtue of the contact between these elements. The mechanical coupling can be a releasable coupling, as described further below. Optionally, the support structures 304 can include rough- ened surfaces at the first end portions 314 and/or along the body 312 to enhance mechanical coupling to the first object portion 326. In some embodiments, the first object portion 326 is not covalently bonded to the support structures 304.

In some embodiments, the first object portion 326 is a functional region of the object and is intended to be part of the final product. Alternatively, the first object portion 326 can be a sacrificial region of the object that is not intended to be in the final product, such as a raft and/or supports. In such embodiments, the first object portion 326 be removed from the rest of the object during subsequent process steps (e.g., via fracturing, degrading, dissolving, polishing, or other suitable techniques). Additional details and examples of approaches in which the object includes sacrificial regions fabricated onto and/or around support structures are pro- vided in Sections II.B and II.C below.

FIG. 3C illustrates the device 300 during a second stage of the additive manufacturing process in which a second portion of the object ("second object portion 330") is formed. In some embodiments, the second object portion 330 includes at least one unstable region 332 (e.g., an overhang, bridge, valley, island) that are likely to collapse, sag, deform, or otherwise deviate from the intended geom- etry without being stabilized by the support structures 304. For example, the unstable region 332 can be a part of the second object portion 330 that is not connected to sufficient material below and/or around the unstable region 332 to maintain the desired geometry, in the absence of the support structures 304.

As shown in FIG. 3C, the second object portion 330, including the unstable region 332, can be at a different (e.g., higher) vertical location than the first object portion 326. In some embodiments, a second subset 334 of the support structures 304 can be used to support the unstable region 332 and/or the second object portion 330. The second subset 334 of the support structures 304 can be different than the first subset 328. For instance, the second subset 334 can be those support structures 304 that lie within or proximate to the footprint of the unstable region 332 on the build platform 302 (e.g., have the same or similar x- and/or y-coordinates as the unstable region 332). The second subset 334 of the support structures 304 can be raised by the corresponding actuators 318 to a second height greater than the first height of the first subset 328 of the support structures 304. For example, the second height can be at least 1 mm, 2 mm, 5 mm, 10 mm, 15 mm, or 20 mm greater than the first height. The second height can correspond to the vertical location of the unstable region 332 and the second object portion 330. The second object portion 330 can then be formed on the second subset 334, in accordance with the techniques used to form the first object portion 326.

In the illustrated embodiment, the second object portion 330 is formed directly onto the first object portion 326. In other embodiments, however, there can be one or more intervening portions (e.g., intermediate layers) between the first object portion 326 and the second object portion 330, and the second height of the second subset 334 of support structures 304 can be increased accordingly. Optionally, the second subset 334 can remain at the first height until the previous object portions (e.g., the first object portion 326 and/or the intervening portion(s)) are formed, e.g., to avoid obstructing the printer assembly of the additive manufac- turing system while forming the previous object portions. Alternatively, the second subset 334 can be raised to the second height before and/or while forming previous object portions, e.g., in embodiments where the second subset 334 would not obstruct printing of the previous object portions.

Subsequently, additional object portions (e.g., layers) of the object can be formed onto the second object portion 330 via the additive manufacturing process until the entire object geometry is completed. If any of the additional object portions include unstable regions, additional subsets of the support structures 304 can be raised by the corresponding actuators 318 to provide mechanical support for those unstable regions, in accordance with the techniques described herein. Conversely, additional object portions that do not include any unstable regions may be formed without support from additional subsets of the support structures 304. Accordingly, the configuration (e.g., height distribu- tion) of the support structures 304 can be customized to the particular geometry of the object being fabricated.

FIG. 3D illustrates the device 300 during removal of the object from the support structures 304. After the entire object has been formed (only the first object portion 326 and second object portion 330 are shown for purposes of sim- plicity), the object can be separated from the device 300 by lifting the object away from the support structures 304 (e.g., via a robotic arm or other automated mechanism) and/or by retracting the support structures 304 away from the object via the actuators 318. For example, as previously described, the support structures 304 can be retracted toward the first surface 306 of the build platform 302 and, optionally, partially or completely into the build platform 302.

The support structures 304 can be configured to separate from the object with little or no damage (e.g., fracture, plastic deformation) of the object. In some embodiments, for example, at least a part of the support structures 304 (e.g., the first end portions 314 and/or the bodies 312) or the entirety of the support structures 304 are made out of a material that is sufficiently nonadherent to the material of the object, such that the support structures 304 can be pulled out of the object. For example, the first end portions 314 can be made out of a siloxane, fluorinated material, or other non- adhesive material, or can include a coating made from a non-adhesive material. Alternatively or in combination, the first end portions 314 can be configured to change in geometry to release the object from the support structures 304. For example, the first end portions 314 can be configured to transition from an expanded configuration (e.g., a widened shape) to a low-profile configuration (e.g., a compressed, narrowed, and/or low-volume shape), and the low-profile configuration can allow the first end portions 314 to be withdrawn from the object.

FIG. 3E illustrates a portion of an individual support structure 304 in an expanded configuration 336 and a low-profile configuration 338, in accordance with embodiments of the present technology. As described above, the first end portion 314 of the support structure 304 can have a different geometry (e.g., shape and/or size) in the expanded configuration 336 compared to the low-profile configuration 338. For example, in the expanded configuration 336, the first end portion 314 of the support structure 304 can have a first lateral dimension D 1 (e.g., a first width and/or diameter). In some embodiments, the first end portion 314 is placed into the expanded configuration 336 before and/or during formation of the object on the support structure 304, e.g., to provide a secure coupling to the object.

In the low-profile configuration 338, the first end portion 314 can have a second lateral dimension $D_2$ (e.g., a second width and/or diameter) that is less than the first lateral dimension $D_1$. For example, the first lateral dimension $D_1$ can be at least 0.1 mm, 0.25 mm, 0.5 mm, 1 mm, 2 mm, 3 mm, 4 mm, or 5 mm greater than the second lateral dimension $D_2$. Alternatively or in combination, the first lateral dimension $D_1$ can be at least 0.5 mm, 1 mm, 2 mm, 3 mm, 4 mm, 5 mm, or 10 mm; and/or the second lateral dimension $D_2$ can be no more than 5 mm, 4 mm, 3 mm, 2 mm, 1 mm, 0.5 mm, 0.25 mm, or 0.1 mm. In some embodiments, the first end portion 314 is placed into the low-profile configuration 338 before and/or during removal of the object from the support structure 304, e.g., to allow for easy separation of the support structure 304 from the surrounding object material.

The other dimensions of the first end portion 314 (e.g., height) can remain the same in the expanded configuration 336 and the low-profile configuration 338, or can change (e.g., increase or decrease) in the expanded configuration 336 versus the low-profile configuration 338. Additionally, the other portions of the support structure 304 (e.g., the body 312) can remain the same in the expanded configuration 336 and the low-profile configuration 338, or can change in size (e.g., increase or decrease in width and/or diameter) in the expanded configuration 336 versus the low-profile configuration 338.

The support structure 304 can be transitioned between the expanded configuration 336 and the low-profile configuration 338 in many different ways. For example, FIG. 3F illustrates the support structure 304 with a movable piston 340, in accordance with embodiments of the present technology. As shown in FIG. 3F, the piston 340 can include an elongate rod 342 terminating in a widened tip 344. The piston 340 can be positioned within the support structure 304, with the tip 344 located within the first end portion 314, and the rod 342 extending from the first end portion 314 through the body 312 of the support structure 304. The piston 340 can be coupled to an actuator that moves the piston 340 upward and/or downward relative to the support structure 304 to change the geometry of the first end portion 314. The actuator can be the same actuator 318 that controls the support structure 304, or can be a different actuator.

To place the support structure 304 in the expanded configuration 336, the piston 340 can be retracted downward relative to the first end portion 314 such that the tip 344 is positioned at or proximate to the juncture between the first end portion 314 and the body 312. The first end portion 314 can be made out of a flexible and/or deformable material (e.g., an elastomer) such that retraction of the piston 340 compresses the first end portion 314 into a shortened, wider shape. To place the support structure 304 in the low-profile configuration 338, the piston 340 can be extended upward relative to the first end portion 314 such that the tip 344 moves toward the apex of the first end portion 314, thus stretching the first end portion 314 and causing it to assume an elongated, narrower shape.

As another example, FIG. 3G illustrates the support structure 304 with an inflatable member 346, in accordance with embodiments of the present technology. In the illustrated embodiment, the inflatable member 346 (e.g., a balloon or other hollow, flexible component) serves as the first end portion 314 of the support structure 304. The inflatable member 346 can be fluidly coupled to a source of a fluid 348 (e.g., a fluid pump) via a channel 350 extending through the body 312 of the support structure 304. For example, the fluid 348 can be a gas (e.g., air) or a liquid (e.g., water, mineral oil). To place the support structure 304 in the expanded configuration 336, the fluid 348 can be pumped into the inflatable member 346, thus causing it to inflate into a widened, higher volume shape. To place the support structure 304 in the low-profile configuration 338, the fluid 348 can be drawn out of the inflatable member 346, thus causing it to deflate into a narrower, lower volume shape.

Referring again to FIG. 3D, once the object has been separated from the support structures 304, the object can include a plurality of cavities 352 (e.g., recesses, holes, perforations, voids) corresponding to the shapes of the first end portions 314 of the support structures 304. In some embodiments, the cavities can be filled with a material (e.g., the same material as the material used to form the rest of the object, or a different material) so that the resulting surface of the object is smooth and continuous. Alternatively or in combination, the object can be polished to eliminate the cavities 352 and produce a smooth, continuous surface. In other embodiments, however, the cavities 352 can be left in place, e.g., if they are relatively small or would otherwise not interfere with the use of the object.

Although the device 300 is illustrated as having a plurality of identical support structures 304, in other embodiments, some or all of the support structures 304 can have different geometries and/or can be made out of different materials. For example, some or all of the support structures 304 can differ from each other with respect to any of the following: the shape of the first end portion 314, the shape of the body 312, the shape of the second end portion 316, the size of the first end portion 314 (e.g., length, width, diameter) in the expanded configuration 336, the size of the first end portion 314 in the low-profile configuration 338, the size of the body 312, the size of the second end portion 316, the angle of the support structure 304 relative to the first surface 306 of the build platform 302, the material of the first end portion 314, the material of the body 312, or the material of the second end portion 316, or any suitable combination thereof. The particular types and arrangement of the support structures 304 can be varied as desired, e.g., based on the geometry of the object to be fabricated, the precursor material used to fabricate the object, the type of additive manufacturing process used, and/or any other relevant consideration.

FIGS. 4A-4F are side views of support structures 404a-404f with different geometries, in accordance with embodiments of the present technology. The support structures 404a-404f can be generally similar to the support structures 304 of FIGS. 3A-3G. Accordingly, the following discussion will be limited to those features that differ from the support structures 304 of FIGS. 3A-3G. The embodiments of FIGS. 4A-4F can be combined with each other and/or incorporated into any of the devices and systems described herein (e.g., the device 300 of FIGS. 3A-3G).

Figures 4A, 4B, 4C, 4D, 4E, 4F:
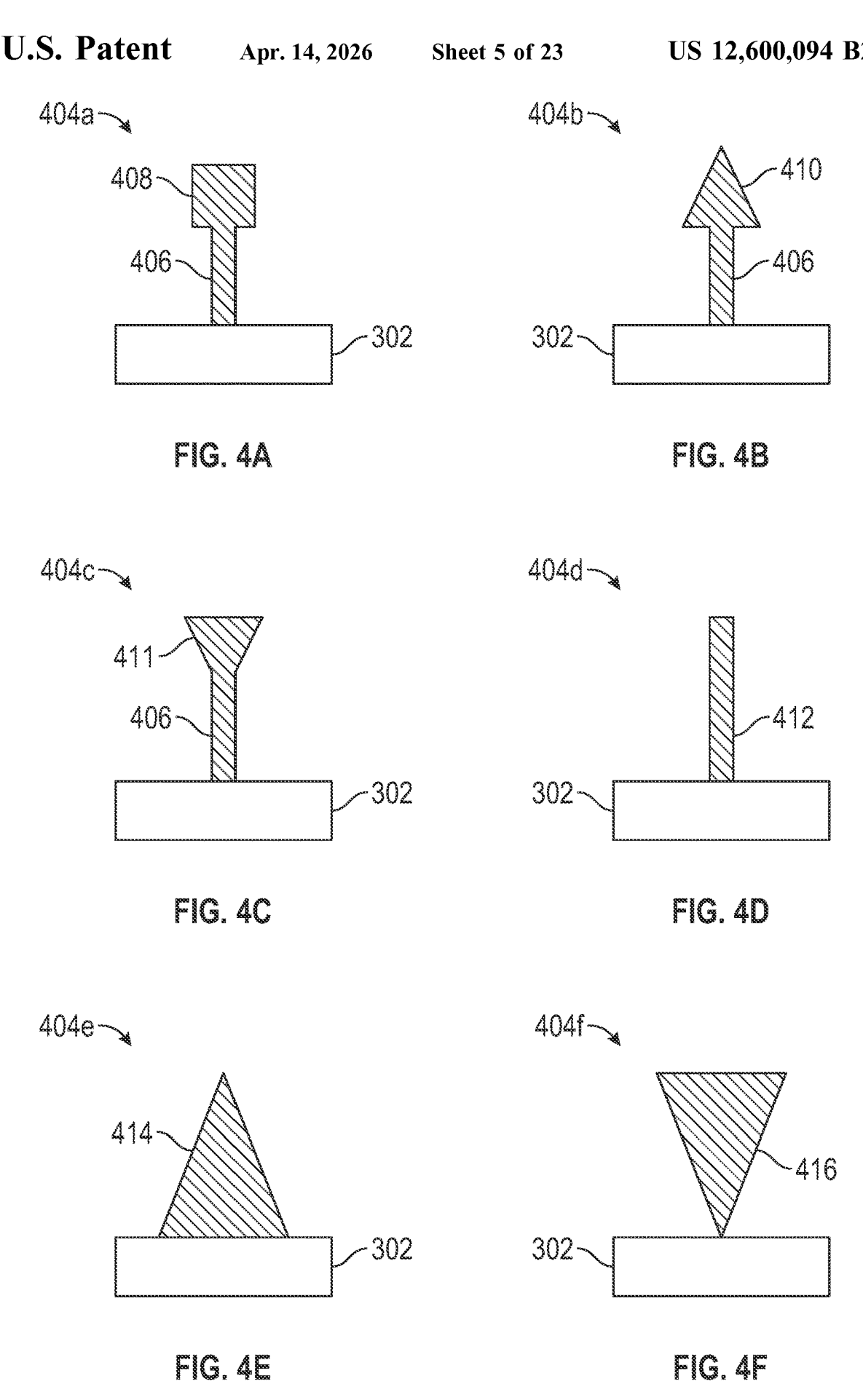
FIGS. 4A-4F are side views of support structures with different geometries, in accordance with embodiments of the present technology.

FIG. 4A illustrates a support structure 404a having a narrower, elongate body 406 connected to an end portion 408 with a square or rectangular cross-sectional shape. As another example, FIG. 4B illustrates a support structure 404b in which the body 406 is connected to an end portion 410 with a triangular cross-sectional shape (e.g., the end portion 410 can be conical). In the illustrated embodiment, the end portion 410 is oriented such that the apex of the triangle points away from the body 406, and the base of the triangle is connected to the body 406. FIG. 4C illustrates a support structure 404c similar to the support structure 404b, except that the triangular end portion 411 is oriented so that the apex of the triangle is connected to the body 406 and the base of the triangle faces away from the body 406. In some embodiments, the support structures 404a-404c are adjustable between an expanded configuration and a low-profile configuration, e.g., as previously described with respect to FIGS. 3E-3G.

FIG. 4D illustrates a support structure 404d shaped as an elongate member 412 (e.g., strut, rod, pin, post, cylinder) having a uniform diameter and/or width throughout. FIG. 4E illustrates a support structure 404e shaped as a cone 414, with the base of the cone 414 proximate to the build platform 302 and the apex of the cone 414 oriented away from the build platform 302. FIG. 4F illustrates a support structure 404f similar to the support structure 404e, except that the cone 416 is inverted with the apex proximate to the build platform 302 and the base oriented away from the build platform 302.

In some embodiments, the support structures 404a-404c, 404f can provide a larger surface area for attachment, and thus can be advantageous in additive manufacturing processes where the functional regions of the object are fabricated directly onto the support structures 404a-404c, 404f without any intervening sacrificial regions. In some embodiments, the support structures 404d and 404e are used in additive manufacturing processes where the object is indirectly connected to the support structures 404d and 404e via sacrificial regions (e.g., supports). In other embodiments, however, any of the support structures 404a-404f can be used with any of the devices and processes described herein.

The adjustable support structures described herein (e.g., the support structures 304 of FIGS. 3A-3G) can optionally perform other functions, such as introducing components into the object, carrying sensors for monitoring the object, applying energy to the object, or any other suitable function relevant to the additive manufacturing process. In some embodiments, the adjustable support structures described herein are configured to provide mechanical support to the object and to also perform another function. Alternatively, any of the adjustable support structures described herein can be modified to perform another function instead of providing mechanical support to the object (in such embodiments, the adjustable support structures may be referred to as "adjustable structures").

FIGS. 5A-5D illustrate a device 500 for supporting an object during an additive manufacturing process, in accordance with embodiments of the present technology. The device 500 can be generally similar to the device 300 of FIGS. 3A-3G, except that the device 500 also includes an applicator 502 configured to add a component 504 to the object being fabricated. The component 504 can be any material, device, structure, etc., that is intended to be incorporated into the object, including solid components, liquid components, or suitable combinations thereof. Examples of components 504 that can be introduced by the applicator 502 include, but are not limited to, any of the following: elastics, springs, metals (e.g., metal wires), polymers (e.g., rubber parts), ceramics, waxes, foams, mirrors, hollow objects, liquid-filled objects, electronics (e.g., batteries, sensors, circuits, transmitters, receivers, processors, memory), actuators (e.g., motors), fasteners (e.g., screws), mechanical attachment points (e.g., hooks, buttons, clasps), ornamental components, identifiers (e.g., tags, barcodes, labels), chemicals (e.g., solvents), pharmaceutical compositions, biologically active agents (e.g., drugs, hormones), dyes, flavors, scents, compliance indicators, or any suitable combination thereof.

In some embodiments, for example, the component 504 can be or include a catalyst that reacts with a material on or within the object, such as an acid, a base, a metal catalyst, an enzyme, or suitable combinations thereof. Accordingly, the applicator 502 can deposit the catalyst at a location to selectively trigger and/or accelerate a chemical reaction at that location. Conversely, the component 504 can be or include an inhibitor, and the applicator 502 can deposit the inhibitor at a location to selectively inhibit and/or slow a chemical reaction at that location. This approach can be used to selectively modify the properties of the object at that location, while leaving other locations substantially unaffected.

As another example, the applicator 502 can deposit a precursor material that is the same as the precursor material used to form the rest of the object, or a different precursor material. In some embodiments, the object is formed from a first photopolymerizable resin, and the applicator 502 is used to selectively apply a second photopolymerizable resin one or more specific locations on the object. This approach allows for multiple types of resins (or other types of precursor materials) to be incorporated into the object during the same additive manufacturing process.

The applicator 502 can include an adjustable structure 506 operably coupled to the build platform 302. In the illustrated embodiment, the adjustable structure 506 is an elongate member (e.g., a strut, post, rod, pin, pillar) extending through a corresponding passage 310 in the build platform 302. In other embodiments, the adjustable structure 506 can be separate from the build platform 302 and/or can be positioned at a different location in the device 500, such as above the build platform 302, to one side of the build platform 302, etc. The adjustable structure 506 can be at any suitable angle relative to the first surface 306 of the build platform 302, such as angle less than or equal to 90°, 80°, 70°, 60°, 50°, 45°, 40°, 30°, 20°, or 10°.

The adjustable structure 506 can include an elongate body having a first end portion (e.g., an upper end) coupled to the component 504, and a second end portion (e.g., a lower end) coupled to an actuator 508. The first end portion can be detachably coupled to the component 504 using any suitable attachment mechanism, such as a fastener (e.g., clip, bracket), actuatable gripper, adhesive, or a suitable combination thereof. Optionally, in embodiments where the component 504 is or includes a liquid, the first end portion can include a syringe, reservoir, nozzle, and/or any other mechanism suitable for containing and/or dispensing fluids. In some embodiments, the component 504 is loaded into the adjustable structure 506 before the start of the additive manufacturing process. The loading can be performed manually by a human operator, or automatically by a robotic component (e.g., a robotic arm).

The actuator 508 (e.g., a linear actuator) can be similar to the actuators 318 for the support structures 304. For example, the actuator 508 can be or include a motor, piston, hydraulics, compressed air source, magnet, and/or any other mechanism suitable for moving the adjustable structure 506. The actuator 508 can be configured to adjust the position of the adjustable structure 506 (and thus, the component 504) relative to the first surface 306 of the build platform 302. In some embodiments, the actuator 508 adjusts the height of the adjustable structure 506 and/or component 504 above the first surface 306, e.g., within a range from a first height to a second height. In some embodiments, the first height is no more than 10 mm, 9 mm, 8 mm, 7 mm, 6 mm, 5 mm, 4 mm, 3 mm, 2 mm, or 1 mm above the first surface 306. Optionally, the first height can be the same height as the first surface 306 (e.g., 0 mm above the first surface 306), such that the actuator 508 can retract the adjustable structure 506 and/or component 504 to be flush with the first surface 306. In some embodiments, the first height is below the first surface 306 (e.g., by at least 1 mm, 2 mm, 3 mm, 4 mm, 5 mm, 6 mm, 7 mm, 8 mm, 9 mm, or 10 mm), such that the actuator 508 can fully retract the adjustable structure 506 and/or component 504 into the build platform 302. Optionally, the actuator 508 can fully retract the adjustable structure 506 into the build platform 302, but the component 504 may remain flush with, partially above, or completely above the first surface 306 of the build platform 302. The second height can be greater than the first height, such as at least 1 mm, 5 mm, 10 mm, 15 mm, or 20 mm greater. In some embodiments, the second height is at least 5 mm, 10 mm, 15 mm, 20 mm, 25 mm, 30 mm, 35 mm, 40 mm, 45 mm, or 50 mm above the first surface 306 of the build platform 302.

Optionally, the actuator 508 can control other parameters of the adjustable structure 506, such as the angle of the adjustable structure 506 relative to the first surface 306. In embodiments where the adjustable structure 506 includes an actuatable gripper coupled to the component 504, the actuator 508 can also control whether the gripper holds or releases the component 504. Alternatively, the gripper can be controlled by another actuator different from the actuator 508.

The actuator 508 can be communicably coupled to a controller (not shown). The controller can transmit signals to control the operation of the actuator 508. For example, the signals can cause the actuator 508 to adjust the position of the adjustable structure 506 and, optionally, whether the adjustable structure 506 should hold or release the component 504. The position of the adjustable structure 506 can be determined based on the geometry of the particular object being fabricated (e.g., the geometry of the current object layer to be formed), as described further below.

Figure 5A:
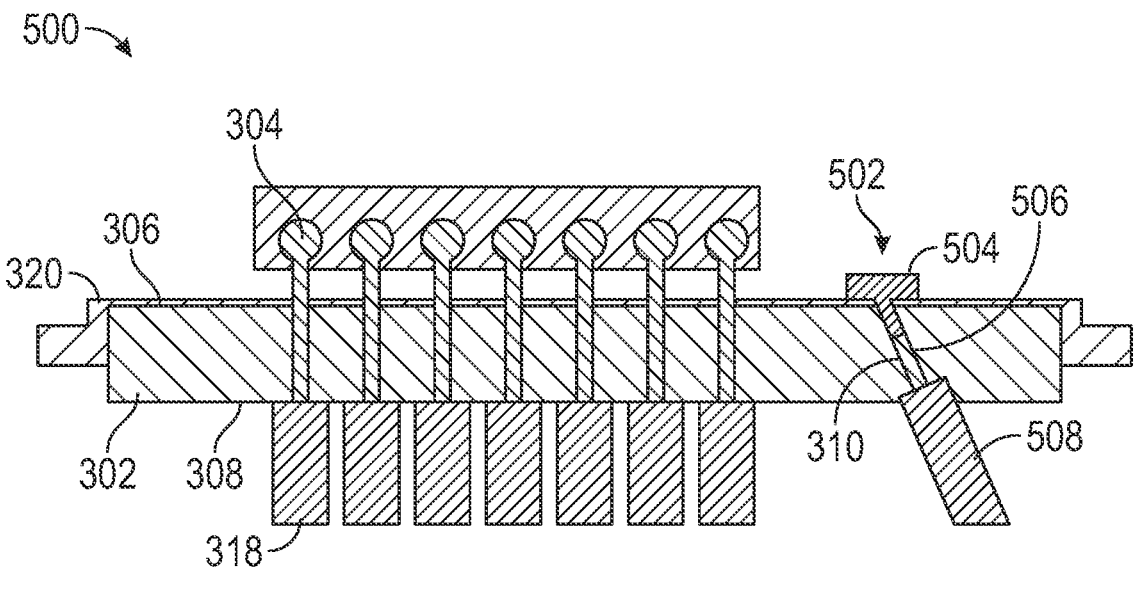
FIGS. 5A-5D are partially schematic side cross-sectional views of a device for supporting an object including an applicator, in accordance with embodiments of the present technology.
Figure 5B:
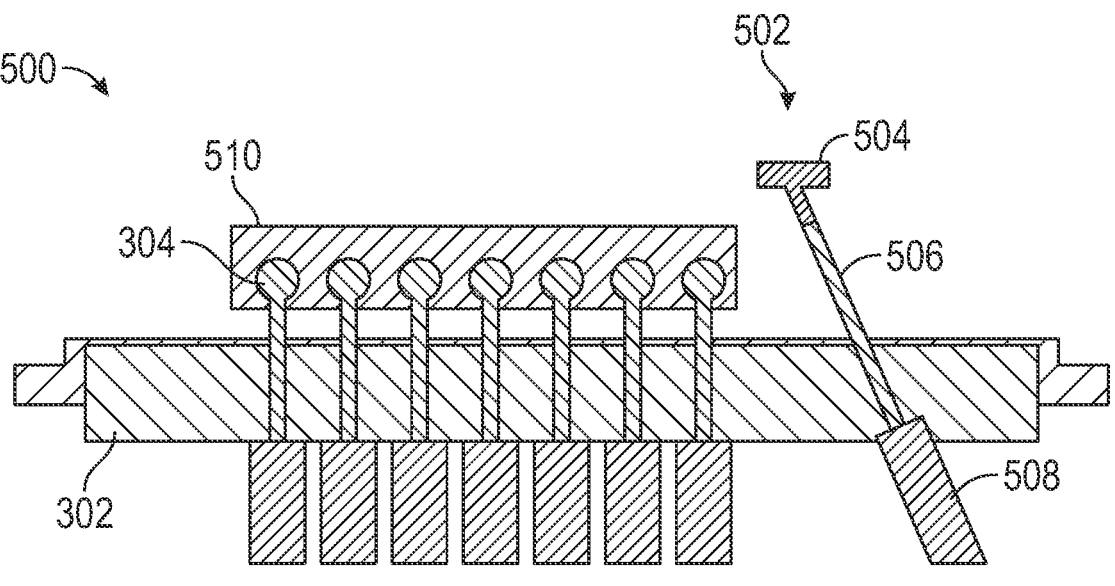

FIG. 5B illustrates the device 500 during a first stage of an additive manufacturing process after a first object portion 510 (e.g., a first layer) has been formed. The first object portion 510 can be fabricated from a precursor material using an additive manufacturing process, and can be formed on some or all of the support structures 304, in accordance with the techniques described elsewhere herein. During fabrication of the first object portion 510, the applicator 502 can be in an inactive configuration in which the component 504 and adjustable structure 506 are retracted into the build platform 302 and/or away from the first object portion 510, e.g., as shown in FIG. 5A. The inactive configuration can prevent the applicator 502 from obstructing the printer assembly of the additive manufacturing system while forming the first object portion 510.

As shown in FIG. 5B, after the first object portion 510 is formed, the applicator 502 can be switched to an active configuration in which the component 504 and adjustable structure 506 are raised above the build platform 302 and/or toward the location of the next object portion to be formed. For example, the component 504 can be moved to a location corresponding to an intended location of the component 504 within the object geometry.

Figure 5C:
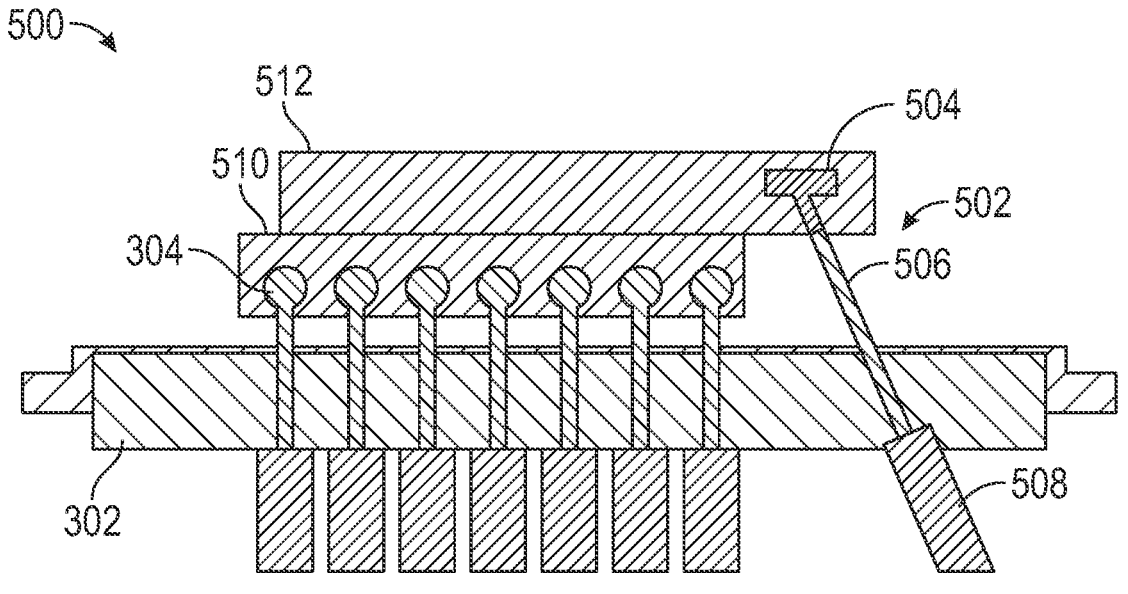

FIG. 5C illustrates the device 500 during a second stage of the additive manufacturing process in which a second object portion 512 (e.g., a second layer) is formed. As shown in FIG. 5C, the second object portion 512, can be at a different (e.g., higher) vertical location than the first object portion 510. In the illustrated embodiment, the second object portion 512 is formed directly onto the first object portion 510. In other embodiments, however, there can be one or more intervening portions (e.g., intermediate layers) between the first object portion 510 and the second object portion 512. The second object portion 512 can be formed by curing or otherwise solidifying a precursor material onto the first object portion 510 (or intervening portion, if present). The precursor material can also partially or fully surround the component 504, such that the component 504 becomes incorporated into the second object portion 512 when the precursor material is cured. The adjustable structure 506 can remain outside of the second object portion 512, or can be located partially within the second object portion 512, depending on the positioning of the adjustable structure 506.

In the embodiment of FIG. 5C, the applicator 502 is positioned to one side of the build platform 302, such that the adjustable structure 506 is angled and does not pass through other portions of the object to place the component 504 at the intended location in the second object portion 512. Alternatively, the applicator 502 can be positioned in close proximity to the object, and the previous portions of the object (e.g., the first object portion 510 and/or any intervening portions) can include a passage formed therein to allow the component 504 and/or adjustable structure 506 to pass through to reach the intended location in the second object portion 512.

Figure 5D:
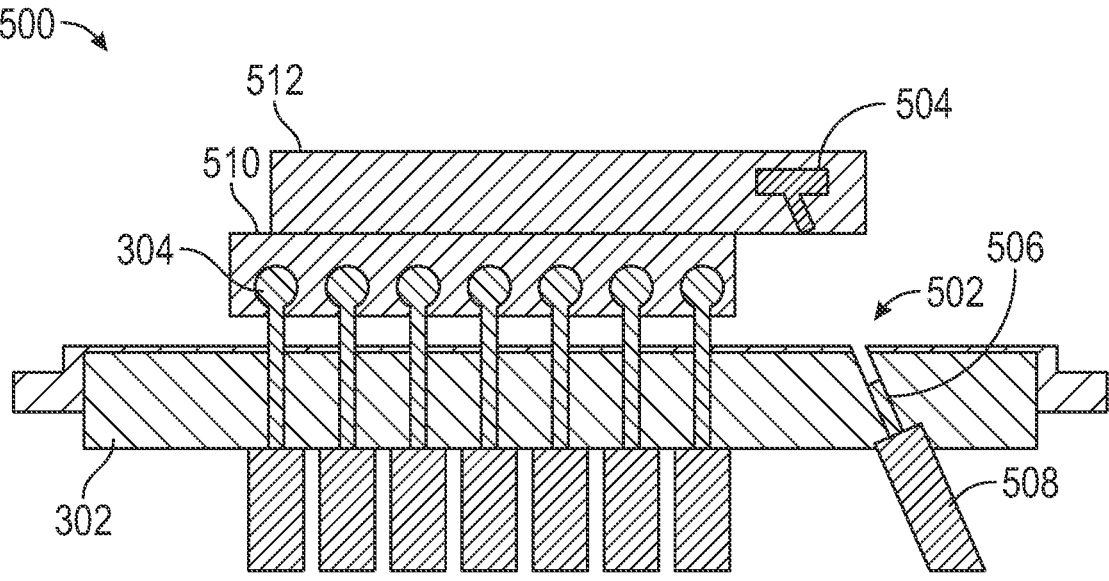

FIG. 5D illustrates the device 500 during a third stage of the additive manufacturing process after the second object portion 512 has been formed. In some embodiments, once the component 504 has been incorporated into the second object portion 512, the adjustable structure 506 can be detached from the component 504 and can be retracted away from the second object portion 512. The retraction of the adjustable structure 506 can cause the adjustable structure 506 to separate from the component 504, or the adjustable structure 506 can be actuated to actively release the component 504 (e.g., by opening a gripper on the adjustable structure 506). In some embodiments, the applicator 502 reverts to an inactive configuration, with the adjustable structure 506 retracted partially or fully into the build platform 302.

Any of the devices described herein (e.g., the device 300 of FIGS. 3A-3G, the device 500 of FIGS. 5A-5D) can be modified to include at least one sensor. For example, any of the adjustable structures described herein (e.g., the support structures 304 of FIGS. 3A-3G, the adjustable structure 506 of FIGS. 5A-5D) can include a sensor on the first end portion, the body, or the second end portion, or suitable combinations thereof. Alternatively or in combination, the sensor can be located on a different portion of the device, such as on or proximate to the build platform, overlay, or an entirely separate component.

In some embodiments, the sensor generates sensor data indicative of at least one characteristic of the object and/or the precursor material used to form the object, such as the temperature, viscosity, clarity, transparency, conductivity, degree of curing, degree of polymerization, conversion of reactive groups (e.g., using a fiber optic connector that relays infrared measurements to a Fourier-transform infrared spectroscopy (FTIR) device), light intensity from a light source (e.g., to calibrate the optical transmittance profile of the material by measuring light transmission at different depths), location (e.g., of the entire object or a portion thereof), geometry (e.g., thickness), surface characteristics (e.g., roughness), modulus, hardness, or suitable combinations thereof. The devices described herein can include any number of sensors, such as one, two, three, four, five, ten, 15, 20, or more sensors. Some or all of the sensors can be the same sensor type, or some or all of the sensors can be different sensor types. Representative examples of sensors that can be incorporated into the present technology include, but are not limited to, optical sensors, imaging devices (e.g., cameras) force sensors, weight sensors, strain sensors, ultrasonic sensors, temperature sensors, radiation sensors, chemical sensors, fluid sensors, moisture sensors, gas sensors, pressure sensors, flow sensors, time-of-flight sensors, proximity sensors, contact sensors, and location sensors.

Any of the devices described herein (e.g., the device 300 of FIGS. 3A-3G, the device 500 of FIGS. 5A-5D) can be modified to include at least one energy source (e.g., a light source, heat source, radiation source). For example, any of the adjustable structures described herein (e.g., the support structures 304 of FIGS. 3A-3G, the adjustable structure 506 of FIGS. 5A-5D) can include an energy source on the first end portion, the body, or the second end portion, or suitable combinations thereof. Alternatively or in combination, the energy source can be located on a different portion of the device, such as on or proximate to the build platform, overlay, or an entirely separate component.

The energy source can output energy that is the same type as the energy produced by the additive manufacturing system, or a different type of energy (e.g., a different wavelength). In some embodiments, the energy source applies energy to locations that would be difficult for the additive manufacturing system to reach, e.g., to ensure that the precursor material at those locations is sufficiently cured. Alternatively or in combination, the energy source can be used to apply energy to an object portion before and/or after that object portion has been cured by the additive manufacturing system. For example, an adjustable structure (e.g., the adjustable structure 506 of FIGS. 5A-5D) can place a component onto a surface of a printed object portion, and the same adjustable structure or a different adjustable structure can control an energy source to provide energy that produces additional curing to attach the component to the printed object portion. As another example, an adjustable structure with an energy source can be used to modify the x-, y-, and/or z-dimensions of an object portion after the object portion has been printed. Optionally, the energy source can include or be coupled to a barrier (e.g., a silicone window, protective coating) to prevent the precursor material from adhering to the energy source.

B. Removal Tools for Build Platforms

In some embodiments, the present technology provides removal tools that are configured to facilitate release of an additively manufactured object from a build platform. The removal tool can be coupled to the surface of the build platform during the additive manufacturing process. When the additive manufacturing process is complete, the removal tool can be lifted away from the surface of the build platform and into contact with the printed object, thus fracturing the attachments between the object and the build platform. In some embodiments, the forces applied by the removal tool are distributed over a relatively large surface area of the object, thus reducing the likelihood of damaging the object during removal. Additionally, the removal tool allows the object to be removed without bending the object, which can prevent warping and/or breakage of the object. In contrast, techniques such as scraping or peeling generally concentrate removal forces to a smaller region of the object, cause the object to bend, and/or require the use of dangerous tools such as blades, which may pose a higher risk of damage to the object (e.g., particularly if the object is brittle and/or includes delicate parts) and/or injury to the user.

Figure 6A:
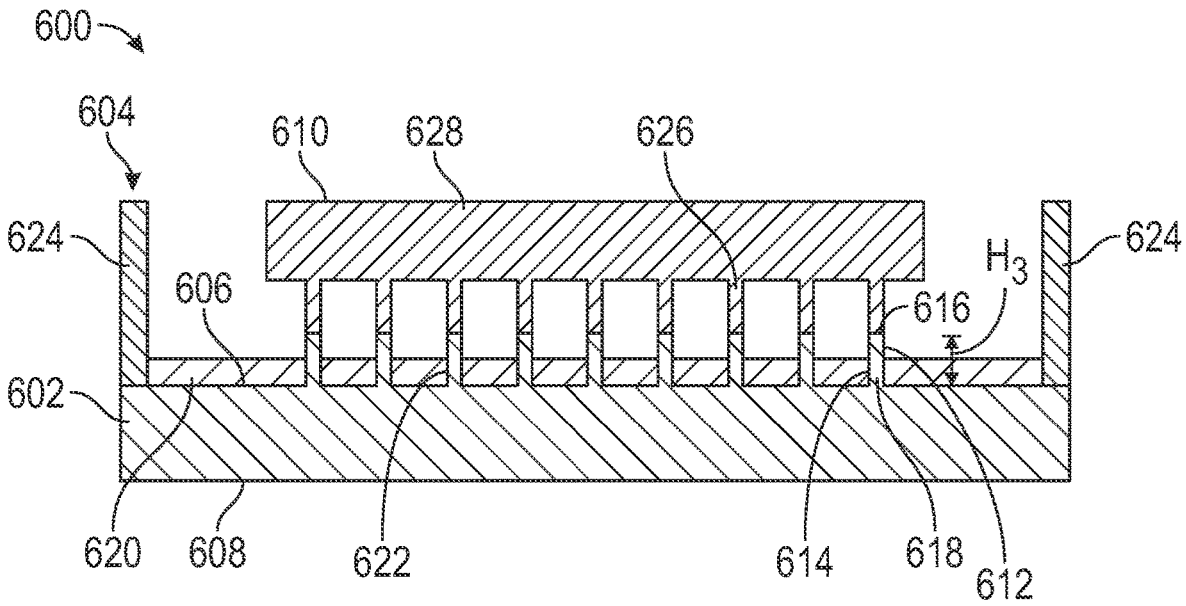
FIGS. 6A and 6B are partially schematic side cross-sectional views of a device including a build platform and a removal tool, in accordance with embodiments of the present technology.

FIG. 6A is a partially schematic side cross-sectional view of a device 600 including a build platform 602 and a removal tool 604, in accordance with embodiments of the present technology. The build platform 602 can be a generally planar substrate (e.g., a print bed, tray, plate, film, sheet) made out of a relatively rigid and/or stiff material, such as a metal (e.g., steel, aluminum, brass, copper, titanium), a ceramic, a polymer (e.g., thermoformed or thermoset polymer), a composite, or suitable combinations thereof. The build platform 602 includes a first surface 606 and a second surface 608 opposite the first surface 606. The first surface 606 can be oriented toward an object 610 to be fabricated and/or toward a printer assembly of an additive manufacturing system (not shown). In the illustrated embodiment, for example, the first surface 606 is an upper surface and the additive manufacturing system can be configured to fabricate the object in a top-down process. Alternatively, the first surface 606 can be a bottom surface and the additive manufacturing system can be configured to fabricate the object in a bottom-up process.

The build platform 602 can include a plurality of prefabricated support structures 612 at the first surface 606. In some embodiments, the support structures 612 are adjustable structures that are operably coupled to the build platform 602, as described in Section II.A above. In such embodiments, the build platform 602 and support structures 612 can be similar or identical to the embodiments of FIGS. 3A-5D.

Alternatively, some or all of the support structures 612 can be fixed structures formed in the first surface 606 of the build platform 602. In such embodiments, the support structures 612 can be elongate members (e.g., struts, posts, rods, pins, pillars) extending above the first surface 606 of the build platform 602. The support structures 612 can be integrally formed with the build platform 602, or can be separate components that are coupled to the build platform 602 (e.g., via adhesives, bonding, fasteners, or other suitable attachment mechanisms). The support structures 612 can be made out of any suitable material, such as a metal (e.g., steel, aluminum, brass, copper, titanium), a ceramic, a polymer (e.g., thermoformed or thermoset polymer), a composite, or suitable combinations thereof. In some embodiments, the support structures 612 are made out of the same material as the build platform 602 (e.g., the support structures 612 and the build platform 602 can both be made out of steel). In other embodiments, the support structures 612 are made out of a different material than the build platform 602 (e.g., the support structures 612 can be made out of a fluoropolymer and the build platform 602 can be made out of steel).

The build platform 602 can include any suitable number of support structures 612, such as at least 10, 20, 30, 40, 50, 60, 70, 80, 90, 100, or more support structures 612. The support structures 612 can be arranged in any suitable configuration, such as a 2D array. In such embodiments, the array can have any suitable shape, such as square, rectangular, diamond, circular, oval, triangular, U-shaped, polygonal, or combinations thereof. The dimensions of the array (e.g., length, width, pitch) can also be varied as desired. In some embodiments, the geometry of the array is customized to the particular object to be fabricated, e.g., the shape and/or dimensions of the array can conform to the shape and/or dimensions of the object. Alternatively, the geometry of the array can be generic.

As shown in FIG. 6A, each support structure 612 includes an elongate body 614 having a first end portion 616 (e.g., an upper end) and a second end portion 618 (e.g., a lower end) opposite the first end portion 616. The first end portion 616 can be positioned above the first surface 606 of the build platform 602, and the second end portion 618 can be connected to the first surface 606 of the build platform 602. The support structures 612 can have any suitable height $H_3$ above the first surface 606, such as a height $H_3$ within a range from 1 mm to 50 mm, 5 mm to 25 mm, or 5 mm to 10 mm. In some embodiments, the height $H_3$ is at least 1 mm, 2 mm, 5 mm, 10 mm, 15 mm, 20 mm, 25 mm, 30 mm, 35 mm, 40 mm, 45 mm, or 50 mm; and/or is no more than 50 mm, 45 mm, 40 mm, 35 mm, 30 mm, 25 mm, 20 mm, 15 mm, or 10 mm.

The geometry of the first end portions 616, bodies 614, and second end portions 618 of the support structures 612 can be identical or generally similar to any of the embodiments described in Sections II.A above. For example, in the illustrated embodiment, the first end portion 616, the body 614, and the second end portion 618 have the same width and/or diameter (e.g., a width and/or diameter of at least 0.5 mm, 1 mm, 2 mm, 3 mm, 4 mm, 5 mm, 6 mm, 7 mm, 8 mm, 9 mm, or 10 mm). In other embodiments, the first end portion 616 can have a different (e.g., larger or smaller) width and/or diameter than the body 614 and/or the second end portion 618. Additionally, although the support structures 612 are illustrated as having a square or rectangular cross-sectional shape (within a vertical intersecting plane), in other embodiments, the support structures 612 can have a different shape, such as any of the shapes described in Section II.A.

Although FIG. 6A depicts the support structures 612 as having the same geometry, in other embodiments, some or all of the support structures 612 can have different geometries (e.g., different heights and/or shapes). Additionally, although the support structures 612 are shown as being parallel to each other, in other embodiments, some or all of the support structures 612 can be at an angle to each other. Moreover, although the support structures 612 are depicted as being orthogonal to the first surface 606 of the build platform 602, in other embodiments, some or all of the support structures 612 can be at a different angle relative to the first surface 606, such as an angle less than or equal to 80°, 70°, 60°, 50°, 45°, 40°, 30°, 20°, or 10°.

The removal tool 604 includes an overlay 620 covering a part of or the entire first surface 606 of the build platform 602. The overlay 620 can be a generally planar substrate (e.g., a plate, film, sheet, liner) and can have a thickness of at least 1 mm, 2 mm, 5 mm, 10 mm, or 20 mm; and/or within a range from 1 mm to 5 mm, 1 mm to 10 mm, 5 mm to 10 mm or 10 mm to 20 mm. The overlay 620 can be made out of any suitable material, such as a metal (e.g., steel, aluminum, brass, copper, titanium), a ceramic, a polymer (e.g., thermoformed or thermoset polymer), a composite, or suitable combinations thereof. In some embodiments, the material of the overlay 620 has a coefficient of thermal expansion (CTE) that is the same or similar to (e.g., within 10%) of the CTE of the build platform 602 and/or support structures 612. This configuration can be beneficial for avoiding dimensional changes due to temperature fluctuations, such that the device 600 can be used with a wider range of temperatures. Alternatively, the CTE of the overlay 620 can be different from the CTE of the build platform 602 and/or support structures 612. In such embodiments, the deliberate CTE mismatch can be used to tightly hold the overlay 620 onto the support structures 612 while at a lower temperature. When the overlay 620 is to be removed, the overlay 620 can be heated to a higher temperature to cause the overlay 620 to expand and allow the overlay 620 to move freely off the support structures 612.

In the illustrated embodiment, the overlay 620 includes a plurality of holes 622 (e.g., perforations) corresponding to the locations of the support structures 612, such that each support structure 612 can pass through a corresponding hole 622. The holes 622 can be sufficiently large so that the overlay 620 can slide freely along the support structures 612, but sufficiently small so that material does not leak into the holes 622 and onto the build platform 602. For example, the holes 622 can be sized to provide a desired amount of clearance between the support structures 612 and the overlay 620. The clearance can be the difference between the cross-sectional dimension (e.g., width and/or diameter) of the hole 622 versus an individual support structure 612. The clearance can be within a range from 1 µm to 100 µm, 5 µm to 75 µm, or 10 µm to 50 µm. In some embodiments, the clearance can be at least 1 µm, 5 µm, 10 µm, 20 µm, 30 µm, 40 µm, or 50 µm. Optionally, the amount of clearance can depend on the thickness of the overlay 620, e.g., a larger clearance can be used with a thicker overlay 620, while a smaller clearance can be used with a thinner overlay 620. In some embodiments, a smaller clearance is advantageous for cutting into the material of the object 610 to release the object 610 from the build platform 602, as described further below.

The holes 622 can have the same or similar cross-sectional shape (within a horizontal intersecting plane) as the support structures 612, or can have a different cross-sectional shape. For example, the cross-sectional shape of the holes 622 can be circular, oval, square, rectangular, diamond, triangular, polygonal, rounded, or suitable combinations thereof. The holes 622 can all have the same shape and/or size, or some or all of the holes 622 can have different shapes and/or sizes (e.g., depending on the geometry of the corresponding support structures 612 and/or the desired amount of clearance). Optionally, the overlay 620 can include a raised edge around the holes 622 to facilitate removal of the object 610, as described further below. The edge can be sharpened (e.g., to cut into the material of the object 610) or can be rounded (e.g., to apply force to the object 610).

The removal tool 604 can also include one or more actuators 624 (e.g., linear actuators) coupling the overlay 620 to the build platform 602, such as motors, pistons, lead screws, hydraulics, compressed air, and/or any other suitable mechanism for moving the overlay 620, as described further below. In some embodiments, the actuators 624 are manually operated (e.g., by the operator's hands and/or with aid of a tool), while in other embodiments, the actuators 624 are automatically operated by a controller, robotic assembly, or other suitable automated mechanism. The actuators 624 can be used to move the overlay 620 to a plurality of different heights relative to the first surface 606 of the build platform 602, as described further below.

The actuators 624 can be positioned to avoid obstructing the printer assembly and the object 610 to be formed, or otherwise interfering with the additive manufacturing process. In the illustrated embodiment, for example, the actuators 624 are positioned at or near the periphery of the build platform 602, and away from the active print area at the center of the build platform 602. Alternatively or in combination, the actuators 624 can be configured so the uppermost portions of the actuators 624 are flush with or below the upper surface of the overlay 620, thus presenting an unobstructed print area for forming the object 610.

In some embodiments, the overlay 620 is configured to protect the first surface 606 of the build platform 602. For example, the overlay 620 can serve as a barrier between the first surface 606 of the build platform 602 and the precursor material used to form the object 610, such that little or no precursor material adheres to the first surface 606, which could cause contamination when fabricating subsequent objects. In some embodiments, the overlay 620 is made out of a protective material (e.g., a siloxane, a fluorinated material) and/or includes a coating of protective material that resists adhesion to the precursor material and/or other contaminants. Optionally, the overlay 620 (or the entire removal tool 604) can be a removable component that can be decoupled from the build platform 602, and cleaned and/or replaced between printing operations.

As shown in FIG. 6A, the removal tool 604 can initially be in an inactive configuration in which the overlay 620 is lowered away from the object 610 to be formed and toward the build platform 602. For example, the overlay 620 can directly contact the first surface 606 of the build platform 602, or can be separated from the first surface 606 by a relatively small separation distance (e.g., no more than 10 mm, 5 mm, 2 mm, 1 mm, or 0.5 mm). When the removal tool 604 is in the inactive configuration, the support structures 612 can extend at least partially above the overlay 620, such that the first end portions 616 are exposed.

The object 610 can be formed onto the exposed support structures 612 of the build platform 602 in a layer-by-layer manner using any of the additive manufacturing processes described herein. In the illustrated embodiment, the object 610 includes a plurality of sacrificial regions 626 (e.g., supports) that are not intended to be in the final product, and a functional region 628 that is intended to be in the final product. The additive manufacturing process can begin with forming the sacrificial regions 626 onto the support structures 612 of the build platform 602. For example, the sacrificial region 626 can include a plurality of additively manufactured supports (e.g., struts, cones), and each support can be formed on and coupled to a corresponding support structure 612. Subsequently, the functional region 628 can be formed onto the sacrificial region 626. In other embodiments, however, the sacrificial regions 626 can be omitted and the object 610 can be formed directly onto the support structures 612 (e.g., as described in Section II.A above).

Figure 6B:
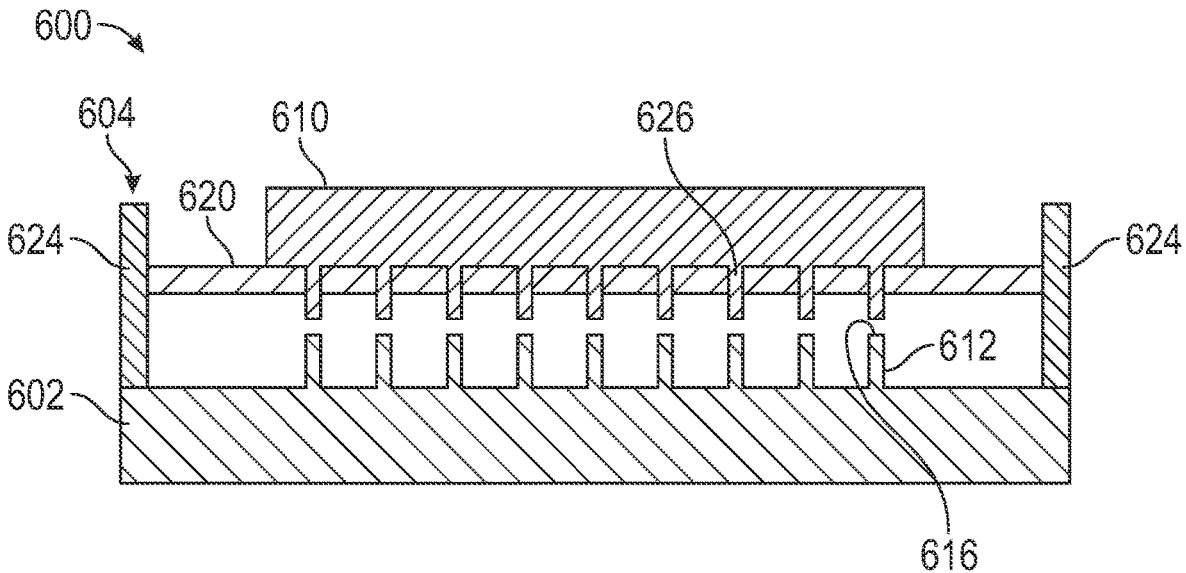

Referring next to FIG. 6B, once the entire object 610 has been formed, the removal tool 604 can be switched into an active configuration in which actuators 624 raise the overlay 620 away from the build platform 602 and toward the object 610, and, optionally, into contact with the object 610. In some embodiments, the overlay 620 is raised until the upper surface of the overlay 620 is aligned with or above the first end portions 616 of the support structures 612. The overlay 620 can be raised by at least 1 mm, 2 mm, 5 mm, 10 mm, 15 mm, 20 mm, 25 mm, 30 mm, 35 mm, 40 mm, 45 mm, or 50 mm above its initial height in the inactive configuration.

The upward force of the overlay 620 against the object 610 can disconnect the sacrificial regions 626 from the support structures 612, thus the releasing the object 610 from the build platform 602. For example, the force can fracture the sacrificial regions 626 at or near their contact points with the support structures 612, or can cause the material of the sacrificial regions 626 to release from the support structures 612 without fracturing. Optionally, in embodiments where the clearance between the holes 622 of the overlay 620 and the support structures 612 is relatively small, the edges of the overlay 620 around the holes 622 can cut into and/or apply force to the sacrificial regions 626 to facilitate release of the object 610.

Subsequently, the object 610 can be separated from the overlay 620, such as by lifting the object 610 away from the overlay 620 and/or lowering the overlay 620 away from the object 610. Any residual sacrificial material on the object 610 can then be removed by polishing, or can remain with the object if sufficiently small and/or if doing so would not interfere with the use of the object 610.

Figure 7A:
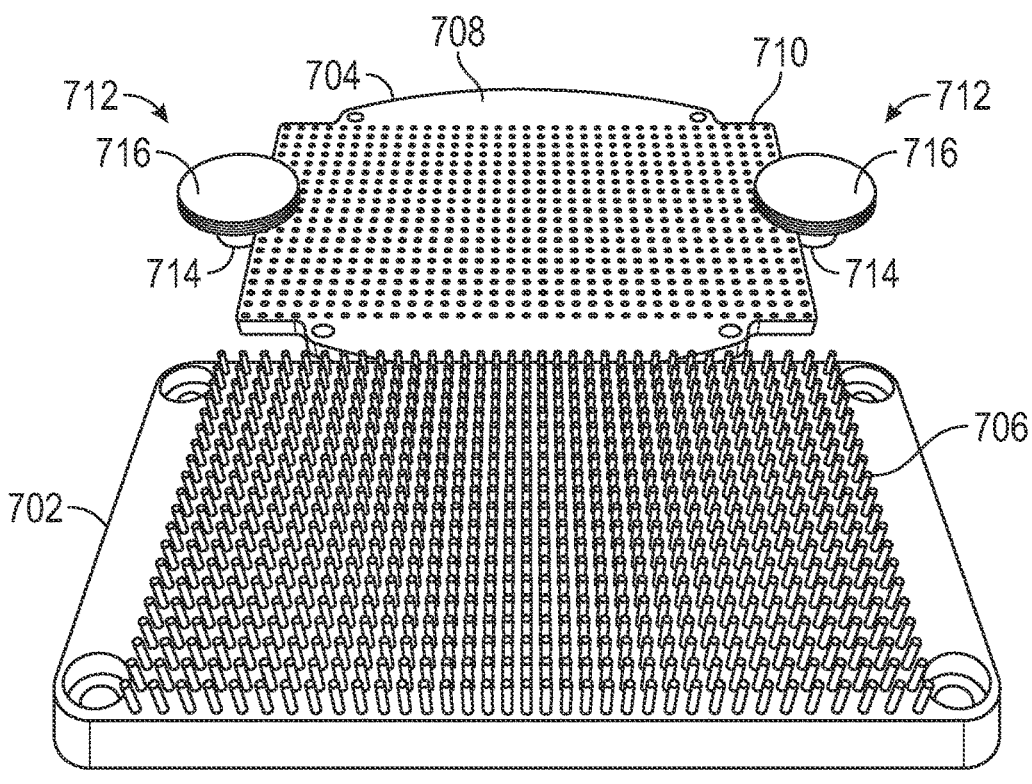
FIGS. 7A and 7B are perspective views illustrating a representative example of a build platform and a removal tool, in accordance with embodiments of the present technology.
Figure 7B:
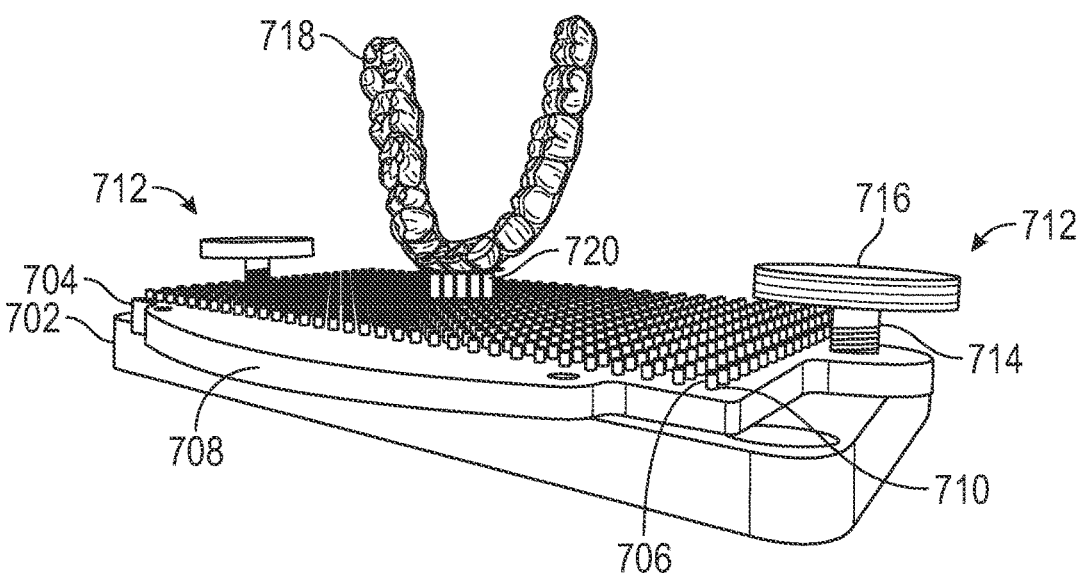

FIG. 7A is a perspective view illustrating a representative example of a build platform 702 and removal tool 704, and FIG. 7B illustrates the build platform 702 and removal tool 704 when assembled, in accordance with embodiments of the present technology. The features of the build platform 702 and removal tool 704 can be generally similar to the features of the embodiments of FIGS. 6A and 6B. Accordingly, the following discussion will be limited to those features that are different from or were not described in detail with respect to FIGS. 6A and 6B.

Referring first to FIG. 7A, the build platform 702 is a metallic plate including a plurality of support structures 706 (e.g., cylindrical pins). The support structures 706 can be distributed across the surface of the build platform 702 in a regular 2D array. The removal tool 704 includes an overlay 708 (e.g., a metallic plate) having a plurality of holes 710 (e.g., cylindrical holes). The holes 710 can be distributed across the overlay 708 in a regular 2D array complementary to the 2D array of the support structures 706, such that each support structure 706 can be received within a corresponding hole 710.

In the illustrated embodiment, the removal tool 704 includes a pair of actuators 712 positioned at opposite sides of the overlay 708. Each actuator 712 can include a screw 714 connected to a knob 716. The screws 714 can be rotated to raise and lower the overlay 708 relative to the build platform 702. In some embodiments, the screws 714 are designed to be manually rotated, and the knob 716 can have textured grips along its sides to facilitate gripping and twisting by the operator's fingers or hand. Optionally, the knob 716 can have a larger diameter than the screw 714 to increase the mechanical leverage to generate sufficient upward forces for releasing an object from the support structures 706. For example, the diameter of the knob 716 can be at least 0.5 cm, 1 cm, 1.5 cm, 2 cm, 3 cm, 4 cm, 5 cm, or more. Alternatively or in combination, the screws 714 can be rotated with a tool (e.g., a screw driver, Allen wrench), and the knob 716 may be omitted. In other embodiments, the actuator 712 can include a different type of mechanism for raising and lowering the overlay 708, such as a lever and fulcrum-type mechanism.

Referring next to FIG. 7B, the removal tool 704 can be coupled onto the build platform 702 by sliding the support structures 706 of the build platform 702 through the holes 710 of the overlay 708. The screws 714 can be turned so that the overlay 708 is in a lowered position in contact with the build platform 702, and the tops of the support structures 706 are exposed. An object 718 (e.g., a dental appliance such as an aligner) can be fabricated onto the support structures 706 using an additive manufacturing process. In the illustrated embodiment, the object 718 includes a plurality of sacrificial struts 720 coupling the object 718 to the exposed support structures 706. Alternatively, the object 718 can be fabricated directly onto the support structures 706 without the struts 720.

To separate the object 718 from the overlay 708, the screws 714 can be rotated to raise the overlay 708 above the tops of the support structures 706 and into contact with the object 718, thus applying a removal force to break the object 718 off of the support structures 706. In some embodiments, both screws 714 are rotated concurrently so the sides of the overlay 708 are raised by the same or similar amounts, such that the removal force is applied evenly to the object 718. Accordingly, the object 718 can be released from the build platform 702 with little or no bending, breakage, or other damage to the object 718.

C. Overlays for Build Platforms

In some embodiments, the present technology provides overlays that are removably coupled to a build platform. The overlay can include a plurality of support structures that serve as attachment points to an object during the additive manufacturing process. The support structures can be pre-fabricated components that couple to and provide mechanical support for one or more portions of the object (e.g., overhangs, bridges, islands, valleys). The support structures can improve robustness of the additive manufacturing process to non-planarity of the build platform surface and/or misalignment between the build platform surface and the printing plane of the additive manufacturing system. Additionally, the support structures herein can allow the object to be removed from the build platform without breaking, trimming, or otherwise removing any parts of the object, thus reducing the likelihood of damage to the object during processing.

The use of overlays with prefabricated support structures as described herein can provide various benefits, such as: (1) reducing or eliminating the need for printed supports that are integrally formed with the object, (2) providing facile and efficient removal of the object from the build platform without damaging the object, (3) reducing or eliminating the amount of manual polishing or trimming of the object after fabrication, and/or (4) protecting the surface of the build platform from contamination.

Figure 8A:
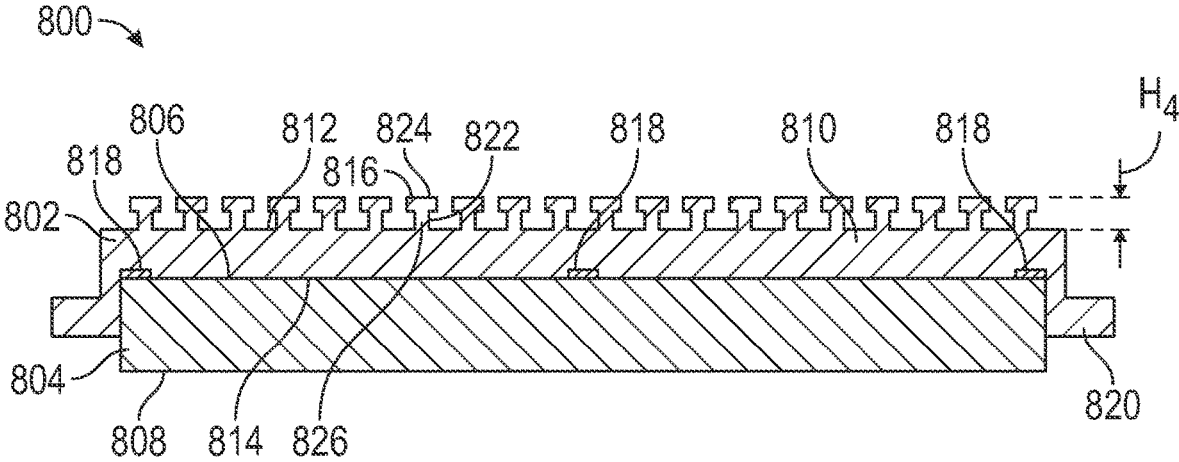
FIG. 8A is a partially schematic side cross-sectional view of a device including an overlay for supporting an object during an additive manufacturing process, in accordance with embodiments of the present technology.
Figure 8B:
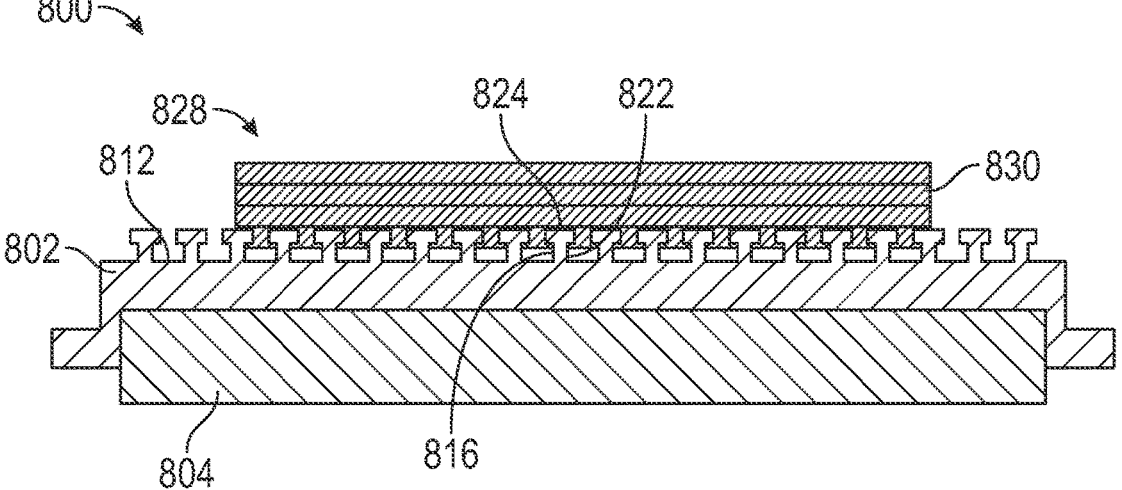
FIGS. 8B and 8C are partially schematic side cross-sectional views of the device of FIG. 8A during an additive manufacturing operation.
Figure 8C:
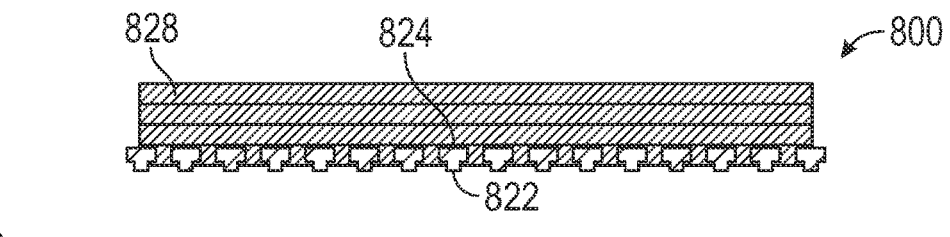
Figure 8C:
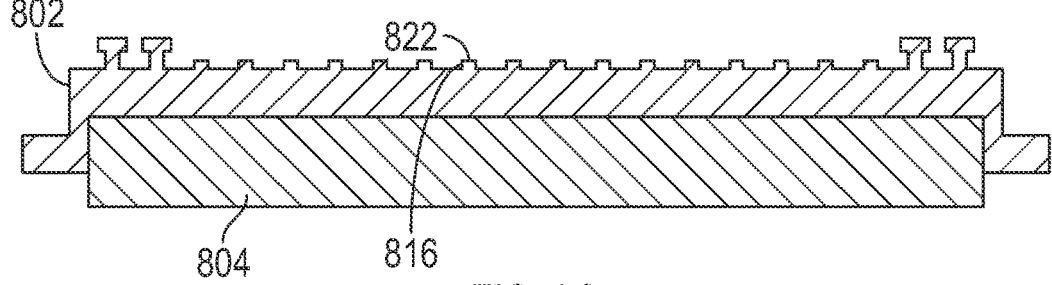

FIGS. 8A-8I illustrate a device 800 including an overlay 802 for supporting an object during an additive manufacturing process, in accordance with embodiments of the present technology. Specifically, FIG. 8A is a partially schematic side cross-sectional view of the device 800, FIGS. 8B and 8C are partially schematic side cross-sectional views of the device 800 during an additive manufacturing operation, FIGS. 8D and 8E are partially schematic side views of support structures of the device 800, and FIGS. 8F-8I are partially schematic side cross-sectional views of an object being removed from the device 800.

Referring first to FIG. 8A, the device 800 includes an overlay 802 coupled to a build platform 804. The build platform 804 can be a generally planar substrate including a first surface 806 and a second surface 808 opposite the first surface 806. The first surface 806 can be oriented toward the object to be fabricated and/or toward a printer assembly of an additive manufacturing system (not shown). In the illustrated embodiment, for example, the first surface 806 is an upper surface and the additive manufacturing system can be configured to fabricate the object in a top-down process. Alternatively, the first surface 806 can be a bottom surface and the additive manufacturing system can be configured to fabricate the object in a bottom-up process.

The overlay 802 can be coupled onto the first surface 806 of the build platform 804, and can cover portions of or the entirety of first surface 806. As shown in FIG. 8A, the overlay 802 includes a generally planar substrate 810 (e.g., a plate, film, sheet, liner) having a first surface 812 oriented away from the build platform 804, a second surface 808 oriented toward and coupled to the first surface 806 of the build platform 804, and a plurality of support structures 816 on the first surface 812. The thickness of the substrate 810 (e.g., as measured between the first surface 812 and the second surface 814) can be at least 1 mm, 2 mm, 5 mm, 10 mm, or 20 mm; and/or within a range from 1 mm to 5 mm, 1 mm to 10 mm, 5 mm to 10 mm or 10 mm to 20 mm.

The overlay 802 can be removably coupled to the build platform 804 at one or more attachment regions 818 using adhesives (e.g., viscous liquids), fasteners (e.g., clips), snap fit, interference fit, magnets, chemical affinity, or any other suitable attachment mechanism (the attachment regions 818 are omitted in the subsequent drawings merely for purposes of simplicity). Optionally, the overlay 320 can include one or more tabs 820 to facilitate coupling and decoupling the overlay 320 from the build platform 302. In some embodiments, the overlay 802 is configured to protect the first surface 806 of the build platform 804. For example, the overlay 802 can serve as a barrier between the first surface 806 of the build platform 804 and the precursor material used to form the object, e.g., to prevent residual precursor material from adhering to the first surface 806. In some embodiments, the overlay 802 is a reusable or disposable component that can be separated from the build platform 804 once the print is complete, as described further below.

The overlay 802 can be made out of any suitable material, such as a high modulus material (e.g., metal, a high modulus polymer, a ceramic), a low modulus material (e.g., silicone, rubber, an elastomer), or suitable combinations thereof. The material of the overlay 802 can be a biocompatible, non-toxic material, such as a food-grade material. Optionally, the overlay 802 can be made partially or entirely out of a protective material (e.g., a siloxane, a fluorinated material such as polytetrafluoroethylene), and/or can include a coating of protective material that resists adhesion to the precursor material and/or other contaminants. In embodiments where the precursor material is a polar material (e.g., a polar resin), the protective material for the overlay 802 can be a nonpolar material. Conversely, in embodiments where the precursor material is a nonpolar material (e.g., a nonpolar resin), the protective material for the overlay 802 can be a polar material. Optionally, the overlay 802, or selected portions thereof (e.g., the support structures 816) can include pores, surface roughness, and/or other mechanical features that enhance coupling of the object to the overlay 320 during fabrication of the object, as described further below. Additional examples of materials that may be used for the overlay 802 are provided further below.

The support structures 816 can be elongate members (e.g., struts, posts, rods, pins, pillars) that are built into the overlay 802. For example, the support structures 816 can be integrally formed with the overlay 802. Alternatively, the support structures 816 can be discrete components that are coupled to the overlay 802 (e.g., via adhesives, bonding, fusing, fasteners). The support structures 816 can be made out of the same material as the overlay 802, or can made partially or entirely out of different materials (e.g., a material that is more brittle than the material of the overlay 802).

The overlay 802 can include any suitable number of support structures 816, such as at least 10, 20, 30, 40, 50, 60, 70, 80, 90, 100, or more support structures 816. The support structures 816 can be arranged in any suitable configuration, such as a 2D array. In such embodiments, the array can have any suitable shape, such as square, rectangular, diamond, circular, oval, triangular, U-shaped, polygonal, or combinations thereof. The dimensions of the array (e.g., length, width, pitch) can also be varied as desired. In some embodiments, the geometry of the array is customized to the particular object to be fabricated, e.g., the shape and/or dimensions of the array can conform to the shape and/or dimensions of the object. Alternatively, the geometry of the array can be generic.

As shown in FIG. 8A, each support structure 816 includes an elongate body 822 having a first end portion 824 (e.g., an upper end) and a second end portion 826 (e.g., a lower end) opposite the first end portion 824. The first end portion 824 can be positioned above the first surface 812 of the overlay 802, and the second end portion 826 can be connected to the first surface 812 of the overlay 802. The support structures 816 can have any suitable height $H_4$ above the first surface 812, such as a height $H_4$ within a range from 1 mm to 50 mm, 5 mm to 25 mm, or 5 mm to 10 mm. In some embodiments, the height $H_4$ is at least 1 mm, 2 mm, 5 mm, 10 mm, 15 mm, 20 mm, 25 mm, 30 mm, 35 mm, 40 mm, 45 mm, or 50 mm; and/or is no more than 50 mm, 45 mm, 40 mm, 35 mm, 30 mm, 25 mm, 20 mm, 15 mm, or 10 mm.

The geometry of the first end portions 824, bodies 822, and second end portions 826 of the support structures 816 can be identical or generally similar to the corresponding embodiments described in Sections II.A and MB above. For example, as shown in FIG. 8A, the first end portion 824 can be wider than the body 822 and/or the second end portion 826. In some embodiments, the first end portion 824 has a width and/or diameter of at least 0.5 mm, 1 mm, 2 mm, 3 mm, 4 mm, 5 mm, 6 mm, 7 mm, 8 mm, 9 mm, or 10 mm; and/or the body 822 and/or the second end portion 826 each have a width and/or a diameter less than 5 mm, 4 mm, 3 mm, 2 mm, 1 mm, or 0.5 mm. In other embodiments, the first end portion 824 can have the same width as the body 822 and/or the second end portion 826, or the first end portion 824 can be narrower than the body 822 and/or the second end portion 826. Additionally, although the first end portion 824 is illustrated as having a square or rectangular cross-sectional shape, in other embodiments, the first end portion 824 can have a different shape, such as any of the shapes described in Sections II.A and II.B.

Although FIG. 8A depicts the support structures 816 as having the same geometry, in other embodiments, some or all of the support structures 816 can have different geometries (e.g., different heights and/or shapes). Additionally, although the support structures 816 are shown as being parallel to each other, in other embodiments, some or all of the support structures 816 can be at an angle to each other. Moreover, although the support structures 816 are depicted as being orthogonal to the first surface 812 of the overlay 802, in other embodiments, some or all of the support structures 816 can be at a different angle relative to the first surface 812, such as an angle less than or equal to 80°, 70°, 60°, 50°, 45°, 40°, 30°, 20°, or 10°.

FIG. 8B illustrates the device 800 together with an object 828 formed using an additive manufacturing process. The object 828 can be formed using any suitable additive manufacturing technique, such as any of the techniques described herein. For example, the object 828 can be built up from a plurality of sequentially formed object portions 830 (e.g., layers). In some embodiments, one or more initial object portions 830 are formed by applying a precursor material (e.g., a polymerizable resin) directly onto the support structures 816 and/or overlay 802, then applying energy to the regions of the precursor material proximate to at least some or all of the support structures 816 to solidify the precursor material around the support structures 816. Subsequent object portions 830 can then be formed onto the initial object portions 830, until the entire object geometry is complete.

The coupling between the support structures 816 and the object 828 can reduce or prevent the object 828 from collapsing, sagging, deforming, or otherwise deviating from the desired geometry due to its own weight, particularly if the object 828 includes unstable regions (e.g., overhangs, bridges, valleys, islands). As shown in FIG. 8B, the object 828 can contact and/or surround the first end portions 824 of the support structures 816, and optionally, parts of the bodies 822 of the support structures 816. In some embodiments, the first end portions 824 of the support structures 816 are mechanically coupled to the object 828 by virtue of the contact between these elements. Optionally, the support structures 816 can include roughened surfaces at the first end portions 824 and/or along the body 822 to enhance mechanical coupling to the object 828. In some embodiments, the object 828 is not covalently bonded to the support structures 816.

In some embodiments, the object 828 is spaced apart from and does not contact the first surface 812 of the overlay 802. For example, the separation distance between the object 828 and the first surface 812 can be at least 0.5 mm, 1 mm, 2 mm, 3 mm, 4 mm, 5 mm, 6 mm, 7 mm, 8 mm, 9 mm, or 10 mm. The separation distance can be controlled based on the height of the support structures 816 and/or the thickness of the initial object portion 830. In some embodiments, the thickness of the initial object portions 830 correlates to the curing depth of the precursor material, which can be controlled by including inhibitors and/or blockers in the precursor material that limit the penetration of the energy into the material. In other embodiments, however, the object 828 can contact the first surface 812 of the overlay 802.

FIG. 8C illustrates removal of the object 828 from the device 800. In the illustrated embodiment, the support structures 816 are configured to break to release the object 828 from the overlay 802. For example, the support structures 816 can be fractured by lifting the object 828 away from the overlay 802 (e.g., manually, via a robotic gripper or other automated mechanism), lowering the build platform 804 and overlay 802 away from the object 828, or a combination thereof. The support structures 816 can be designed to fracture at the bodies 822 of the support structures 816, such that the first end portions 824 and, optionally, parts of the bodies 822 remain embedded in the object 828.

In some embodiments, the support structures 816 are more brittle than the rest of the overlay 802 and the object 828 such that the removal forces preferentially fracture the support structures 816, rather than the rest of the overlay 802 or the object 828. For instance, the support structures 816 can be more brittle by virtue of their geometry, e.g., the support structures 816 can be thinner than the rest of the overlay 802 and the object 828. Alternatively or in combination, the support structures 816 can be made out of a material that is more brittle than the rest of the overlay 802 and/or the object 828. In such embodiments, the brittle material can be localized to certain parts of the support structure 816 (e.g., the first end portion 824 and/or the body 822), or the entire support structure 816 can be made out of the brittle material.

Optionally, the support structures 816 can be weakened at one or more predetermined regions, e.g., by removing material at the predetermined regions. For example, FIG. 8D illustrates a support structure 816 including a thinned region 832 in the body 822. The thinned region 832 can be formed by cutting a notch, recess, groove, etc., into one side of the body 822. FIG. 8E illustrates a support structure 816 including a thinned region 834 similar to the thinned region 832, except that thinned region 834 extends around the entire perimeter of the body 822 (e.g., the thinned region 834 is a circumferential groove).

Figure 8F:
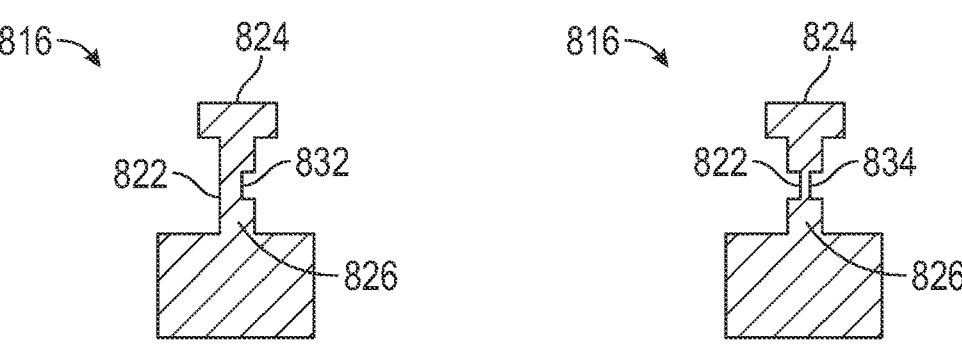
FIGS. 8F-8I are partially schematic side cross-sectional views illustrating an object being removed from the device of FIG. 8A.
Figure 8F:
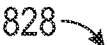
Figure 8F:
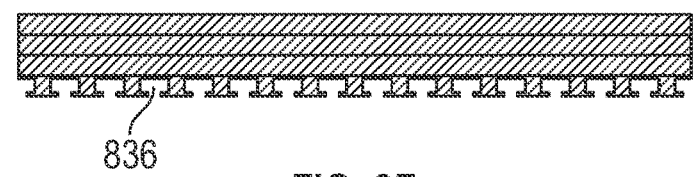

FIG. 8F illustrates the object 828 after the residual portions of the support structures 816 have been removed. In some embodiments, after the object 828 is separated from the overlay 802 by breaking the support structures 816, the residual portions of the support structures 816 (e.g., the first end portions 824 and/or bodies 822) can be removed from the object 828. The removal process can include any suitable technique, such as melting the residual portions, dissolving the residual portions (e.g., in water or a solvent), thermally degrading the residual portions, photodegrading the residual portions, shattering or otherwise breaking the residual portions into smaller pieces that can be removed from the object 828, peeling the residual portions out of the object 828, sonicating away the residual portions, sublimating away the residual portions, or suitable combinations thereof.

In such embodiments, the support structures 816 (or the entire overlay 802) can be made out of a material that is susceptible to the removal process (e.g., a material that is soluble, dissolvable, degradable, and/or sublimatable under certain processing conditions; has a lower melting point; and/or is more brittle). The object 828 can be made out of a material that is not substantially affected by the removal process (e.g., a material that is not soluble, dissolvable, degradable, and/or sublimatable under the processing conditions; has a higher melting point; and/or is less brittle).

In some embodiments, the support structures 816 or the entire overlay 802 are made partially or entirely out of a removable material (e.g., a material that can be dissolved, degraded, melted, etc.). For example, the removable material can be a thermoformed material. Thermoformed materials tend to be linear polymers and can therefore be suitable for dissolving in selected solvents. In such embodiments, the overlay 802 can be produced using thermoforming processes known to those of skill in the art, such as vacuum molding, injection molding, etc. As another example, the removable material can be a material having a low melting point, such as waxes or low molecular weight polymers (e.g., oligomers). As yet another example, the removable material can be a material configured to dissolve in water, such as a sugar-based material. In a further example, the removable material can be a sublimatable material, such as camphorquinone, naphthalenes, dry ice, etc. In such embodiments, the residual portions of the support structures 816 can be removed using heat and/or vacuum.

In yet another example, the removable material can include chemical moieties with degradable bonds, such as esters, anhydrides, azo derivatives, Diels-Alder adducts, and/or other thermally degradable or reversible bonds. In such embodiments, heating may be sufficient to soften, melt, cause a loss of connectivity, cause a reduction in molecular weight, or otherwise alter the properties of the removable material to facilitate removal of the residual portions of the support structures 816. As a further example, the removable material can include photoactive groups that are capable of photoinduced cleavage or photoreversion, such as anthracenes, acenaphthylenes, maleimides, coumarins, uracils, and other photodimerizable moieties. In such embodiments, light can be applied to the residual portions of the support structures 816 to facilitate removal.

Referring again to FIG. 8A, in some embodiments, the overlay 802 includes a durable portion that is meant to be reused (e.g., the substrate 810), and a sacrificial portion that is dissolved, melted, degraded, etc., and is replaced after each print (e.g., the first end portions 824 of the support structures 816, or the entirety of the support structures 816). The sacrificial portion can be made out of a removable material, while the durable portion can be made out of a material that is substantially unaffected by the removal process. The sacrificial portion can be coupled to the object 828 during the additive manufacturing process, as described above. Thus, once the object 828 has been separated from the overlay 802, any sacrificial portions remaining on the overlay 802 can removed (e.g., by dissolving, melting, degrading, etc.), and the durable portion of the overlay 802 can be reused by forming or coupling a new sacrificial portion onto the durable portion. This configuration can reduce the amount of waste created during each print.

Referring again to FIG. 8F, once the residual portions of the support structures 816 have been removed, the object 828 can include a plurality of cavities 836 (e.g., recesses, holes, perforations, voids) corresponding to the shapes of the residual portions. In some embodiments, the cavities 836 can be filled with a material (e.g., the same material as the material used to form the rest of the object, or a different material) so that the resulting surface of the object 828 is smooth and continuous. Alternatively or in combination, the object 828 can be polished to eliminate the cavities 836 and produce a smooth, continuous surface. In other embodiments, however, the cavities 836 can be left in place, e.g., if they are relatively small or would otherwise not interfere with the use of the object 828.

Figure 8G:
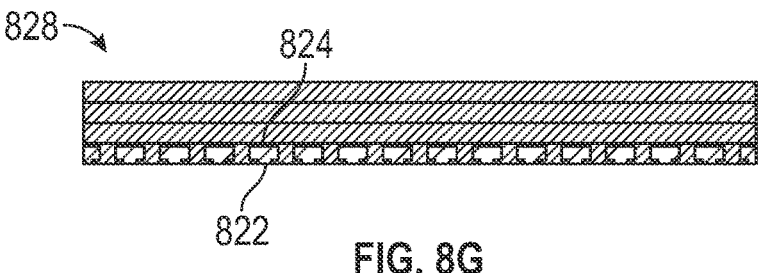

FIG. 8G illustrates the object 828 in which the residual portions of the support structures 816 remain with the object 828. In some embodiments, after the object 828 is separated from the overlay 802 by breaking the support structures 816, the residual portions of the support structures 816 (e.g., the first end portions 824 and/or bodies 822) can be incorporated into the object 828 and can thus be part of the final product. The portions of the object 828 proximate to the residual portions of the support structures 816 can be polished to produce a smooth, continuous surface. Alternatively, polishing can be omitted in embodiments where the residual portions are sufficiently small and/or otherwise do not interfere with the use of the object 828.

In some embodiments, the support structures 816 (or the entire overlay 802) are made out of the same material used to form the object 828. Alternatively, the support structures 816 (or the entire overlay 802) can be made out of a second, different material that is suitable for becoming part of the finished object 828. For example, the second material can have optical characteristics (e.g., refractive index, color, transparency) that are similar to or match the optical characteristics of the object 828 to maintain a uniform aesthetic appearance. As another example, the second material can include chemical moieties that covalently bond with the material of the object 828 to provide a fused, continuous interface. In some embodiments, the second material is a biocompatible, non-toxic, and/or food-grade material.

Figure 8H:
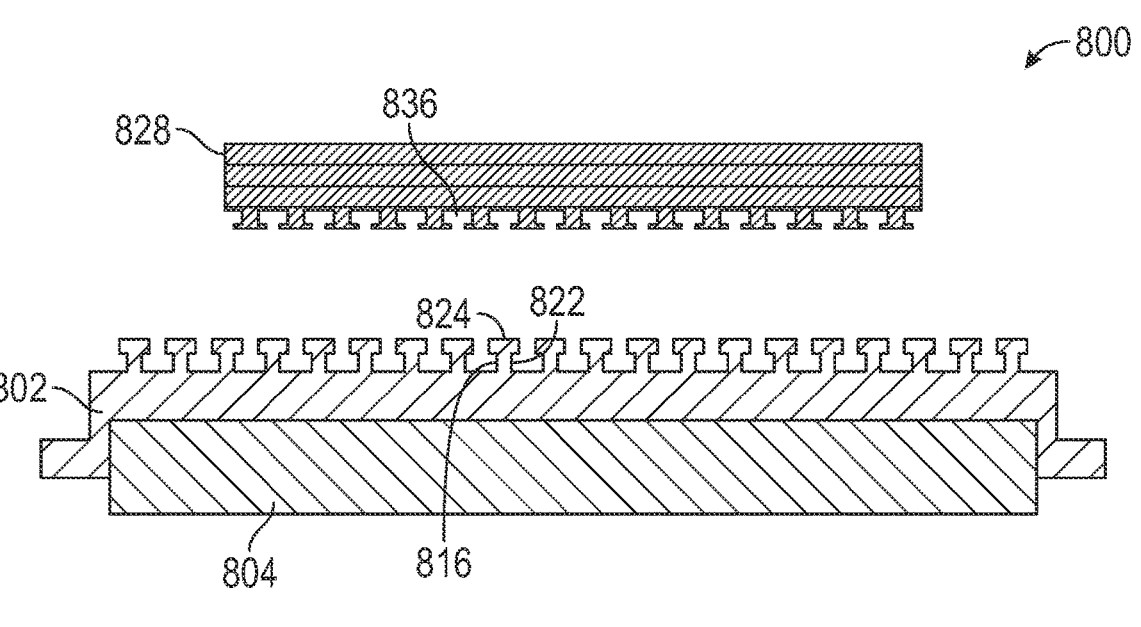

FIG. 8H illustrates another example of removal of the object 828 from the device 800. In the illustrated embodiment, the support structures 816 are removably coupled to the object 828, such that the first end portions 824 can slide out of the object 828 without fracturing the support structures 816. Accordingly, the support structures 816 can remain connected to the overlay 802, while the object 828 is left with cavities 836 corresponding to the shapes of the first end portions 824 of the support structures 816. The cavities 836 can be filled, removed via polishing, or left in place, as previously discussed. Moreover, if the object 828 is removed from the support structures 816 while there is still liquid precursor material (e.g., uncured resin) on the object 828, the liquid precursor material can flow into the cavities 836 by capillary action and thus can be cured in place to form a smooth, continuous surface, e.g., during a post-curing process.

In some embodiments, the removable coupling between the support structures 816 and the object 828 is achieved by forming the support structures 816 (or the entire overlay 802) out of a material that resists adhesion to the object 828, as described elsewhere herein. Alternatively or in combination, the support structures 816 can be made partially or entirely out of a flexible and/or deformable material (e.g., an elastomer, a silicone rubber) that changes in shape from an expanded configuration to a low-profile configuration when force is applied. For example, the first end portions 824 can be made out of the flexible and/or deformable material such that, when the object 828 is pulled away from the support structures 816, the first end portions 824 deform into a narrowed shape and can thus be pulled out of the cavities 836 within the object 828, without damaging the support structures 816 or the object 828. This approach allows the overlay 802 and support structures 816 to be reused. Additionally, in some embodiments, the use of silicone-based materials can produce a liquid layer of precursor material proximate to the support structures 816 that acts as an anti-adhesive coating (e.g., due to oxygen inhibition effects).

Figure 8I:
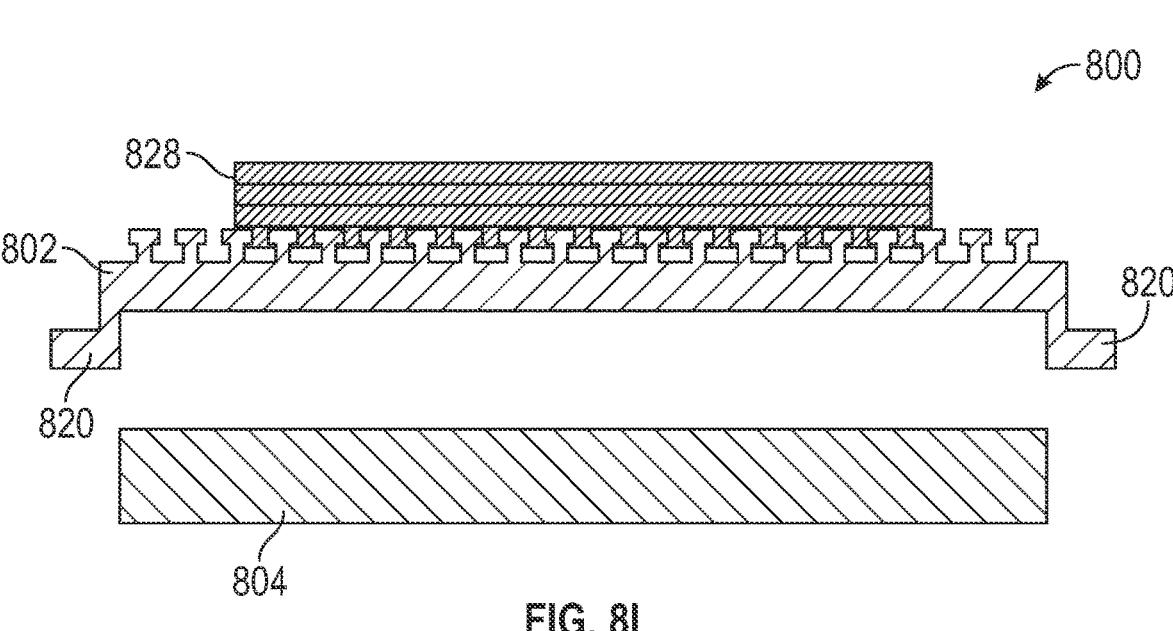

FIG. 8I illustrates removal of the object 828 and overlay 802 from the build platform 804. Although FIGS. 8C and 8H showed the object 828 being separated from the overlay 802 while the overlay 802 remains coupled to the build platform 804, in other embodiments, the overlay 802 and object 828 can be removed together from the build platform 804 (e.g., by pulling upward on the tabs 820 of the overlay 802). The object 828 can then be removed from the overlay 802 in a subsequent removal process, as described above. For example, in embodiments where the overlay 802 is made partially or entirely out of a dissolvable material, the overlay 802 and object 828 can be immersed in a solvent to release the object 828 from the overlay 802.

Figure 9A:
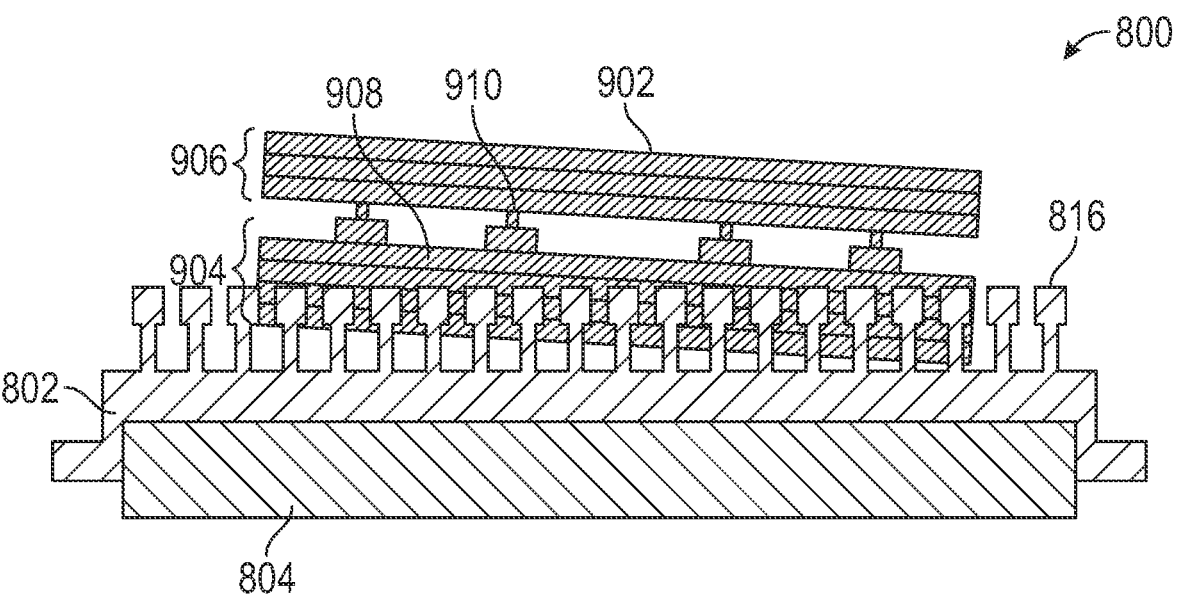
FIGS. 9A and 9B are partially schematic side cross-sectional views illustrating another process for forming an additively manufactured object on an overlay, in accordance with embodiments of the present technology.
Figure 9B:
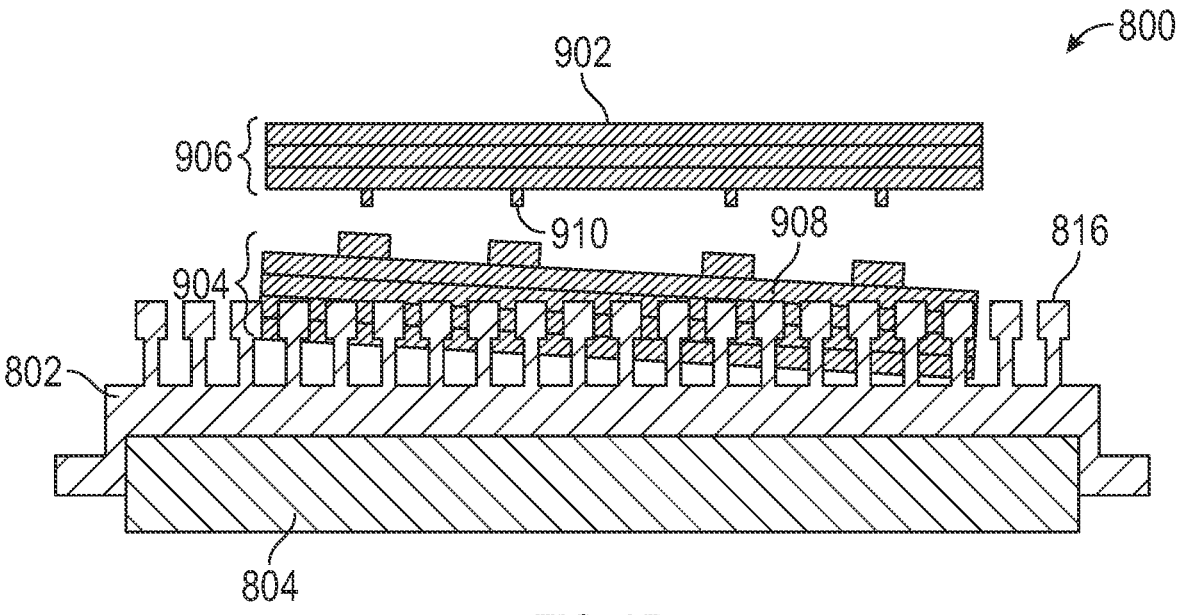

FIGS. 9A and 9B are partially schematic side cross-sectional views illustrating another process for forming an additively manufactured object 902 on the overlay 802, in accordance with embodiments of the present technology. Referring first to FIG. 9A, the object 902 can be built up from a precursor material in a layer-by-layer fashion using any of the additive manufacturing processes described herein. The object 902 can include a sacrificial region 904 (e.g., raft, supports) that is not intended to be in the final product, and a functional region 906 that is intended to be in the final product. The additive manufacturing process can begin with forming the sacrificial region 904 on the support structures 816 of the overlay 802. In some embodiments, the sacrificial region 904 includes a raft 908 formed from one or more layers of precursor material. The raft 908 can be a relatively large area of cured material that serves as a base for subsequent portions of the object 902 to adhere to. The sacrificial region 904 can also include a plurality of supports 910 (e.g., struts, cones) formed on the raft 908, which can be formed from one or more layers of precursor material. Subsequently, the functional region 906 can be formed onto the supports 910 of the sacrificial region 904.

As shown in FIG. 9A, the object 902 can be successfully fabricated even if the initial portions of the object 902 (e.g., the raft 908 of the sacrificial region) are not aligned with the surfaces of the overlay 802 and build platform 804, since the presence of the support structures 816 still provides sufficient surface area for the raft 908 to attach to. In contrast, objects printed on conventional build platforms without built-in support structures can be susceptible to print failure due to poor adhesion if the initial layers of the object are not aligned with the surface of the build platform.

Referring next to FIG. 9B, once the entire object 902 has been formed, the functional region 906 of the object 902 can be separated from the overlay 802 by breaking the functional region 906 off from the sacrificial region 904 adhered to the overlay 802. In the illustrated embodiment, the supports 910 of the sacrificial region 904 can be relatively thin and/or brittle components that are designed to fracture when force is applied, thus allowing the functional region 906 to be removed from the overlay 802 while the raft 908 remains attached to the overlay 802. The residual portions of the supports 910 attached to the functional region 906 can subsequently be removed by polishing, or can remain on the object 902 if the residual portions are sufficiently small and/or otherwise do not interfere with the use of the object 902.

Figure 10:
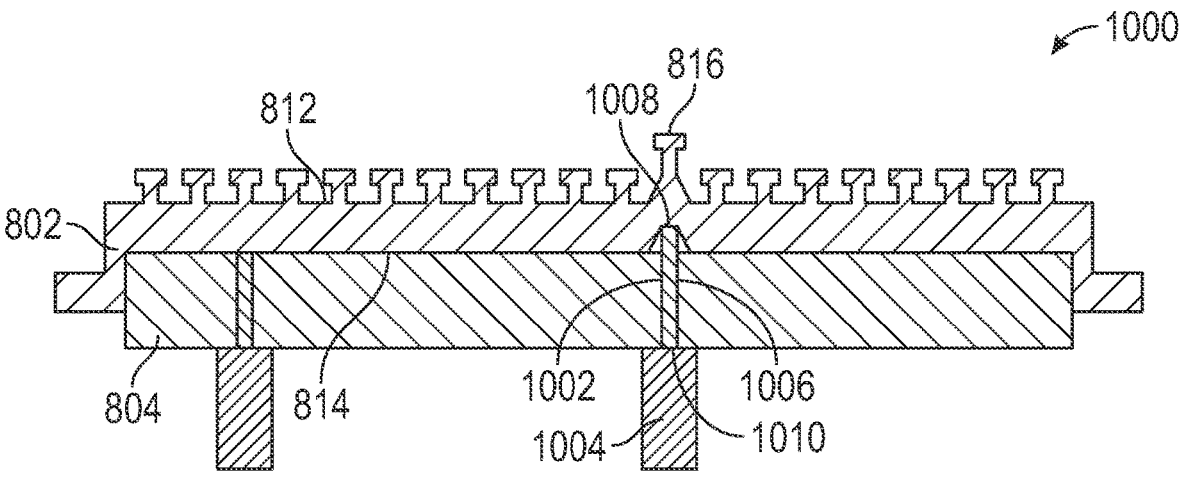
FIG. 10 is a partially schematic side cross-sectional view of a device including an overlay for supporting an object during an additive manufacturing process, in accordance with embodiments of the present technology.

FIG. 10 is a partially schematic side cross-sectional view of a device 1000 for supporting an object during an additive manufacturing process, in accordance with embodiments of the present technology. The device 1000 can be generally similar to the device 800 of FIGS. 8A-8I, except that the device 1000 includes one or more adjustable structures 1002 configured to alter the geometry of the overlay 802. The adjustable structures 1002 can be similar to the adjustable structures described above in connection with FIGS. 3A-5D, and can include any of the features of the embodiments of FIGS. 3A-5D. For example, the adjustable structures 1002 can be elongate members (e.g., struts, posts, rods, pins, pillars) extending through the build platform 804. Each adjustable structure 1002 can include an elongate body 1006 having a first end portion 1008 configured to engage the overlay 802, and a second end portion 1010 coupled to an actuator 1004.

As shown in FIG. 10, the actuator 1004 can raise the corresponding adjustable structure 1002 so that the first end portion 1008 contacts and pushes against the second surface 814 of the overlay 802. The overlay 802 can be made out of a flexible and/or deformable material, such that the force applied by the adjustable structure 1002 stretches the overlay 802, thus causing the corresponding support structure 816 to be raised above the remaining portions of the overlay 802. The support structure 816 can be raised to any suitable height, such as a height of at least 1 mm, at least 5 mm, 10 mm, 15 mm, 20 mm, 25 mm, 30 mm, 35 mm, 40 mm, 45 mm, or 50 mm above the first surface 812 of the overlay 802. For instance, the support structure 816 can be raised during an additive manufacturing process to support an unstable region of the object, in accordance with the techniques described in Section II.A. Optionally, when the object is ready to be removed from the overlay 802, the adjustable structure 1002 can be retracted by the actuator 1004 to lower the corresponding support structure 816 away from the object. In some embodiments, selected portions of the overlay 802 proximate to the first end portion 1008 of the adjustable structure 1002 can be secured to the build platform 804 (e.g., via adhesives, fasteners, bonding) so that neighboring support structures 816 are not affected by the movements of the adjustable structure 1002.

In some embodiments, each support structure 816 of the overlay 802 is coupled to a corresponding adjustable structure 1002, and thus can be moved independently of each other. Alternatively, only some of the support structures 816 may be coupled to adjustable structures 1002, such that the remaining support structures 816 remain in a fixed configuration and are not movable.

In some embodiments, an overlay can be provided without any prefabricated support structures. In such embodiments, the overlay can be a flattened substrate configured to form a good mechanical bond to the material of the object so that supports can be printed onto the surface of the overlay. For example, the overlay can have a porous and/or rough microscale structure to facilitate mechanical adhesion to cured material. Optionally, the overlay can be made partially or entirely of materials that have the ability to covalently bond with the cured material, e.g., in embodiments wherein the object is printed directly onto the overlay without supports, and a smooth finish to the object is desired. In such embodiments, the covalent bonds can be reversed or broken with heat, chemical degradation, and/or other suitable techniques. Alternatively, a small amount of covalently bonded overlay material can remain on the printed object, e.g., similar to a monolayer coating. Optionally, the overlay can include surface features (e.g., textures, patterning, cavities) that are filled by material and cured to form an object having corresponding surface features, similar to a molding process. The overlay could then be dissolved, degraded, or otherwise separated from the object to expose the surface features of the object.

In some embodiments, the present technology provides an overlay that is not a prefabricated device, but instead is fabricated in the same additive manufacturing operation as the additively manufactured object. For example, the additive manufacturing operation can include forming an additively manufactured overlay using a first additive manufacturing process, then forming one or more additively manufactured objects on the overlay using a second additive manufacturing process (which may or may not be the same as the first additive manufacturing process). Accordingly, the overlay can be connected to and/or integrally formed with the objects, such that the objects and overlay can be handled and processed as a single unit.

The overlay can be removably coupled to the build platform of the additive manufacturing system to facilitate removal of the objects from the build platform after fabrication. Removal of the overlay from the build platform can be accomplished via mechanical techniques (e.g., peeling, lifting, scraping) and/or with aid of a removal tool (e.g., a knife or blade). Alternatively or in combination, removal of the overlay from the build platform can be accomplished using other techniques, such as solvents, heating, cooling, etc. The overlay can be removed from the build platform by an operator or by an automated mechanism. Removal of the overlay may be performed while the build platform remains in the additive manufacturing system, or the build platform and overlay can be taken out of the additive manufacturing system before the overlay is removed from the build platform. Optionally, the overlay can include features to facilitate removal, such as one or more handle structures (e.g., tabs, loops) and/or one or more chamfered sides. The overlay can alternatively or additionally include features to facilitate draining of residual curable material (e.g., liquid resin) off the objects and/or overlay, such as a rounded top surface, honeycomb structure, grooves, channels, holes, etc.

The overlay can be configured to have sufficient strength to resist fracturing, deformation, weakening, or other damage during removal that might otherwise cause the objects to separate from the overlay and/or compromise the integrity of the overlay. For instance, the overlay can be sufficiently thick to withstand removal forces, e.g., the thickness can be within a range from 0.1 mm to 10 mm. The thickness can be selected based on the properties of the material used to form the overlay (e.g., the mechanical properties of the material in the green state and the post-cured state). The thickness can also depend on the number of material layers used to form the overlay (e.g., an overlay can be made from a single material layer or a plurality of material layers) and the height of the individual layers. Other dimensions of the overlay, such as length and width, can also be varied as desired, e.g., depending on the number and arrangement of objects on the overlay, size of the build platform, compatibility with post-processing devices, etc.

After removal from the build platform, the additively manufactured overlay can be used as a base structure (e.g., a base plate) for handling, manipulating, fixturing, and/or tracking the one or more additively manufactured objects thereon during post-processing. For instance, the objects can undergo at least one post-processing operation while remaining connected to the overlay, such as removal of residual material (e.g., via centrifugation), post-curing, solvent extraction, annealing, laser trimming of support structures, laser marking, etc. Optionally, the overlay can include one or more fixturing structures (e.g., holes, pegs, hooks, interlocking features) that allow the overlay to be temporarily coupled to other components during post-processing, such as containers (e.g., drums, cylinders, boxes), platforms (e.g., trays, plates), conveyor belts, movable arms, etc. Moreover, the overlay can have a standardized size and/or shape that is designed to fit into, be coupled to, or otherwise engage with one or more post-processing devices (e.g., centrifuges, solvent baths, ovens, laser marking devices, laser trimming devices), thereby ensuring compatibility with the post-processing devices regardless of the geometry of the objects. The use of an overlay instead of a build platform as the base structure for supporting the objects during post-processing can provide various advantages, such as allowing for build platforms that are cheaper and/or made from basic materials, simplifying the cleaning of build platforms, and/or reducing the number of build platforms needed in production.

In some embodiments, the additively manufactured overlay is used to prevent or reduce flaking. Flaking may occur, for example, in additively manufactured objects that are post-processed via centrifugation, post-curing, solvent extraction, and annealing. Centrifugation can be used to remove residual curable material from the objects, but some of the residual material may adhere to the surface of the build platform, rather than being completely removed. The residual material on the build platform may be cured together with the objects during post-curing, thereby forming a thin layer of cured material on the build platform. The thin layer of cured material can be prone to flaking during solvent extraction and annealing. For example, immersion of the objects in a solvent, followed by removal of excess solvent by evaporation, can cause the thin layer of cured material to form flakes. The flakes can detach from the build platform during annealing and may be become adhered to the object. The flakes may need to be removed from the objects before the objects are ready for use, which can introduce extra process steps, reduce manufacturing efficiency, and increase manufacturing time and costs. The use of an additively manufactured overlay can obviate the need for using the build platform to support the object during post-processing, thus avoiding conditions that are likely to lead to flaking. Moreover, the overlay itself can be sufficiently thick and durable to resist flaking during post-processing. Additionally, because the objects and overlay can be removed from the build platform before post-curing occurs, it can be easier to clean the build platform since any residual material on the build platform will still be in a liquid form.

In some embodiments, the overlay includes an identifier (e.g., barcode, QR code, label, or other machine-readable markings) that can be used to track the objects during additive manufacturing and post-processing. Additionally, by maintaining the objects on the same overlay throughout additive manufacturing and post-processing, the specific location of each object can be determined and tracked, which may be beneficial for operations where information regarding the locations of individual objects and/or spatial relationships between objects is useful (e.g., laser trimming, laser marking).

Figures 11A, 11B:
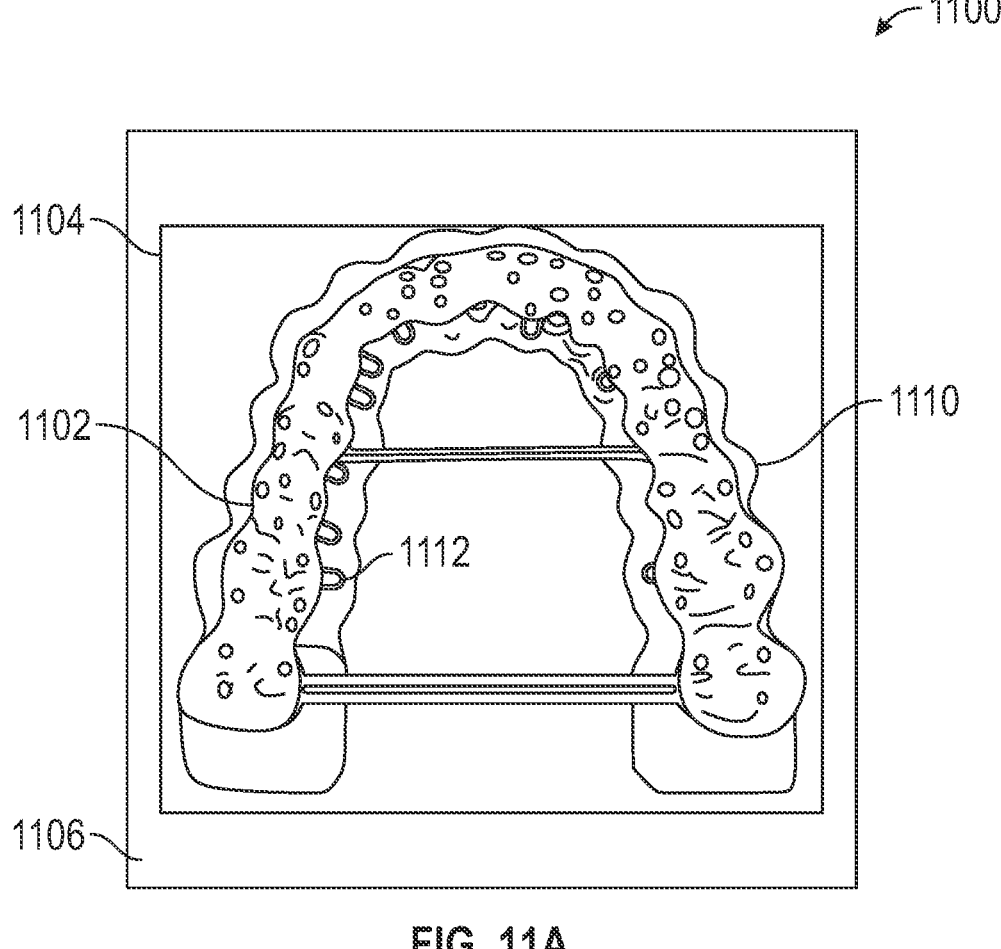
FIG. 11A is a top view of an assembly including an additively manufactured object on an additively manufactured overlay, in accordance with embodiments of the present technology.
FIG. 11B is a partially schematic side view of the assembly of FIG. 11A.

FIGS. 11A and 11B illustrate an assembly 1100 including an additively manufactured object 1102 on an additively manufactured overlay 1104, in accordance with embodiments of the present technology. Specifically, FIG. 11A is a top view of the assembly 1100 and FIG. 11B is a partially schematic side view of the assembly 1100 (the object 1102 is depicted schematically in FIG. 11B merely for purposes of simplicity). Referring to FIGS. 11A and 11B together, the object 1102 and overlay 1104 can be formed on a build platform 1106 via an additive manufacturing operation. The overlay 1104 can be a flattened structure (e.g., film, sheet, membrane) that is connected to and supports the object 1102 during the additive manufacturing operation and/or during post-processing of the object 1102. The overlay 1104 can have a larger surface area than the footprint of the object 1102, e.g., to improve adhesion to the build platform 1106 and stability. As shown in FIG. 11A, the overlay 1104 can be a continuous structure (e.g., a continuous film, sheet, membrane, etc., that does not include any holes or gaps) that covers most or all of the exposed surface of the build platform 1106.

The overlay 1104 can be made out of any material that can be formed via an additive manufacturing process (e.g., SLA, DLP), such as a curable material (e.g., a polymerizable resin) as described herein. The material of the overlay 1104 can exhibit sufficient adhesion to the build platform 1106 to provide a stable base for fabricating the object 1102 (e.g., to avoid peel-off at initial stages of printing). The overlay 1104 can be a single layer of material or can be multiple layers of material (e.g., two, three, four, five, or more layers). The overlay 1104 can have any suitable thickness, such as a thickness within a range from 0.1 mm to 10 mm. In some embodiments, the overlay 1104 is made out of the same material as the object 1102, while in other embodiments, the overlay 1104 can be made out of a different material than the object 1102. In embodiments where the overlay 1104 is made out of a different material than the object 1102, the overlay 1104 can be made out of a lower cost material, since the overlay 1104 is not intended to be in the final product and thus may not need to exhibit the same material properties (e.g., durability, strength, transparency) as the object 1102.

As best seen in FIG. 11B, the object 1102 can be connected to the overlay 1104 via one or more support structures 1108. The support structures 1108 can include a raft 1110 formed on the overlay 1104, and a plurality of elongate supports 1112 (e.g., struts, rods, pins, cones) formed on the raft 1110. The raft 1110 can be a flattened structure having a surface area similar to or larger than the footprint of object 1102 form a stable base for printing the object 1102 on the overlay 1104. The surface area of the raft 1110 can be smaller than the surface area of the overlay 1104. The elongate supports 1112 can connect the object 1102 to the raft 1110, and can be used to stabilize overhangs, bridges, island, valleys, and/or other portions of the object 1102 that may otherwise deform or collapse. Optionally, the raft 1110 can be omitted, such that the elongate supports 1112 are connected directly to the overlay 1104.

The support structures 1108 (e.g., the raft 1110 and/or elongate supports 1112) can be made out of any material that can be formed via an additive manufacturing process (e.g., SLA, DLP), such as a curable material (e.g., a polymerizable resin) as described herein. In some embodiments, the support structures 1108 are made out of the same material as the object 1102 and/or the overlay 1104, while in other embodiments, the support structures 1108 can be made out of a different material than the object 1102 and/or the overlay 1104. In embodiments where the support structures 1108 are made out of a different material than the object 1102, the support structures 1108 can be made out of a lower cost material, since the support structures 1108 are typically not intended to be in the final product and thus may not need to exhibit the same material properties (e.g., durability, strength, transparency) as the object 1102.

The object 1102, overlay 1104, and support structures 1108 can be formed in the same additive manufacturing operation. In some embodiments, the overlay 1104 is formed from the initial one or more layers of material that are deposited and cured on the build platform 1106 during the additive manufacturing operation, and the support structures 1108 and overlay 1104 are formed from subsequent layers of material that are deposited and cured on the initial layer(s). For example, the overlay 1104 can be formed from one or more first material layers that are deposited and cured on the build platform 1106, the support structures 1108 can be formed from one or more second material layers that are deposited and cured on the one or more first material layers, and the object 1102 can be formed from one or more third material layers that are deposited and cured on the one or more second material layers. In some embodiments, the support structures 1108 are omitted, such that the material layers of the object 1102 are deposited and cured directly onto the material layer(s) of the overlay 1104.

The overlay 1104 can be removably coupled to the build platform 1106 to facilitate removal of the object 1102 from the build platform 1106. For example, the adhesion between the build platform 1106 and the overlay 1104 can be sufficiently weak such that the overlay 1104 can be separated from the build platform 1106 by mechanical techniques such as peeling, lifting, scraping, etc. Alternatively or in combination, separation of the overlay 1104 from the build platform 1106 can be accomplished using other techniques, such as solvents, heating, cooling, etc., as long as such techniques do not damage the object 1102. The overlay 1104 can be removed from build platform 1106 manually, with aid of a tool (e.g., a blade), or using an automated mechanism. Optionally, the overlay 1104 can include one or more handle structures such as tabs, loops, etc., to facilitate gripping and removal of the overlay 1104 from the build platform 1106.

The object 1102 and support structures 1108 can remain connected to the overlay 1104 and thus can be removed from the build platform 1106 with the overlay 1104 as a single unitary assembly. Once removed from the build platform 1106, the object 1102 can undergo at least one post-processing operation while the object 1102 remains connected to the overlay 1104 and the support structures 1108. The post-processing operation can include any of the processes described herein, such as removal of residual material (e.g., via centrifugation), post-curing, solvent extraction, and/or annealing.

In some embodiments, the overlay 1104 is configured to resist flaking during post-processing of the object 1102. For example, the overlay 1104 can be sufficiently thick so that, when exposed to a solvent during a solvent extraction process, the solvent does not penetrate through the overlay 1104 to cause flaking of the overlay 1104 when residual solvent is evaporated. The thickness of the overlay 1104 can be at least 25 μm, 50 μm, 100 μm, 150 μm, or 200 μm.

In some embodiments, the overlay 1104 serves as a substrate for handling and supporting the object 1102 during post-processing. For example, the overlay 1104 can include one or more fixturing structures (e.g., holes, pegs, hooks, interlocking features) that allow the overlay 1104 to be temporarily coupled to other components during post-processing (e.g., containers, conveyor belts, plates, movable arms). Moreover, the overlay 1104 can have a standardized size and/or shape that is designed to fit into, be coupled to, or otherwise engage with one or more post-processing devices (e.g., centrifuges, solvent baths, ovens, laser trimming devices), thereby ensuring compatibility with the post-processing devices regardless of the geometry of the object 1102. Optionally, the overlay 1104 can include an identifier (e.g., barcode, QR code, label, or other machine-readable markings) that can be used to track the object 1102 during additive manufacturing and post-processing.

Once the desired post-processing operations are completed, the object 1102 can be removed from the overlay 1104. For example, the support structures 1108 can be fractured, dissolved, degraded, or otherwise removed to separate the object 1102 from the overlay 1104. The object 1102 can undergo further post-processing, if appropriate, and/or can be prepared for packaging and shipment.

Although FIGS. 11A and 11B illustrate a single object 1102 on the overlay 1104, the overlay 1104, as well as any of the other overlays described herein, can be used to support a plurality of objects, such as two, three, four, five, 10, 20, 50, or more objects. In such embodiments, the objects 1102 can be manufactured and post-processed concurrently on the overlay 1104, such that the overlay 1104 can be used to support, manipulate, fixture, and/or track multiple objects 1102 through any of the additive manufacturing and post-processing operations described herein.

Figure 11C:
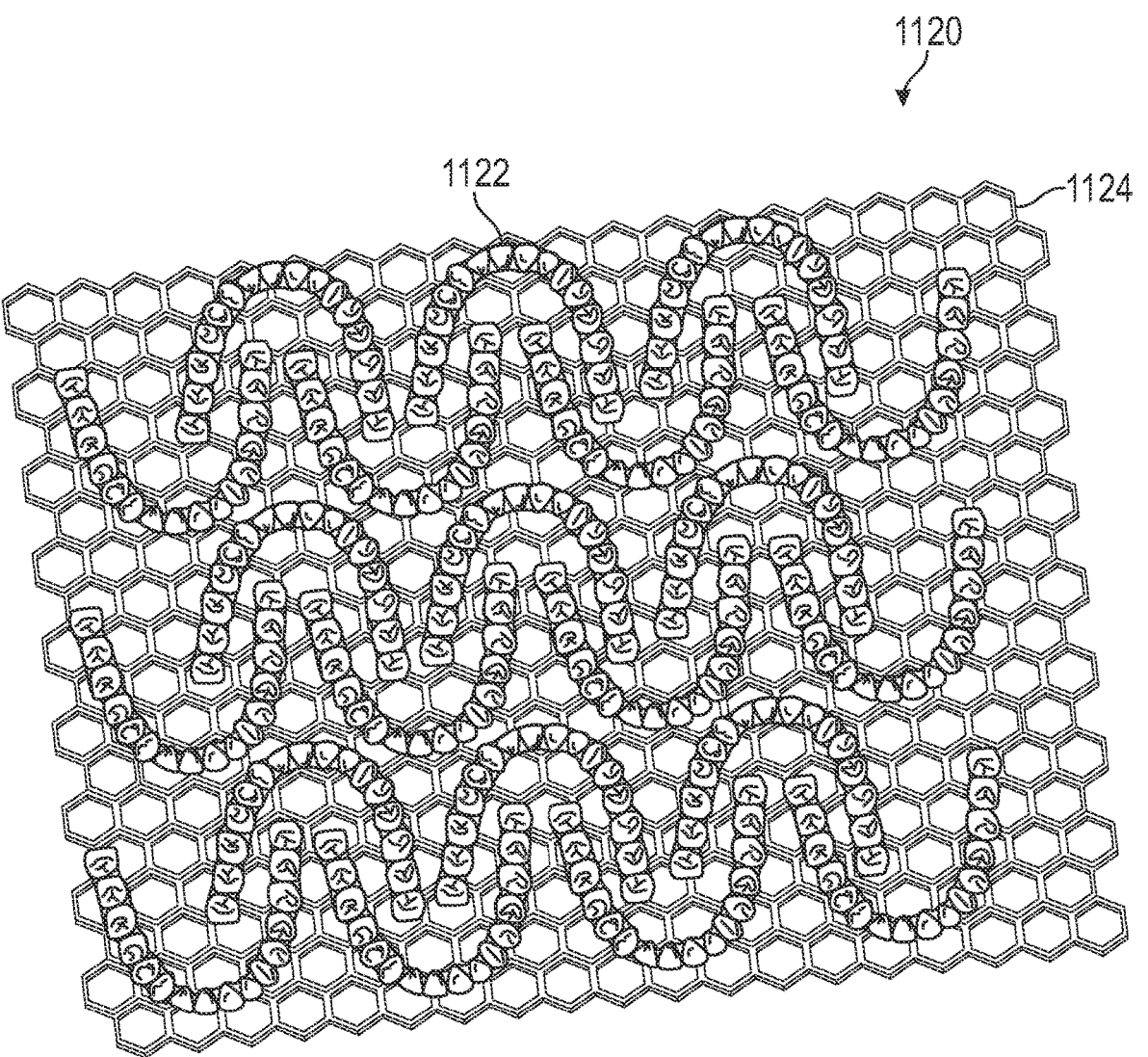
FIG. 11C is a perspective view of an assembly including a plurality of additively manufactured objects on an additively manufactured overlay, in accordance with embodiments of the present technology.

FIG. 11C is a perspective view of an assembly 1120 including a plurality of additively manufactured objects 1122 on an additively manufactured overlay 1124, in accordance with embodiments of the present technology. The features of the overlay 1124 can be generally similar to those of the overlay 1104 of FIGS. 11A and 11B, except that the overlay 1124 is a mesh structure (e.g., a grid, lattice) composed of a plurality of interconnected cells, rather than a continuous sheet. Although the cells are depicted as having a hexagonal shape, such that the overlay 1124 has a honeycomb structure, in other embodiments, some or all of the cells can have a different shape, such as circular, oval, square, rectangular, triangular, or any other polygonal or non-polygonal shape. Each cell of the overlay 1124 can have a respective opening therein, which can be used to drain uncured material (e.g., liquid resin) off the objects 1122 and overlay 1124 during post-processing (e.g., during centrifugation). The overlay 1124 can include a plurality of interconnected struts that define the cells, and the struts can have a thickness and/or width within a range from 0.3 mm to 30 mm.

Figure 11D:
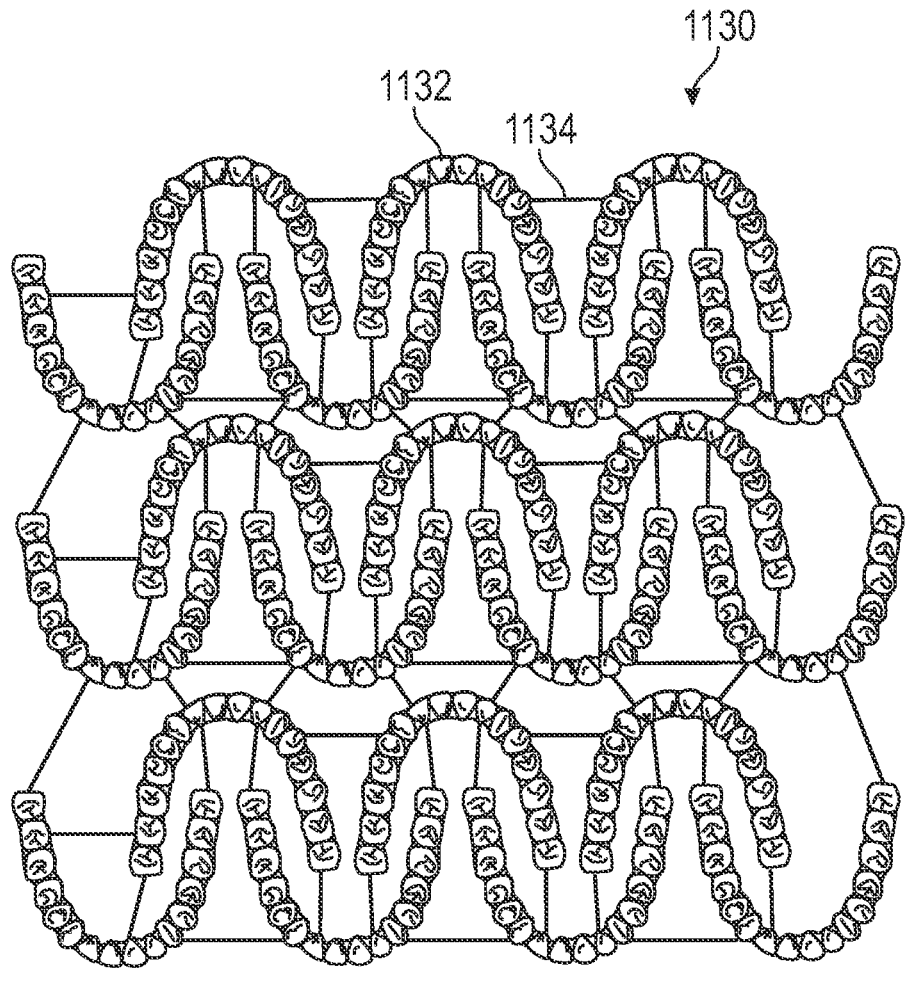
FIG. 11D is a top view of an assembly including a plurality of additively manufactured objects on an additively manufactured overlay, in accordance with embodiments of the present technology.

FIG. 11D is a top view of an assembly 1130 including a plurality of additively manufactured objects 1132 on an additively manufactured overlay 1134, in accordance with embodiments of the present technology. The features of the overlay 1134 can be generally similar to the embodiments of FIGS. 11A-11C, except that the overlay 1134 is composed of a plurality of connectors that couple the objects 1132 to each other, rather than being a single unitary structure. The connectors can be elongate members (e.g., struts, rods, bridges, arms) that couple to respective portions of neighboring objects 1132 so that the objects 1132 can be removed from the build platform and/or post-processed as a single unit. The locations and dimensions of the connectors can be selected based on the geometries of the objects 1132, the spacing between the objects 1132, the strength of the material used to form the connectors, etc. The connectors can have a thickness and/or width within a range from 0.3 mm to 30 mm.

Figure 11E:
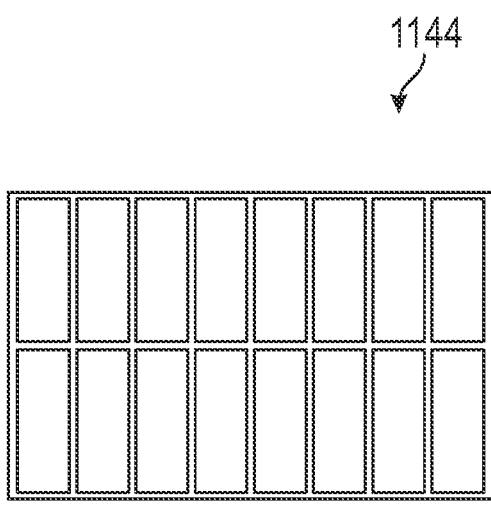
FIG. 11E is a top view of an additively manufactured overlay, in accordance with embodiments of the present technology.

FIG. 11E is a top view of an additively manufactured overlay 1144, in accordance with embodiments of the present technology. The overlay 1144 can be generally similar to the overlay 1124 of FIG. 11C, in that the overlay 1144 is a mesh structure (e.g., a grid) composed of a plurality of interconnected cells. As shown in FIG. 11E, the overlay 1144 includes a plurality of rectangular cells that are arranged in an array. Although FIG. 11E illustrates an array with two rows and eight columns of rectangular cells, in other embodiments, the number of rows and columns can be varied as desired. The overlay 1144 can include a plurality of interconnected struts that define the rectangular cells, and the struts can have a thickness and/or width within a range from 0.3 mm to 30 mm.

Figure 11F:
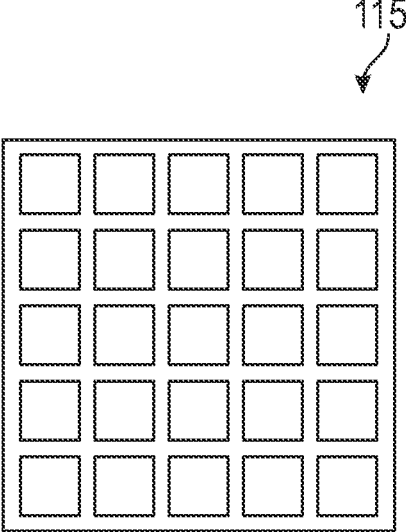
FIG. 11F is a top view of an additively manufactured overlay, in accordance with embodiments of the present technology.

FIG. 11F is a top view of an additively manufactured overlay 1154, in accordance with embodiments of the present technology. The overlay 1154 can be generally similar to the overlay 1124 of FIG. 11C and the overlay 1144 of FIG. 11E, in that the overlay 1154 is a mesh structure (e.g., a grid) composed of a plurality of interconnected cells. As shown in FIG. 11F, the overlay 154 includes a plurality of square cells that are arranged in an array. Although FIG. 11F illustrates an array with five rows and five columns of square cells, in other embodiments, the number of rows and columns can be varied as desired. The overlay 1154 can include a plurality of interconnected struts that define the square cells, and the struts can have a thickness and/or width within a range from 0.3 mm to 30 mm.

In some embodiments, the additive manufacturing systems herein are configured to form an additively manufactured overlay together with one or more additively manufactured objects based on a set of fabrication instructions. The fabrication instructions can include a first digital representation of the objects (e.g., a first 3D digital model of the objects), and a second digital representation of the overlay (e.g., a second 3D digital model of the overlay). In some embodiments, the second digital representation of the overlay is added to the first digital representation of the objects via layout software. The layout software can select an appropriate type of overlay to be used, and then determine how the objects are to be arranged on the overlay for printing. The overlay selection and object arrangement processes can be performed automatically, manually by a user, or suitable combinations thereof.

D. Additive Manufacturing Systems with Sensors

Figure 12:
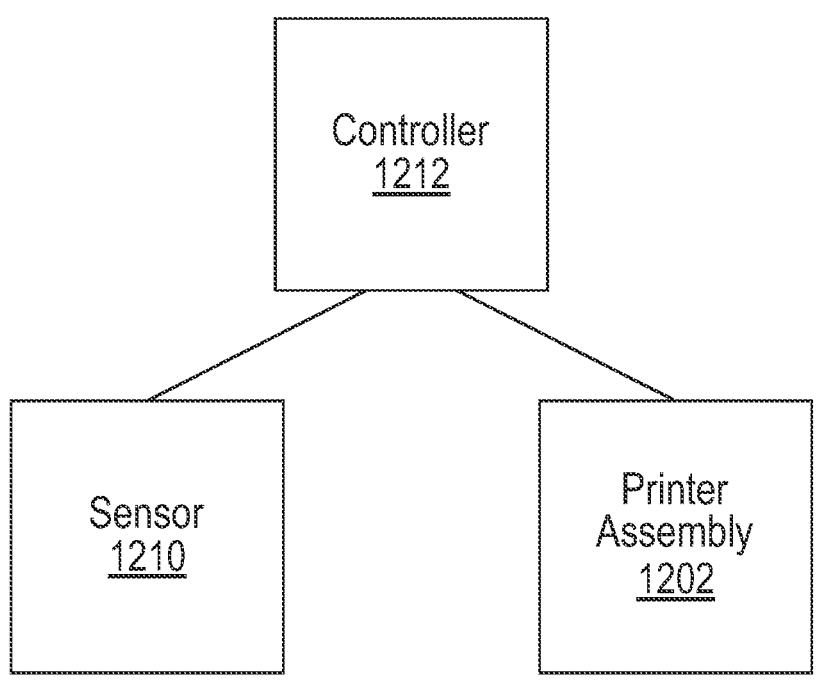
FIG. 12 is a partially schematic diagram of an additive manufacturing system configured in accordance with embodiments of the present technology.
Figure 12:
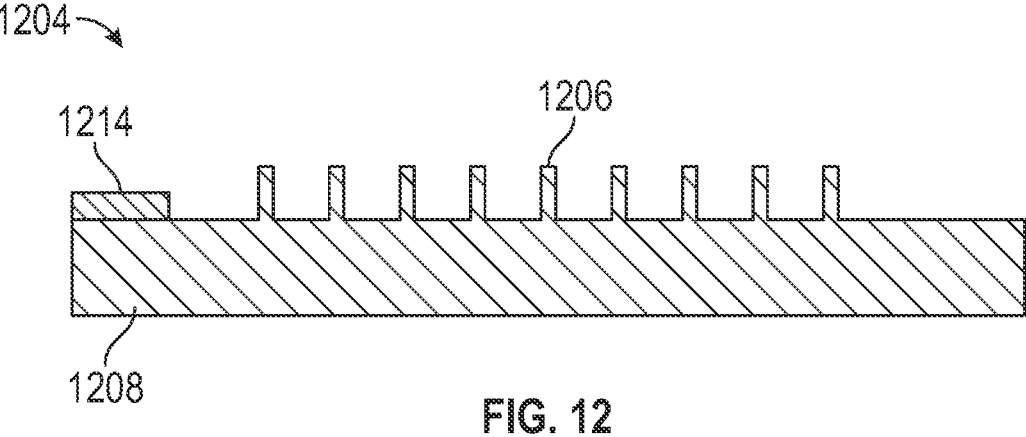

FIG. 12 is a partially schematic diagram of an additive manufacturing system ("system 1200") configured in accordance with embodiments of the present technology. The system 1200 can include a printer assembly 1202 (shown schematically) for fabricating one or more objects via an additive manufacturing process, such as any of the processes described herein. For example, the printer assembly 1202 can include a source of a precursor material (e.g., recoaters, nozzles, reservoirs, extruders) and an energy source (e.g., a light engine) configured to apply energy to the precursor material to form an object.

The system 1200 also includes a device 1204 including a plurality of prefabricated support structures 1206 for supporting the objects during the additive manufacturing process. The device 1204 can be or include any of the embodiments provided herein, such as any of the embodiments described above in Sections II.A-II.C. For example, the support structures 1206 can be part of a build platform 1208 (e.g., similar to the embodiments of FIGS. 3A-7B), an overlay (not shown) attached to the build platform 1208 (e.g., similar to the embodiments of FIGS. 8A-11F), or suitable combinations thereof (e.g., some of the support structures 1206 can be part of the build platform 1208 while other support structures 1206 can be part of an overlay).

The system 1200 can include at least one sensor 1210 (e.g., one, two, three, four, five, or more sensors 1210— shown schematically) configured to monitor the device 1204. In some embodiments, the sensor 1210 is used to generate sensor data that can be used to identify the configuration of the support structures 1206. For example, the sensor data can be used to determine one or more of the following parameters: the types of support structures 1206 present (e.g., number, sizes, shapes, material composition), the geometry of the support structures 1206 (e.g., how the support structures 1206 are arranged (such as the array shape and dimensions), the locations of the support structures 1206 (x-, y- and/or z-coordinates), the heights of the support structures 1206, whether the support structures 1206 are actuatable, whether the support structures 1206 are fixed, whether an overlay is present, the characteristics of the overlay (e.g., size, shape, material composition), whether the support structures 1206 are part of the build platform 1208, whether the support structures 1206 are part of the overlay, and/or any other information relevant to the support structure configuration.

In some embodiments, the sensor 1210 directly detects the configuration of the support structures 1206, e.g., the sensor 1210 generates measurements of the support structure locations, heights, shapes, etc. For instance, the sensor 1210 can include an imaging device (e.g., camera, scanner) that generates image data of the support structures 1206. The image data can be transmitted to a controller 1212 (shown schematically) that analyzes the image data using computer vision techniques, machine learning algorithms, and/or other suitable approaches to determine the configuration of the support structures 1206 and their locations (e.g., 3D coordinates) relative to the printer assembly 1202. Optionally, in embodiments where some or all of the support structures 1206 are adjustable, the heights of the support structures 1206 can be determined based on feedback from the actuators controlling the support structures 1206. For instance, the feedback can be generated using strain sensors, potentiometers, and/or other suitable devices that are operably coupled to the actuators.

Alternatively or in combination, the sensor 1210 can detect an identifier 1214 associated with the device 1204, and the identifier 1214 can be used to determine the support structure configuration. The identifier 1214 can be or include a tag (e.g., RFID tag), code, label, etc., that includes information directly identifying the current configuration of the support structures 1206, or can be used to retrieve such information. The identifier 1214 can be located at any suitable part of the device 1204, such as on or associated with the build platform 1208, on or associated with the overlay (if present), or suitable combinations thereof. The sensor 1210 can scan the identifier 1214 to retrieve information identifying the build platform 1208 and/or overlay (if present) that are currently in use. The identification information can then be used to look up the configuration of support structures 1206 of the particular build platform 1208 and/or overlay, e.g., by retrieving the configuration information from a database or other suitable data structure stored in the memory of the printer assembly 1202, controller 1212, or other computing device.

In some embodiments, the build platform 1208 and/or overlay (if present) include fiducial markers on one or more portions thereof that can be detected by the sensor 1210. For example, the fiducial markers can indicate the 3D spatial locations of any of the following components relative to the printer assembly 1202: the support structures 1206, the build platform 1208, the printable surfaces of the build platform 1208, the overlay (if present), the printable surfaces of the overlay, or suitable combinations thereof. The fiducial markers can thus be used to align the print with the build platform 1208, overlay, and/or support structures. Additionally, the fiducial markers can provide feedback during the additive manufacturing process to confirm whether the print is still properly aligned with the above components, or whether the print has become misaligned and should be adjusted or aborted.

The fiducial markers can include surface markings on the build platform 1208 and/or overlay that can be imaged by the sensor 1210 and analyzed using computer vision, machine learning algorithms, etc., to determine the 3D spatial information. Alternatively or in combination, the fiducial markers can include devices coupled to or integrated with the build platform 1208 and/or overlay, such as mechanical switches or devices (e.g., protrusions that hit a contact sensor), electrical switches, electromagnetic tracking devices, magnets, acoustic emitters, optical emitters, etc., that can be detected by or otherwise interact with the sensor 1210 to produce sensor data indicative of the 3D spatial information.

The controller 1212 can be or include a computing device including one or more processors and memory storing instructions for controlling the operation of the printer assembly 1202. Although the controller 1212 is depicted as being separate from and operably coupled to the printer assembly 1202, in other embodiments, the controller 1212 can be part of the printer assembly 1202. In some embodiments, the controller 1212 receives and processes data from the sensor 1210 to determine the configuration and location information, as described above. The controller 1212 can then adjust the operation of the printer assembly 1202 so that the printer assembly 1202 interfaces correctly with the support structures 1206.

For example, the controller 1212 can receive a digital representation of the object (e.g., a 3D model). The controller 1212 can use the digital representation, along with the configuration and location information for the support structures 1206, to align the object with the build platform 1208, overlay (if present), and/or support structures 1206. The controller 1212 can implement one or more software algorithms that determine an optimum position and/or orientation for the object with respect to the build platform 1208, overlay, and/or support structures 1206. In some embodiments, the algorithm adjusts the position and/or orientation of the object to match the locations and geometries of the support structures 1206. For example, in embodiments where some or all of the support structures 1206 are of differing heights, the algorithm can determine the position and/or orientation of the object so that the local and/or global maxima and/or minima of the object geometry conform to the height distribution of the support structures 1206. The algorithm can ensure that unstable regions (e.g., overhangs, island, bridges, valleys) will be stabilized by a corresponding support structure 1206 at the appropriate stage of the print. The algorithm can also ensure that unused support structures 1206 do not obstruct the printer assembly 1202, collide with other portions of the object, or otherwise interfere with the printing process. In embodiments where some or all of the support structures 1206 are adjustable, the algorithm can determine a height distribution of the support structures 1206 that would properly support the object geometry. Additionally, the algorithm can determine the appropriate timing for raising the support structures 1206 to their respective target heights, to provide the appropriate support without interfering with the print.

Optionally, in embodiments where the support structures 1206 are part of a removable overlay, the support structures 1206 can be modified by subtractive methods to match the object to be printed. For example, the printer assembly 1202 or a separate subtractive manufacturing device or system can implement a subtractive manufacturing technique (e.g., milling, laser cutting, etching, abrading, melting) to remove certain support structures 1206 and/or to alter the geometries of certain support structures 1206 to better conform to the object geometry, before starting the additive manufacturing process to fabricate the object.

In some embodiments, the sensor 1210 also provides feedback during the additive manufacturing process. For instance, image data of the printed object can be used to verify that the print is occurring as desired. As another example, infrared data can be used to detect the extent of curing of a resin or other precursor material. In a further example, ultrasonic imaging can be used to determine whether the printed object matches the intended object geometry. The feedback can be used by the controller 1212 to adjust the operation of the printer assembly 1202. Optionally, if the controller 1212 determines that the print is too far off course, the controller 1212 can abort the print at an earlier stage, thus reducing time lost and material wastage.

III. Dental Appliances and Associated Methods

Figure 13A:
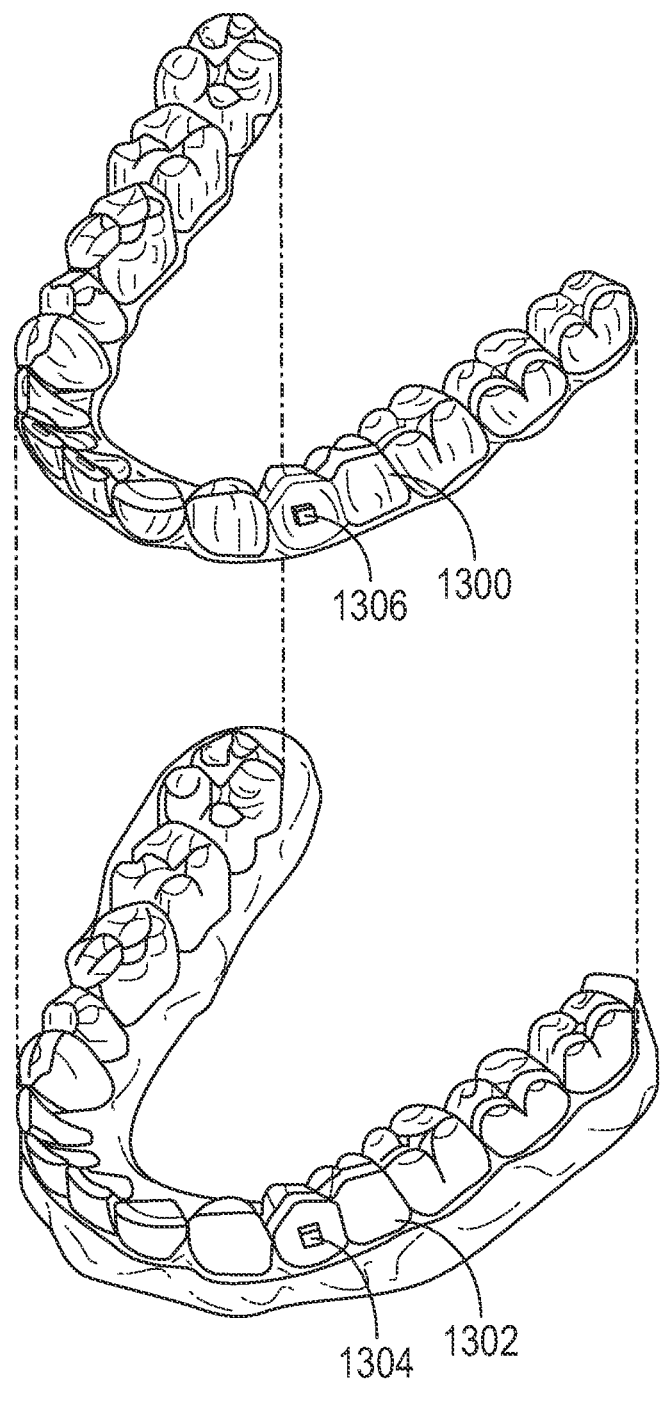
FIG. 13A illustrates a representative example of a tooth repositioning appliance configured in accordance with embodiments of the present technology.

FIG. 13A illustrates a representative example of a tooth repositioning appliance 1300 configured in accordance with embodiments of the present technology. The appliance 1300 can be manufactured and post-processed using any of the systems, methods, and devices described herein. The appliance 1300 (also referred to herein as an "aligner") can be worn by a patient in order to achieve an incremental repositioning of individual teeth 1302 in the jaw. The appliance 1300 can include a shell (e.g., a continuous polymeric shell or a segmented shell) having teeth-receiving cavities that receive and resiliently reposition the teeth. The appliance 1300 or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance.

The appliance 1300 can fit over all teeth present in an upper or lower jaw, or less than all of the teeth. The appliance 1300 can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance 1300 can be a generic appliance configured to receive the teeth, but not necessarily shaped to match the topography of the patient's teeth. In some cases, only certain teeth received by the appliance 1300 are repositioned by the appliance 1300 while other teeth can provide a base or anchor region for holding the appliance 1300 in place as it applies force against the tooth or teeth targeted for repositioning. In some cases, some, most, or even all of the teeth can be repositioned at some point during treatment. Teeth that are moved can also serve as a base or anchor for holding the appliance as it is worn by the patient. In preferred embodiments, no wires or other means are provided for holding the appliance 1300 in place over the teeth. In some cases, however, it may be desirable or necessary to provide individual attachments 1304 or other anchoring elements on teeth 1302 with corresponding receptacles 1306 or apertures in the appliance 1300 so that the appliance 1300 can apply a selected force on the tooth. Representative examples of appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 13B:
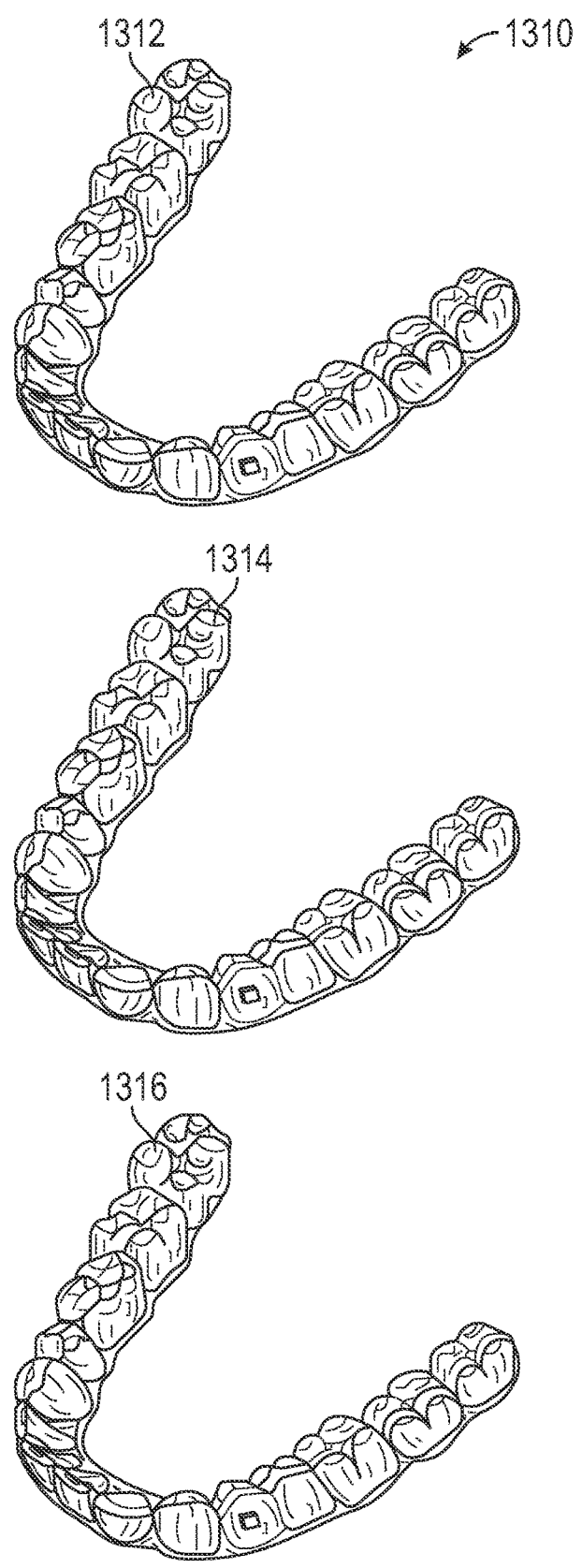
FIG. 13B illustrates a tooth repositioning system including a plurality of appliances, in accordance with embodiments of the present technology.

FIG. 13B illustrates a tooth repositioning system 1310 including a plurality of appliances 1312, 1314, 1316, in accordance with embodiments of the present technology. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 1310 can include a first appliance 1312 corresponding to an initial tooth arrangement, one or more intermediate appliances 1314 corresponding to one or more intermediate arrangements, and a final appliance 1316 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

FIG. 13C illustrates a method 1320 of orthodontic treatment using a plurality of appliances, in accordance with embodiments of the present technology. The method 1320 can be practiced using any of the appliances or appliance sets described herein. In block 1322, a first orthodontic appliance is applied to a patient's teeth in order to reposition the teeth from a first tooth arrangement to a second tooth arrangement. In block 1324, a second orthodontic appliance is applied to the patient's teeth in order to reposition the teeth from the second tooth arrangement to a third tooth arrangement. The method 1320 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

FIG. 14 illustrates a method 1400 for designing an orthodontic appliance, in accordance with embodiments of the present technology. The method 1400 can be applied to any embodiment of the orthodontic appliances described herein. Some or all of the steps of the method 1400 can be performed by any suitable data processing system or device, e.g., one or more processors configured with suitable instructions.

In block 1402, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In block 1404, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, block 1404 can involve determining a particular type of force to be applied (e.g., extrusive force, intrusive force, translational force, rotational force, tipping force, torquing force, etc.) without calculating the specific magnitude and/or direction of the force.

The determination of the force system can include constraints on the allowable forces, such as allowable directions and magnitudes, as well as desired motions to be brought about by the applied forces. For example, in fabricating palatal expanders, different movement strategies may be desired for different patients. For example, the amount of force needed to separate the palate can depend on the age of the patient, as very young patients may not have a fully-formed suture. Thus, in juvenile patients and others without fully-closed palatal sutures, palatal expansion can be accomplished with lower force magnitudes. Slower palatal movement can also aid in growing bone to fill the expanding suture. For other patients, a more rapid expansion may be desired, which can be achieved by applying larger forces. These requirements can be incorporated as needed to choose the structure and materials of appliances; for example, by choosing palatal expanders capable of applying large forces for rupturing the palatal suture and/or causing rapid expansion of the palate. Subsequent appliance stages can be designed to apply different amounts of force, such as first applying a large force to break the suture, and then applying smaller forces to keep the suture separated or gradually expand the palate and/or arch.

The determination of the force system can also include modeling of the facial structure of the patient, such as the skeletal structure of the jaw and palate. Scan data of the palate and arch, such as X-ray data or 3D optical scanning data, for example, can be used to determine parameters of the skeletal and muscular system of the patient's mouth, so as to determine forces sufficient to provide a desired expansion of the palate and/or arch. In some embodiments, the thickness and/or density of the mid-palatal suture may be measured, or input by a treating professional. In other embodiments, the treating professional can select an appropriate treatment based on physiological characteristics of the patient. For example, the properties of the palate may also be estimated based on factors such as the patient's age—for example, young juvenile patients can require lower forces to expand the suture than older patients, as the suture has not yet fully formed.

In block 1406, a design for an orthodontic appliance configured to produce the force system is determined. The design can include the appliance geometry, material composition and/or material properties, and can be determined in various ways, such as using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA (Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In block 1408, instructions for fabrication of the orthodontic appliance incorporating the design are generated. The instructions can be configured to control a fabrication system or device in order to produce the orthodontic appliance with the specified design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Although the above steps show a method 1400 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 1400 may be performed with any suitable fabrication system or device, such as the embodiments described herein. Some of the steps may be optional, e.g., the process of block 1404 can be omitted, such that the orthodontic appliance is designed based on the desired tooth movements and/or determined tooth movement path, rather than based on a force system. Moreover, the order of the steps can be varied as desired.

FIG. 15 illustrates a method 1500 for digitally planning an orthodontic treatment and/or design or fabrication of an appliance, in accordance with embodiments. The method 1500 can be applied to any of the treatment procedures described herein and can be performed by any suitable data processing system.

In block 1502, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In block 1504, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In block 1506, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 15, design and/or fabrication of an orthodontic appliance, and perhaps a particular orthodontic treatment, may include use of a representation of the patient's teeth (e.g., including receiving a digital representation of the patient's teeth (block 1502)), followed by design and/or fabrication of an orthodontic appliance based on a representation of the patient's teeth in the arrangement represented by the received representation.

As noted herein, the techniques described herein can be used for the direct fabrication of dental appliances, such as aligners and/or a series of aligners with tooth-receiving cavities configured to move a person's teeth from an initial arrangement toward a target arrangement in accordance with a treatment plan. Aligners can include mandibular repositioning elements, such as those described in U.S. Pat. No. 10,912,629, entitled "Dental Appliances with Repositioning Jaw Elements," filed Nov. 30, 2015; U.S. Pat. No. 10,537, 406, entitled "Dental Appliances with Repositioning Jaw Elements," filed Sep. 19, 2014; and U.S. Pat. No. 9,844,424, entitled "Dental Appliances with Repositioning Jaw Elements," filed Feb. 21, 2014; all of which are incorporated by reference herein in their entirety.

The techniques used herein can also be used to manufacture attachment placement devices, e.g., appliances used to position prefabricated attachments on a person's teeth in accordance with one or more aspects of a treatment plan. Examples of attachment placement devices (also known as "attachment placement templates" or "attachment fabrication templates") can be found at least in: U.S. application Ser. No. 17/249,218, entitled "Flexible 3D Printed Orthodontic Device," filed Feb. 24, 2021; U.S. application Ser. No. 16/366,686, entitled "Dental Attachment Placement Structure," filed Mar. 27, 2019; U.S. application Ser. No. 15/674,662, entitled "Devices and Systems for Creation of Attachments," filed Aug. 11, 2017; U.S. Pat. No. 11,103, 330, entitled "Dental Attachment Placement Structure," filed Jun. 14, 2017; U.S. application Ser. No. 14/963,527, entitled "Dental Attachment Placement Structure," filed Dec. 9, 2015; U.S. application Ser. No. 14/939,246, entitled "Dental Attachment Placement Structure," filed Nov. 12, 2015; U.S. application Ser. No. 14/939,252, entitled "Dental Attachment Formation Structures," filed Nov. 12, 2015; and U.S. Pat. No. 9,700,385, entitled "Attachment Structure," filed Aug. 22, 2014; all of which are incorporated by reference herein in their entirety.

The techniques described herein can be used to make incremental palatal expanders and/or a series of incremental palatal expanders used to expand a person's palate from an initial position toward a target position in accordance with one or more aspects of a treatment plan. Examples of incremental palatal expanders can be found at least in: U.S. application Ser. No. 16/380,801, entitled "Releasable Palatal Expanders," filed Apr. 10, 2019; U.S. application Ser. No. 16/022,552, entitled "Devices, Systems, and Methods for Dental Arch Expansion," filed Jun. 28, 2018; U.S. Pat. No. 11,045,283, entitled "Palatal Expander with Skeletal Anchorage Devices," filed Jun. 8, 2018; U.S. application Ser. No. 15/831,159, entitled "Palatal Expanders and Methods of Expanding a Palate," filed Dec. 4, 2017; U.S. Pat. No. 10,993,783, entitled "Methods and Apparatuses for Customizing a Rapid Palatal Expander," filed Dec. 4, 2017; and U.S. Pat. No. 7,192,273, entitled "System and Method for Palatal Expansion," filed Aug. 7, 2003; all of which are incorporated by reference herein in their entirety.

EXAMPLES

The following examples are included to further describe some aspects of the present technology, and should not be used to limit the scope of the technology.

Example 1. A device for supporting an object during an additive manufacturing process, the device comprising:

a build platform comprising a surface;

a plurality of support structures extending above the surface of the build platform, wherein each support structure is configured to couple to a portion of an additively manufactured object; and a plurality of actuators, wherein each actuator is configured to adjust a position of a corresponding support structure relative to the build platform.

Example 2. The device of Example 1, wherein:

each support structure comprises an elongate body and an end portion, the elongate body is coupled to the corresponding actuator, and the end portion is configured to couple to the portion of the additively manufactured object.

Example 3. The device of Example 2, wherein the end portion is wider than the elongate body.

Example 4. The device of Example 2 or 3, wherein the end portion comprises an expanded configuration and a low-profile configuration.

Example 5. The device of Example 4, wherein the end portion has a first width when in the expanded configuration, and a second width when the low-profile configuration, the first width being greater than the second width.

Example 6. The device of Example 4 or 5, wherein each support structure is configured to be in the expanded configuration when coupling to the portion of the additively manufactured object, and configured to be in the low-profile configuration when decoupling from the portion of the additively manufactured object.

Example 7. The device of any one of Examples 4 to 6, further comprising a second actuator configured to transition the end portion between the expanded configuration and the low-profile configuration.

Example 8. The device of any one of Examples 4 to 7, wherein the end portion comprises an elastic material configured to change in shape to transition the end portion between the expanded configuration and the low-profile configuration.

Example 9. The device of any one of Examples 1 to 8, wherein the plurality of actuators comprise a plurality of pistons.

Example 10. The device of any one of Examples 1 to 9, wherein each actuator is configured to adjust a height of the corresponding support structure above the surface of the build platform.

Example 11. The device of Example 10, wherein the height corresponds to a vertical location of the portion of the additively manufactured object.

Example 12. The device of any one of Examples 1 to 11, wherein each actuator is configured to retract the corresponding support structure toward the build platform to decouple the corresponding support structure from the corresponding portion of the additively manufactured object.

Example 13. The device of any one of Examples 1 to 12, further comprising an overlay positioned on the surface of the build platform.

Example 14. The device of Example 13, wherein the overlay is configured to protect the surface of the build platform from contamination.

Example 15. The device of Example 13 or 14, wherein the overlay is removable.

Example 16. A method comprising:

providing a build platform comprising a plurality of support structures;

moving a first set of the support structures to a first height above the build platform;

forming a first portion of an object onto the first set of support structures using an additive manufacturing process;

moving a second set of the support structures to a second height above the build platform, the second height being different than the first height; and forming a second portion of the object onto the second set of support structures using the additive manufacturing process.

Example 17. The method of Example 16, wherein the first and second object portions are formed from a curable material.

Example 18. The method of Example 16 or 17, wherein the first height corresponds to a vertical location of the first portion of the object, and the second height corresponding to a vertical location of the second portion of the object.

Example 19. The method of any one of Examples 16 to 18, further comprising determining the first and second heights based on a geometry of the object.

Example 20. The method of any one of Examples 16 to 19, wherein each support structure comprises an elongate body and an end portion.

Example 21. The method of Example 20, wherein the first portion of the object is formed on the end portions of the first set of support structures, and the second portion of the object is formed on the end portions of the second set of support structures.

Example 22. The method of Example 20 or 21, wherein the end portion is wider than the elongate body.

Example 23. The method of any one of Examples 20 to 22, wherein the end portion comprises an expanded configuration and a low-profile configuration.

Example 24. The method of Example 23, further comprising:

transitioning the end portions of the first set of support structures to the expanded configuration before forming the first portion of the object on the first set of support structures, and transitioning the end portions of the second set of support structures to the expanded configuration before forming the second portion of the object on the second set of support structures.

Example 25. The method of Example 23 or 24, further comprising separating the object from the build platform by:

transitioning the end portions of the first and second sets of support structures to the low-profile configuration, and retracting the first and second sets of support structures away from the object.

Example 26. The method of any one of Examples 23 to 25, wherein the object comprises a dental appliance.

Example 27. A device for supporting an object during an additive manufacturing process, the device comprising:

a build platform comprising a surface; and an overlay configured to be removably coupled to the surface of the build platform, wherein the overlay comprises plurality of support structures extending above the surface of the build platform, and wherein each support structure is configured to couple to a portion of an additively manufactured object.

Example 28. The device of Example 27, wherein the overlay comprises a substrate configured to at least partially cover the surface of the build platform, and the plurality of support structures are connected to the substrate.

Example 29. The device of Example 28, wherein:

each support structure comprises an elongate body and an end portion, the elongate body is connected to the substrate, and the end portion is configured to couple to the portion of the additively manufactured object.

Example 30. The device of Example 29, wherein the end portion has a different width than the elongate body.

Example 31. The device of Example 29, wherein the end portion has the same width than the elongate body.

Example 32. The device of any one of Examples 27 to 31, wherein at least some of the support structures are configured to fracture to separate the additively manufactured object from the overlay.

Example 33. The device of any one of Examples 27 to 32, wherein at least some of the support structures are configured to change in shape to separate the additively manufactured object from the overlay.

Example 34. The device of any one of Examples 27 to 33, wherein at least some of the support structures have different geometries.

Example 35. The device of any one of Examples 27 to 34, wherein the plurality of support structures are customized based on a geometry of the additively manufactured object.

Example 36. The device of any one of Examples 27 to 35, wherein the overlay comprises a release tab configured to facilitate removal of the overlay from the surface of the build platform.

Example 37. The device of any one of Examples 27 to 36, further comprising a plurality of actuators coupled to the overlay, wherein each actuator is configured to adjust a position of a corresponding support structure relative to the build platform.

Example 38. A method comprising:

coupling an overlay to a build platform, the overlay comprising a plurality of support structures;

forming an object onto at least some of the support structures using an additive manufacturing process;

decoupling the overlay from the build platform; and decoupling the object from the overlay.

Example 39. The method of Example 38, wherein the object is formed from a curable material.

Example 40. The method of Example 38 or 39, wherein the object is formed onto respective end portions of the plurality of support structures.

Example 41. The method of any one of Examples 38 to 40, wherein decoupling the object from the overlay comprises fracturing the at least some of the support structures.

Example 42. The method of Example 41, wherein residual portions of the at least some of the support structures remain with the object after fracturing of the at least some of the support structures.

Example 43. The method of Example 42, further comprising removing the residual portions from the object.

Example 44. The method of Example 43, wherein removing the residual portions comprises dissolving the residual portions using a solvent.

Example 45. The method of any one of Examples 42 to 44, further comprising polishing a surface of the object proximate to the residual portions.

Example 46. The method of any one of Examples 38 to 45, wherein decoupling the object from the overlay comprises changing the at least some of the support structures from an expanded configuration to a low-profile configuration.

Example 47. The method of any one of Examples 38 to 46, wherein the overlay is decoupled from the build platform before the object is decoupled from the overlay.

Example 48. The method of any one of Examples 38 to 46, wherein the object is decoupled from the overlay before the overlay is decoupled from the build platform.

Example 49. The method of any one of Examples 38 to 48, wherein the plurality of support structures are customized based on a geometry of the object.

Example 50. The method of any one of Examples 38 to 49, wherein the object comprises a dental appliance.

Example 51. A device for supporting an object during an additive manufacturing process, the device comprising:
  a build platform comprising a plurality of support structures, wherein each support structure is configured to couple to a portion of an additively manufactured object;
  an overlay configured to be removably coupled to the build platform, wherein the overlay comprising a plurality of holes, and wherein a portion of each support structure passes through a corresponding hole when the overlay is coupled to the build platform; and
  an actuator configured to adjust a height of the overlay relative to the build platform.

Example 52. The device of Example 51, wherein each support structure comprises an elongate body and an end portion.

Example 53. The device of Example 52, wherein, when the overlay is coupled to the build platform, the elongate body of each support structure passes through the corresponding hole.

Example 54. The device of Example 52 or 53, wherein:
  the actuator is configured to move the overlay between a first height and a second height,
  when the overlay is at the first height, the end portion of each support structure is above a surface of the overlay, and
  when the overlay is at the second height, the end portion of each support structure is aligned with or below the surface of the overlay.

Example 55. The device of Example 54, wherein movement of the overlay from the first height to the second height causes the additively manufactured object to separate from the plurality of support structures.

Example 56. The device of any one of Examples 51 to 55, wherein the elongate body has a different width than the end portion.

Example 57. The device of any one of Examples 51 to 55, wherein the elongate body has the same width as the end portion.

Example 58. The device of any one of Examples 51 to 57, wherein each support structure is configured to couple to a sacrificial component of the additively manufactured object.

Example 59. The device of any one of Examples 51 to 58, further comprising a plurality of second actuators, wherein each second actuator is configured to adjust a position of a corresponding support structure relative to the build platform.

Example 60. A method comprising:
  providing a build platform comprising a plurality of support structures;
  coupling an overlay to the build platform, wherein the overlay comprises a surface having a plurality of holes, and wherein each support structure extends through a corresponding hole and above the surface of the overlay;
  forming an object onto at least some of the support structures using an additive manufacturing process; and
  decoupling the object from the at least some of the support structures by raising the overlay such that the surface contacts the object.

Example 61. The method of Example 60, wherein the object is formed from a curable material.

Example 62. The method of Example 60 or 61, wherein each support structure has an end portion, and the object is formed onto the end portions of the plurality of support structures.

Example 63. The method of Example 62, wherein, when the overlay is coupled to the build platform, the end portions of the plurality of support structures extend above the surface of the overlay.

Example 64. The method of Example 62 or 63, wherein decoupling the object from the at least some of the support structures comprises raising the overlay until the end portions of the at least some of the support structures are aligned with or below the surface of the overlay.

Example 65. The method of any one of Examples 60 to 64, wherein decoupling the object from the overlay comprises fracturing the at least some of the support structures.

Example 66. The method of any one of Examples 60 to 65, wherein forming the object comprises:
  forming one or more sacrificial components onto the at least some of the support structures; and
  forming one or more functional components onto the one or more sacrificial components.

Example 67. The method of any one of Examples 60 to 66, wherein the object comprises a dental appliance.

Example 68. A system for manufacturing an object, the system comprising:
  a printer assembly configured to form an object using an additive manufacturing process;
  a build platform comprising or coupled to a plurality of support structures, wherein each support structure is configured to couple to a portion of the object;
  at least one sensor configured to generate sensor data indicative of a configuration of the plurality of support structures; and
  a controller configured to control operation of the printer assembly based on the configuration of the plurality of support structures.

Example 69. The system of Example 68, wherein the plurality of support structures are part of the build platform.

Example 70. The system of Example 68, further comprising an overlay configured to be removably coupled to the build platform, wherein the plurality of support structures are located on the overlay.

Example 71. The system of any one of Examples 68 to 70, wherein the plurality of support structures are adjustable.

Example 72. The system of any one of Examples 68 to 70, wherein the plurality of support structures are fixed.

Example 73. The system of any one of Examples 68 to 72, wherein at least some of the support structures have different geometries, and the operation of the printer assembly is controlled based on the different geometries.

Example 74. The system of Example 73, wherein the different geometries comprise different heights.

Example 75. The system of any one of Examples 68 to 74, wherein the controller is configured to determine an alignment between the object and the plurality of support structures, based on the configuration of the plurality of support structures.

Example 76. The system of any one of Examples 68 to 75, wherein the sensor data comprises image data of the plurality of support structures, and wherein the controller is configured to analyze the image data to determine the configuration of the plurality of support structures.

Example 77. The system of any one of Examples 68 to 76, further comprising an identifier associated with the build platform.

Example 78. The system of Example 77, wherein the sensor data comprises identification information stored by the identifier, and wherein the controller is configured to determine the configuration of the plurality of support structures based on the identification information.

Example 79. The system of any one of Examples 68 to 78, further comprising a fiducial marker associated with the build platform, wherein the fiducial marker indicates a spatial location of the plurality of support structures relative to the printer assembly.

Example 80. A method comprising:

receiving a digital representation of an object;

receiving sensor data indicative of a configuration of a plurality of support structures associated with a build platform for supporting the object;

determining an alignment between the object and the plurality of support structures, based on the sensor data; and generating instructions to cause a printer assembly to fabricate the object on the plurality of support structures according to the determined alignment, using an additive manufacturing process.

Example 81. The method of Example 80, wherein the plurality of support structures are part of the build platform.

Example 82. The method of Example 80, wherein the plurality of support structures are part of an overlay coupled to the build platform.

Example 83. The method of any one of Examples 80 to 82, further comprising adjusting at least some of the support structures during the additive manufacturing process.

Example 84. The method of any one of Examples 80 to 82, wherein the plurality of support structures are fixed during the additive manufacturing process.

Example 85. The method of any one of Examples 80 to 84, wherein at least some of the support structures have different geometries, and the alignment is determined based at least in part on the different geometries.

Example 86. The method of Example 85, wherein the different geometries comprise different heights.

Example 87. The method of any one of Examples 80 to 86, wherein the sensor data comprises image data of the plurality of support structures, and the method further comprises analyzing the image data to determine the configuration of the plurality of support structures.

Example 88. The method of any one of Examples 80 to 87, wherein the sensor data comprises identification information stored by an identifier associated with the build platform, and the method further comprises determining the configuration of the plurality of support structures based on the identification information.

Example 89. The method of any one of Examples 80 to 88, wherein the sensor data comprises data of a fiducial marker associated with the build platform, and the method further comprises determining a spatial location of the plurality of support structures relative to the printer assembly based on the fiducial marker.

Example 90. An assembly comprising:

one or more additively manufactured objects;

an additively manufactured overlay configured to be removably coupled to a surface of a build platform; and a plurality of additively manufactured support structures coupling the one or more additively manufactured objects to the additively manufactured overlay.

Example 91. The assembly of Example 90, wherein the one or more additively manufactured objects and the additively manufactured overlay are made from the same material.

Example 92. The assembly of Example 90, wherein the one or more additively manufactured objects and the additively manufactured overlay are made from different materials.

Example 93. The assembly of any one of Examples 90 to 92, wherein the additively manufactured overlay is configured to resist flaking during post-processing of the one or more additively manufactured objects.

Example 94. The assembly of any one of Examples 90 to 93, wherein the additively manufactured overlay comprises one or more of the following: a handle structure, a fixturing structure, or an identifier.

Example 95. The assembly of any one of Examples 90 to 94, wherein the additively manufactured overlay comprises a continuous sheet, a mesh structure, a plurality of connectors between the one or more additively manufactured objects, or a combination thereof.

Example 96. A method comprising:

forming an additively manufactured overlay on a build platform;

forming one or more additively manufactured objects on the additively manufactured overlay;

removing the additively manufactured overlay from the build platform; and performing at least one post-processing operation on the one or more additively manufactured objects while the one or more additively manufactured objects are coupled to the additively manufactured overlay.

Example 97. The method of Example 96, wherein the at least one post-processing operation comprises centrifuging the one or more additively manufactured objects and the additively manufactured overlay.

Example 98. The method of Example 96 or 97, wherein the at least one post-processing operation comprises:

immersing the one or more additively manufactured objects and the additively manufactured overlay in a solvent, and evaporating the solvent, wherein the additively manufactured overlay is configured to resist flaking when the solvent is evaporated.

Example 99. The method of any one of Examples 96 to 98, wherein the at least one post-processing operation comprises post-curing the one or more additively manufactured objects.

Example 100. The method of any one of Examples 96 to 99, wherein the additively manufactured overlay and the one or more additively manufactured objects are formed from the same material.

Example 101. The method of any one of Examples 96 to 99, wherein the additively manufactured overlay and the one or more additively manufactured objects are formed from different materials.

Example 102. The method of any one of Examples 96 to 101, wherein the additively manufactured overlay comprises one or more of the following: a handle structure, a fixturing structure, or an identifier.

Example 103. The method of any one of Examples 96 to 102, wherein the additively manufactured overlay comprises a continuous sheet, a mesh structure, a plurality of connectors between the one or more additively manufactured objects, or a combination thereof.

CONCLUSION

Although many of the embodiments are described above with respect to systems, devices, and methods for manufacturing dental and orthodontic appliances, the technology is applicable to other applications and/or other approaches, such as other types of additively manufactured objects. Moreover, other embodiments in addition to those described herein are within the scope of the technology. Additionally, several other embodiments of the technology can have different configurations, components, or procedures than those described herein. A person of ordinary skill in the art, therefore, will accordingly understand that the technology can have other embodiments with additional elements, or the technology can have other embodiments without several of the features shown and described above with reference to FIGS. 1-15.

The various processes described herein can be partially or fully implemented using program code including instructions executable by one or more processors of a computing system for implementing specific logical functions or steps in the process. The program code can be stored on any type of computer-readable medium, such as a storage device including a disk or hard drive. Computer-readable media containing code, or portions of code, can include any appropriate media known in the art, such as non-transitory computer-readable storage media. Computer-readable media can include volatile and non-volatile, removable and non-removable media implemented in any method or technology for storage and/or transmission of information, including, but not limited to, random-access memory (RAM), read-only memory (ROM), electrically erasable programmable read-only memory (EEPROM), flash memory, or other memory technology; compact disc read-only memory (CD-ROM), digital video disc (DVD), or other optical storage; magnetic cassettes, magnetic tape, magnetic disk storage, or other magnetic storage devices; solid state drives (SSD) or other solid state storage devices; or any other medium which can be used to store the desired information and which can be accessed by a system device.

The descriptions of embodiments of the technology are not intended to be exhaustive or to limit the technology to the precise form disclosed above. Where the context permits, singular or plural terms may also include the plural or singular term, respectively. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments.

As used herein, the terms "generally," "substantially," "about," and similar terms are used as terms of approximation and not as terms of degree, and are intended to account for the inherent variations in measured or calculated values that would be recognized by those of ordinary skill in the art.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

To the extent any materials incorporated herein by reference conflict with the present disclosure, the present disclosure controls.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A device for supporting an object during an additive manufacturing process, the device comprising:

a build platform comprising a surface;

a plurality of support structures extending above the surface of the build platform, wherein each support structure is configured to couple to and extend at least partially into a portion of an additively manufactured object, wherein each support structure comprises an elongate body and an end portion, wherein the end portion is configured to couple to and extend at least partially into the portion of the additively manufactured object, wherein the end portion is configured to transition between an expanded configuration and a low-profile configuration, and wherein the end portion has a larger lateral dimension in the expanded configuration than in the low-profile configuration; and a plurality of actuators, wherein each actuator is configured to adjust a position of a corresponding support structure relative to the build platform, and wherein each actuator is coupled to the elongate body of the corresponding support structure.

2. The device of claim 1, wherein the end portion is wider than the elongate body.

3. The device of claim 1, wherein each support structure is configured to be in the expanded configuration when coupling to the portion of the additively manufactured object, and configured to be in the low-profile configuration when decoupling from the portion of the additively manufactured object.

4. The device of claim 3, further comprising a second actuator configured to transition the end portion between the expanded configuration and the low-profile configuration.

5. The device of claim 1, wherein the end portion comprises an elastic material configured to change in shape to transition the end portion between the expanded configuration and the low-profile configuration.

6. The device of claim 1, wherein each actuator is configured to adjust a height of the corresponding support structure above the surface of the build platform.

7. The device of claim 6, wherein the height corresponds to a vertical location of the portion of the additively manufactured object.

8. The device of claim 1, wherein each actuator is configured to retract the corresponding support structure toward the build platform to decouple the corresponding support structure from the corresponding portion of the additively manufactured object.

9. The device of claim 1, further comprising a removable overlay positioned on the surface of the build platform.

10. The device of claim 1, wherein the end portion has a larger height in the low-profile configuration than in the expanded configuration.

11. A device for supporting an object during an additive manufacturing process, the device comprising:

a build platform comprising a surface;

a plurality of support structures extending above the surface of the build platform and coupled to a portion of an additively manufactured object, wherein each support structure comprises an end portion configured to extend at least partially into the portion of the additively manufactured object, wherein the end portion is configured to transition between an expanded configuration and a low-profile configuration, and wherein the end portion has a larger lateral dimension in the expanded configuration than in the low-profile configuration; and a plurality of actuators, wherein each actuator is coupled to a corresponding support structure to adjust a position of the corresponding support structure relative to the build platform.

12. The device of claim 11, wherein each support structure further comprises an elongate body, and wherein the end portion is wider than the elongate body.

13. The device of claim 11, wherein each support structure is configured to be in the expanded configuration when coupling the portion of the additively manufactured object, and configured to be in the low-profile configuration when decoupling the portion of the additively manufactured object.

14. The device of claim 13, further comprising a second actuator configured to transition the end portion between the expanded configuration and the low-profile configuration.

15. The device of claim 11, wherein the end portion comprises an elastic material configured to change in shape to transition the end portion between the expanded configuration and the low-profile configuration.

16. The device of claim 11, wherein each actuator is configured to adjust a height of the corresponding support structure above the surface of the build platform.

17. The device of claim 16, wherein the height corresponds to a vertical location of the portion of the additively manufactured object.

18. The device of claim 11, wherein each actuator is configured to retract the corresponding support structure toward the build platform to decouple the corresponding support structure from the corresponding portion of the additively manufactured object.

19. The device of claim 11, further comprising a removable overlay positioned on the surface of the build platform.

20. The device of claim 11, wherein the end portion has a larger height in the low-profile configuration than in the expanded configuration.

* * * * *